(12) United States Patent
Driskell

(10) Patent No.: US 6,295,509 B1
(45) Date of Patent: Sep. 25, 2001

(54) OBJECTIVE, QUANTITATIVE METHOD FOR MEASURING THE MENTAL EFFORT OF MANAGING A COMPUTER-HUMAN INTERFACE

(76) Inventor: Stanley W. Driskell, 4830 Washtenaw Ave., No. C2, Ann Arbor, MI (US) 48108

( * ) Notice: Subject to any disclaimer, the term of this patent is extended or adjusted under 35 U.S.C. 154(b) by 0 days.

(21) Appl. No.: 09/170,791

(22) Filed: Oct. 13, 1998

Related U.S. Application Data

(60) Provisional application No. 60/061,934, filed on Oct. 17, 1997.

(51) Int. Cl.[7] .................................................. G06F 3/00
(52) U.S. Cl. ....................... 702/182; 345/333; 345/334; 707/1; 707/3; 707/6
(58) Field of Search ................................. 702/182, 183; 345/333, 334, 326; 707/1, 3, 6, 200; 235/375

(56) References Cited

U.S. PATENT DOCUMENTS 5,880,723 * 3/1999 Driskell ................................. 345/333
5,933,138 * 8/1999 Driskell ................................. 345/333

* cited by examiner

Primary Examiner—Marc S. Hoff
Assistant Examiner—Hien Vo

(57) ABSTRACT

Signals emitted by a computer's input devices are captured in chronological order and identified as occurrences of one or more predefined classes descriptive of relevant activity performed during a work session. To achieve human comprehensibility of final analysis but allow for efficient computer processing these class occurrences are assigned both textual names and unique binary tokens. Individual tokens of the various strings are processed to determine the information quantity embodied by each. To appraise implications of serial correlation among tokens, groups of contiguous tokens are analyzed and information redundancy and information balance determined. Resulting data provide the basis for generating quantitative, objective measures of: (1) overall cognitive effort of employing a software, (2) performance of typical users relative to expert users, (3) ease of learning, and (4) inefficiency due to error. These measures permit usability comparisons: between proposed computer-human interfaces; between extant computer-human interfaces; and between computer operators utilizing a given application software to perform a standard activity suite.

20 Claims, 41 Drawing Sheets

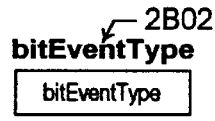
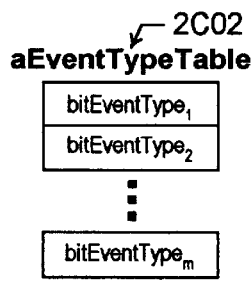
FIGURE 2B
FIGURE 2C
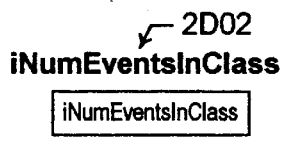
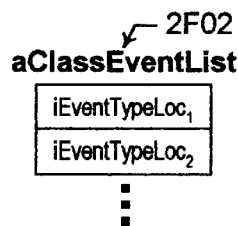
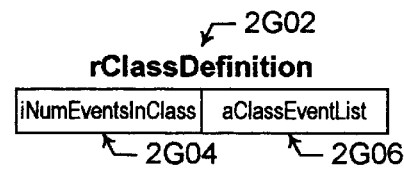
FIGURE 2D
FIGURE 2G
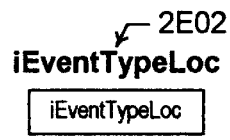
FIGURE 2F
FIGURE 2E
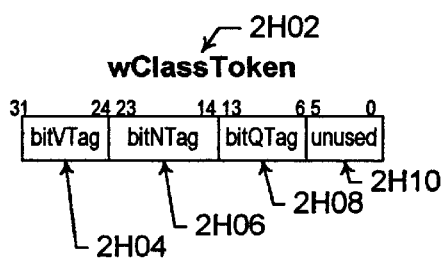
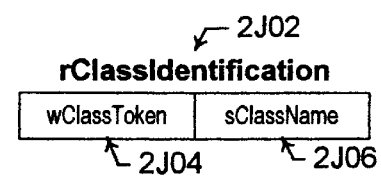
FIGURE 2H
FIGURE 2J
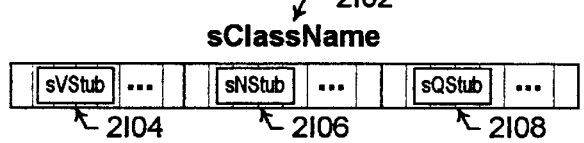
FIGURE 2I

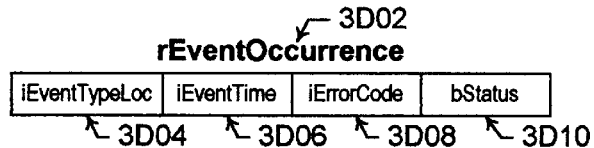
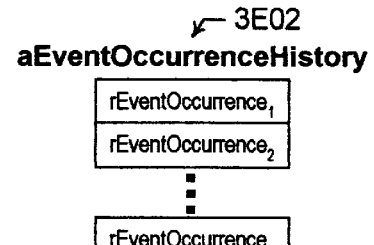
FIGURE 3C
FIGURE 3D
FIGURE 3E
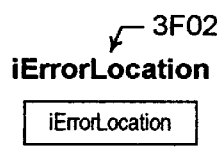
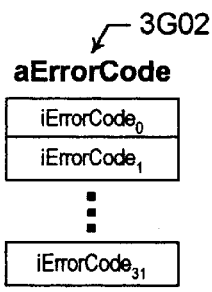
FIGURE 3F
FIGURE G
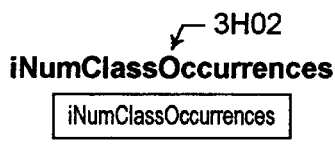
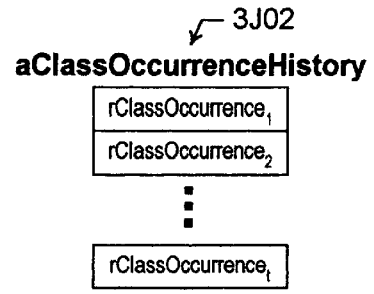
FIGURE 3H
FIGURE J
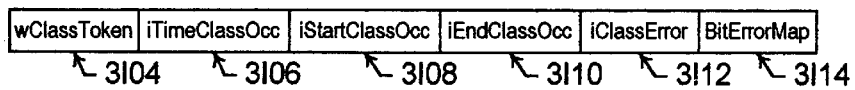
FIGURE 3I

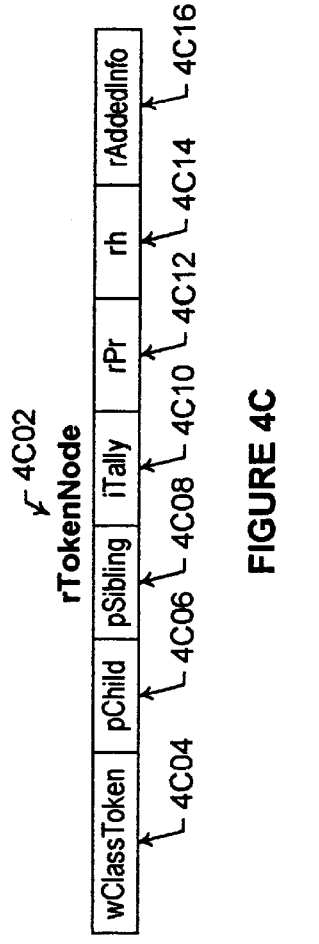
FIGURE 4A
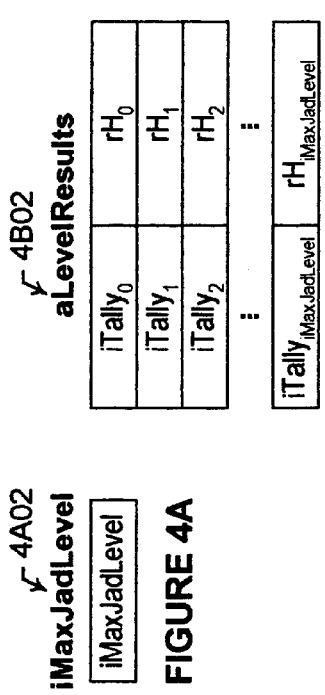
FIGURE 4B
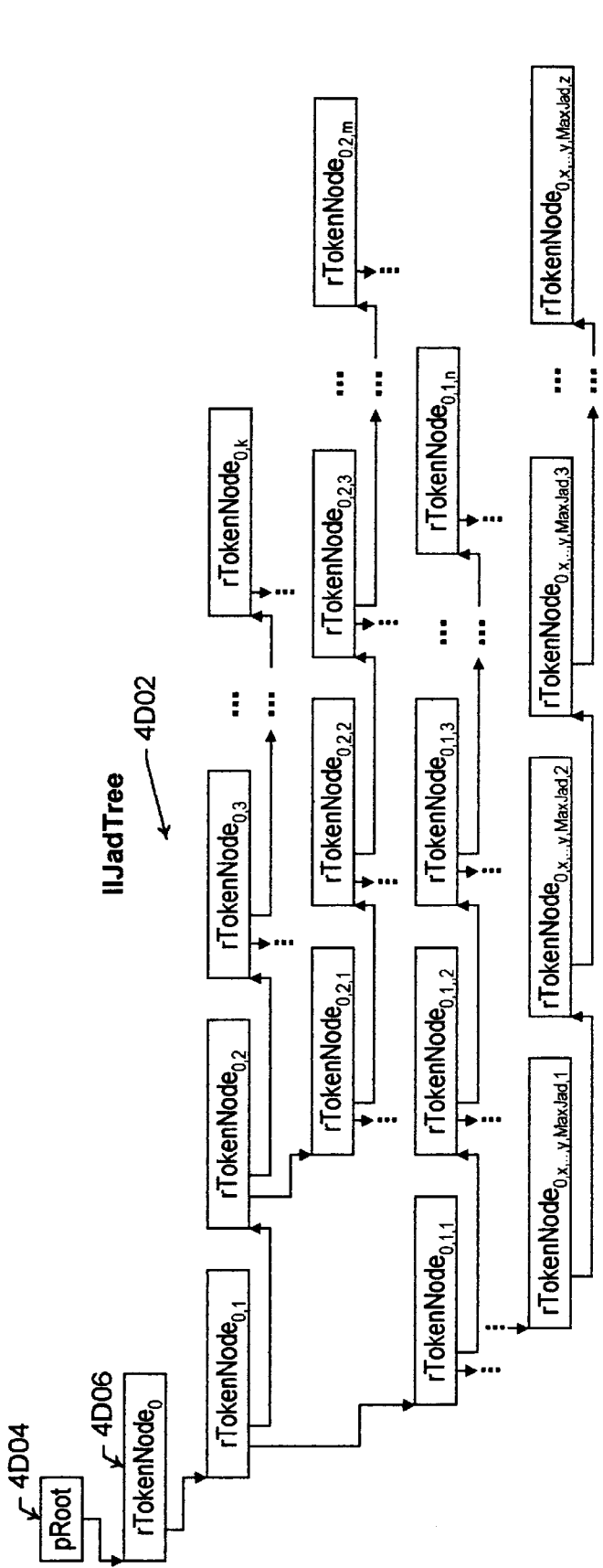
FIGURE 4C
FIGURE 4D

Exemplar Standard Test Suite: Assumptions and Specifications

Assumptions

1. Figure 7B presents the screen environment assumed for this example.

2. The Work Session commences with the cursor located at "+" 7B00.

3. Icon activation is employed whenever possible.

4. Cursor traverses are denoted by dashed lines. Labeling is presented to indicate both target and order of traverse.
   7Bxx commences a traverse.
   7Bxx+1 terminates a traverse.
   7Bxx occurs before 7Axx+1 in time.

Specifications of Standard Test Suit:

Subgoal 1: Delete the trapezoidal graphic.

Subgoal 2: Set to bold the text string "receive some bold font"

Subgoal 3: Cut the complete test string "This is a string ... before paste." And paste it over the quoted text string "indicated here".

Subgoal 4: Move the triangular graphic to specified coordinates.

| aEventTypeTable ||
|---|---|
| Location | Physical Operator Type |
| 1 | ClickButton_Left |
| 2 | DoubleClickButton_Left |
| 3 | MoveCursortoCoords_(X,Y) |
| 4 | MoveCursortoEditBox |
| 5 | MoveCursortoGraphic |
| 6 | MoveCursortoIcon |
| 7 | MoveCursortoTextEnd |
| 8 | MoveCursortoTextStart |
| 9 | PressButton_Left |
| 10 | ReleaseButton_Left |
| 11 | StrokeKeys_Data |
| 12 | StrokeOneKey_Key |
| 13 | StrokeTwoKey_Key$_1$+Key$_2$. |

FIGURE 7A

| Work Session Log |||||
|---|---|---|---|---|
| Event Num | Event Time | Work Session: Physical Operator Events | Task Occurrence | Method Occurrence |
| 1 | 0.1 | MoveCursortoGraphic | AcquireGraphicbyClick | DeleteGraphicbyIcon |
| 2 | 0.4 | ClickButton_Left | | |
| 3 | 0.7 | MoveCursortoIcon | AcquireIconbyClick | |
| 4 | 0.8 | ClickButton_Left | | |
| 5 | 1.5 | MoveCursortoTextStart | AcquireTextbyDrag | BoldTextbyIconSelect |
| 6 | 3.0 | **ClickButton_Left | | |
| 7 | 4.1 | **DoubleClickButtonLeft | | |
| 8 | 4.4 | PressButton_Left | | |
| 9 | 5.4 | MoveCursortoTextEnd | | |
| 10 | 5.6 | ReleaseButton_Left | | |
| 11 | 6.9 | MoveCursortoIcon | AcquireIconbyClick | |
| 12 | 7.3 | ClickButton_Left | | |
| 13 | 9.6 | MoveCursortoTextStart | AcquireTextbyDrag | Cut-PasteTextbyIcon |
| 14 | 9.9 | PressButton_Left | | |
| 15 | 10.8 | MoveCursortoTextEnd | | |
| 16 | 11.2 | ReleaseButton_Left | | |
| 17 | 12.8 | MoveCursortoIcon | AcquireIconbyClick | |
| 18 | 13.1 | ClickButton_Left | | |
| 19 | 15.0 | MoveCursortoTextStart | AcquireTextbyDrag | |
| 20 | 15.4 | PressButton_Left | | |
| 21 | 16.1 | MoveCursortoTextEnd | | |
| 22 | 16.6 | ReleaseButton_Left | | |
| 23 | 18.2 | MoveCursortoIcon | AcquireIconbyClick | |
| 24 | 18.7 | ClickButton_Left | | |
| 25 | 34.1 | MoveCursortoIcon | **AcquireIconbyClick | **ActivateHELPbyIcon |
| 26 | 37.8 | ClickButton_Left | | |
| 27 | 50.7 | MoveCursortoEditBox | **StrokeKeys_Data | |
| 28 | 54.0 | ClickButton_Left | | |
| 29 | 66.6 | StrokeKeys_Data | | |
| 30 | 80.6 | MoveCursortoIcon | **ExitProgrambyIcon | |
| 31 | 81.5 | ClickButton_Left | | |
| 32 | 86.3 | MoveCursortoGraphic | AcquireGraphicbyPress | MoveGraphicbyDrag |
| 33 | 87.8 | PressButton_Left | | |
| 34 | 97.8 | MoveCursortoCoords_(X,Y) | MoveGraphicbyDrag | |
| 35 | 98.1 | ReleaseButton_Left | | |

NOTE:
** → Denotes error event

Figure 7C

Exemplar List of Available Classes
(Classes listed in the random order of their declaration)
Available Task Classes

| | |
|---|---|
| TASK: | StrokeOneKey_Key |
| PO: | StrokeKey_Key |

| | |
|---|---|
| TASK: | StrokeTwoKey_Key+Key |
| PO: | StrokeKey_Key$_1$+Key$_2$. |

| | |
|---|---|
| TASK: | AcquireGraphicbyClick |
| PO: | MoveCursortoGraphic |
| PO: | ClickButton_Left |

| | |
|---|---|
| TASK: | StrokeKeys_Data |
| PO: | StrokeKey_Key |

| | |
|---|---|
| TASK: | MoveGraphicbyDrag |
| PO: | MoveCursortoCoords_(X,Y) |
| PO: | ReleaseButton_Left |

| | |
|---|---|
| TASK: | AcquireGraphicbyPress |
| PO: | MoveCursortoGraphic |
| PO: | PressButton_Left |

| | |
|---|---|
| TASK: | AcquireIconbyClick |
| PO: | MoveCursortoIcon |
| PO: | ClickButton_Left |

| | |
|---|---|
| TASK: | AcquireTextbyDrag |
| PO: | MoveCursortoTextStart |
| PO: | PressButton_Left |
| PO: | MoveCursortoTextEnd |
| PO: | ReleaseButton_Left |

| | |
|---|---|
| TASK: | ExitProgrambyIcon |
| PO: | MoveCursortoIcon |
| PO: | ClickButton_Left |

Available Method Classes

| | |
|---|---|
| METHOD: | BoldTextbyKeyEquivalent |
| TASK: | AcquireTextbyDrag |
| TASK: | StrokeTwoKey_CTRL+B |

| | |
|---|---|
| METHOD: | BoldTextbyIcon |
| TASK: | AcquireTextbyDrag |
| TASK: | AcquireIconbyClick |

| | |
|---|---|
| METHOD: | Cut-PasteTextbyKeyEquivalent |
| TASK: | AcquireTextbyDrag |
| TASK: | StrokeTwoKey_CTRL+X |
| TASK: | AcquireTextbyDrag |
| TASK: | StrokeTwoKey_CTRL+V |

| | |
|---|---|
| METHOD: | Cut-PasteTextbyIcon |
| TASK: | AcquireTextbyDrag |
| TASK: | AcquireIconbyClick |
| TASK: | AcquireTextbyDrag |
| TASK: | AcquireIconbyClick |

| | |
|---|---|
| METHOD: | MoveGraphicbyDrag |
| TASK: | AcquireGraphicbyPress |
| TASK: | MoveGraphicbyDrag |

| | |
|---|---|
| METHOD: | DeleteGraphicbyFunctionKey |
| TASK: | AcquireGraphicbyClick |
| TASK: | StrokeOneKey_DELETE |

| | |
|---|---|
| METHOD: | DeleteGraphicbyIcon |
| TASK: | AcquireGraphicbyClick |
| TASK: | AcquireIconbyClick |

| | |
|---|---|
| METHOD: | ActivateHELPbyIcon |
| TASK: | AcquireIconbyClick |
| TASK: | StrokeKeys_Data |
| TASK: | ExitProgrambyIcon |

FIGURE 7D

| Verb Components of Task Names |||||
|---|---|---|---|---|
| aVStubOrderList || aVTagOrderList |||
| sStub | Original iTag | sStub | Original iTag | Revised iTag |
| Acquire | 2 | Stroke | 1 | 4 |
| Exit | 4 | Acquire | 2 | 1 |
| Move | 3 | Move | 3 | 3 |
| Stroke | 1 | Exit | 4 | 2 |

| Noun Components of Task Names |||||
|---|---|---|---|---|
| aNStubOrderList || aNTagOrderList |||
| sStub | Original iTag | sStub | Original iTag | Revised iTag |
| Graphic | 3 | OneKey | 1 | 4 |
| Icon | 5 | TwoKey | 2 | 7 |
| Keys | 4 | Graphic | 3 | 1 |
| OneKey | 1 | Keys | 4 | 3 |
| Program | 7 | Icon | 5 | 2 |
| Text | 6 | Text | 6 | 6 |
| TwoKey | 2 | Program | 7 | 5 |

| Qulifier Components of Task Names |||||
|---|---|---|---|---|
| aQStubOrderList || aQTagOrderList |||
| sStub | Original iTag | sStub | Original iTag | Revised iTag |
| Click | 3 | Key | 1 | 5 |
| Data | 4 | Key+Key | 2 | 6 |
| Drag | 5 | Click | 3 | 1 |
| Icon | 7 | Data | 4 | 2 |
| Key | 1 | Drag | 5 | 3 |
| Key+Key | 2 | Press | 6 | 7 |
| Press | 6 | Icon | 7 | 4 |

| | aTaskDeclarationTable |||||
|---|---|---|---|---|---|
| | aTaskIdentification ||| aTaskDefinition ||
| | wTaskToken || | | |
| Loc | Original | Revised | sTaskName | iNumPhyOps | aTaskEventList |
| 1 | [233] | [111] | AcquireGraphicbyClick | 2 | 5, 1 |
| 2 | [236] | [117] | AcquireGraphicbyPress | 2 | 5, 9 |
| 3 | [253] | [121] | AcquireIconbyClick | 2 | 6, 1 |
| 4 | [265] | [163] | AcquireTextbyDrag | 4 | 8, 9, 7, 10 |
| 5 | [477] | [254] | ExitProgrambyIcon | 2 | 6, 1 |
| 6 | [335] | [313] | MoveGraphicbyDrag | 2 | 3, 10 |
| 7 | [144] | [432] | StrokeKeys_Data | 1 | 11 |
| 8 | [111] | [445] | StrokeOneKey_Key | 1 | 12 |
| 9 | [122] | [476] | StrokeTwoKeys_Key$_1$+Key$_2$ | 1 | 13 |

FIGURE 7E

| Event No | aPhysicalOperatorOccurrenceHistory | | | |
|---|---|---|---|---|
| | iPhyOpLoc | iEventTime | iErrorCode | bStatus |
| 1 | 5 | 0.1 | 0 | T |
| 2 | 1 | 0.4 | 0 | T |
| 3 | 6 | 0.7 | 0 | T |
| 4 | 1 | 0.8 | 0 | T |
| 5 | 8 | 1.5 | 0 | T |
| 6 | 1 | 3.0 | 12 | T |
| 7 | 2 | 4.1 | 26 | T |
| 8 | 9 | 4.4 | 0 | T |
| 9 | 7 | 5.4 | 0 | T |
| 10 | 10 | 5.6 | 0 | T |
| 11 | 6 | 6.9 | 0 | T |
| 12 | 1 | 7.3 | 0 | T |
| 13 | 8 | 9.6 | 0 | T |
| 14 | 9 | 9.9 | 0 | T |
| 15 | 7 | 10.8 | 0 | T |
| 16 | 10 | 11.2 | 0 | T |
| 17 | 6 | 12.8 | 0 | T |
| 18 | 1 | 13.1 | 0 | T |
| 19 | 8 | 15.0 | 0 | T |
| 20 | 9 | 15.4 | 0 | T |
| 21 | 7 | 16.1 | 0 | T |
| 22 | 10 | 16.6 | 0 | T |
| 23 | 6 | 18.2 | 0 | T |
| 24 | 1 | 18.7 | 0 | T |
| 25 | 6 | 34.1 | 0 | T |
| 26 | 1 | 37.8 | 0 | T |
| 27 | 4 | 50.7 | 0 | T |
| 28 | 1 | 54.0 | 0 | T |
| 29 | 11 | 66.6 | 0 | T |
| 30 | 6 | 80.6 | 0 | T |
| 31 | 1 | 81.5 | 0 | T |
| 32 | 5 | 86.3 | 0 | T |
| 33 | 9 | 87.8 | 0 | T |
| 34 | 3 | 97.8 | 0 | T |
| 35 | 10 | 98.1 | 0 | T |

| TaskNo | aTaskOccurrenceHistory | | | | | | |
|---|---|---|---|---|---|---|---|
| | iTimeTaskOcc | wTaskToken | | iStartTaskOcc | iEndTaskOcc | iClassError | bitErrorMap |
| | | Original | Revised | | | | |
| 1 | 0.1 | [233] | [111] | 1 | 2 | 0 | 00 |
| 2 | 0.7 | [253] | [121] | 3 | 4 | 0 | 00 |
| 3 | 1.5 | [265] | [163] | 5 | 10 | 0 | 000110 |
| 4 | 6.9 | [253] | [121] | 11 | 12 | 0 | 00 |
| 5 | 9.6 | [265] | [163] | 13 | 16 | 0 | 0000 |
| 6 | 12.8 | [253] | [121] | 17 | 18 | 0 | 00 |
| 7 | 15.0 | [265] | [163] | 19 | 22 | 0 | 0000 |
| 8 | 18.2 | [253] | [121] | 23 | 24 | 0 | 00 |
| 9 | 34.1 | [253] | [121] | 25 | 26 | 6 | 00 |
| 10 | 50.7 | [144] | [432] | 27 | 29 | 6 | 000 |
| 11 | 80.6 | [477] | [254] | 30 | 31 | 6 | 00 |
| 12 | 86.3 | [236] | [117] | 32 | 33 | 0 | 00 |
| 13 | 97.8 | [335] | [313] | 34 | 35 | 0 | 00 |

FIGURE 7F

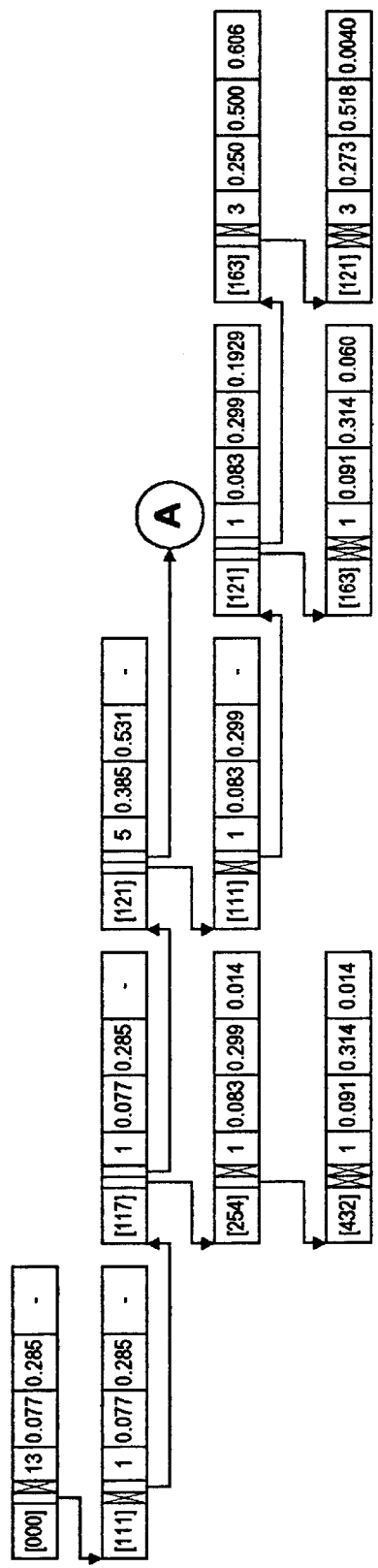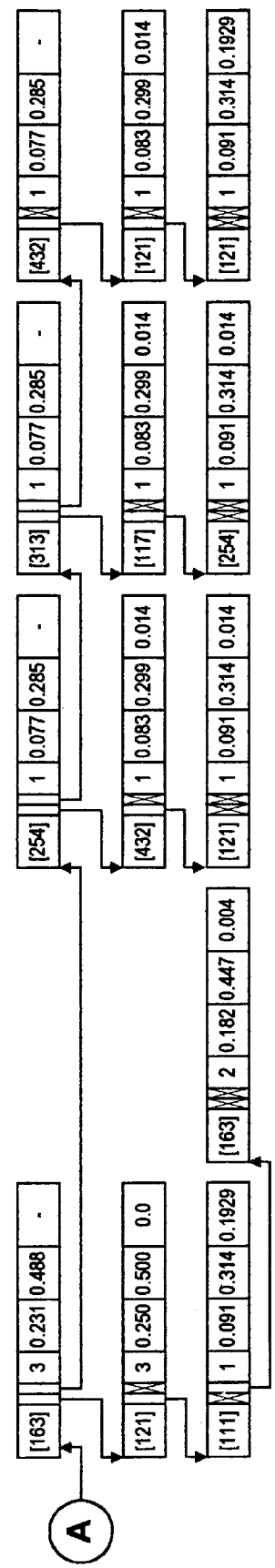
FIGURE 7GA

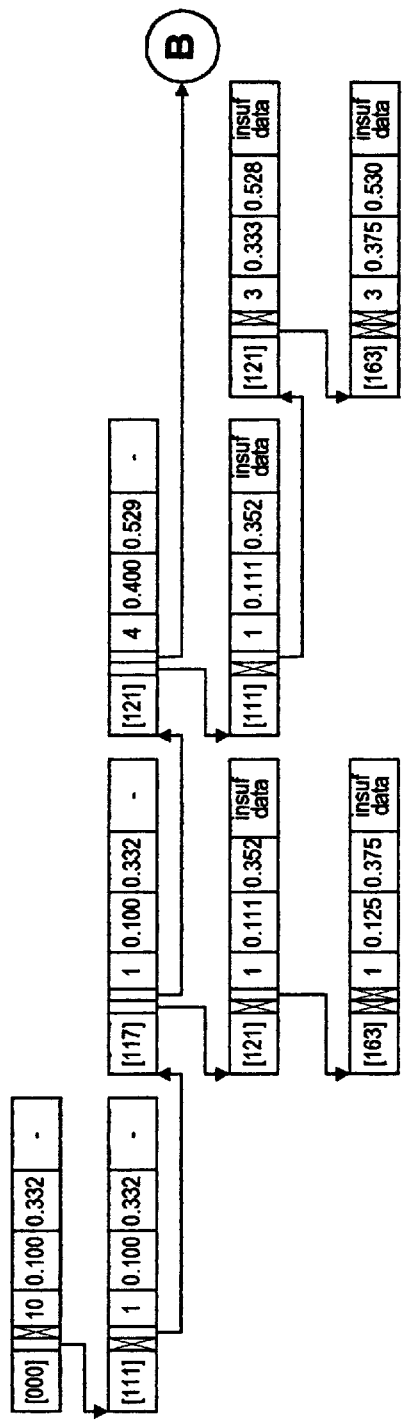
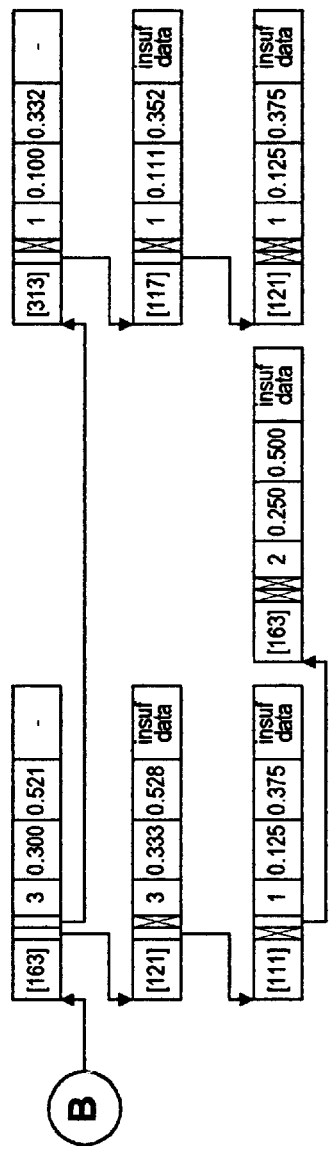
FIGURE 7GB

Information Content Report: Real-World Task Occurrence Analysis

| Task Class Name | Level 1 | | | Level 2 | | | | Level 3 | | | |
|---|---|---|---|---|---|---|---|---|---|---|---|
| | Tally | Pr | $h_1$ | Tally | Pr | $h_{12}$ | $(h_{12}-h_2)$ | Tally | Pr | $h_{123}$ | $(h_{23}-h_3)$ | $(h_{23}-h_2)$ |
| AcquireGraphicbyClick | 1 | 0.077 | 0.285 | | | | | | | | | |
| AcquireGraphicbyPress | 1 | 0.077 | 0.285 | | | | | | | | | |
|   ExitProgrambyIcon | | | | | | | | | | | | |
|     StrokeKeys_Data | | | | 1 | 0.083 | 0.299 | 0.014 | 1 | 0.091 | 0.314 | 0.14 | 1.000 |
| AcquireIconbyClick | 5 | 0.385 | 0.530 | | | | | | | | | |
|   AcquireGraphicbyClick | | | | 1 | 0.083 | 0.299 | 0.014 | | | | | |
|   AcquireIconbyClick | | | | 1 | 0.083 | 0.299 | 0.193 | 1 | 0.091 | 0.314 | 0.060 | 3.217 |
|     AcquireTextbyDrag | | | | | | | | | | | | |
|   AcquireTextbyDrag | | | | 3 | 0.250 | 0.500 | 0.6060 | 3 | 0.273 | 0.518 | 0.004 | 151.5 |
|   AcquireIconbyClick | | | | | | | | | | | | |
| AcquireTextbyDrag | 3 | 0.231 | 0.488 | | | | | | | | | |
|   AcquireIconbyClick | | | | 3 | 0.250 | 0.500 | 0.004 | 1 | 0.091 | 0.314 | 0.193 | 49.25 |
|     AcquireGraphicbyClick | | | | | | | | 2 | 0.182 | 0.447 | 0.004 | 1.000 |
|   AcquireTextbyDrag | | | | | | | | | | | | |
| ExitProgrambyIcon | 1 | 0.077 | 0.285 | | | | | | | | | |
|   StrokeKeys_Data | | | | 1 | 0.083 | 0.299 | 0.014 | 1 | 0.091 | 0.314 | 0.014 | 1.000 |
|   AcquireGraphicbyClick | | | | | | | | | | | | |
| MoveGraphicbyDrag | 1 | 0.077 | 0.285 | | | | | | | | | |
|   AcquireGraphicbyPress | | | | 1 | 0.083 | 0.299 | 0.014 | 1 | 0.091 | 0.314 | 0.014 | 1.000 |
|   ExitProgrambyIcon | | | | | | | | | | | | |
| StrokeKeys_Data | 1 | 0.077 | 0.285 | | | | | | | | | |
|   AcquireIconbyClick | | | | 1 | 0.083 | 0.299 | 0.014 | 1 | 0.091 | 0.314 | 0.193 | 13.79 |
|   AcquireIconbyClick | | | | | | | | | | | | |
| Average information per sequence | $H_1 = 2.443$ $H_0 = 2.807$ $R_{1,0} = 0.130$ | | | $H_{12} = 2.794$ $H_{00} = 3.000$ $R_{(12),(00)} = 0.069$ | | | | $H_{123} = 2.849$ $H_{000} = 3.000$ $R_{(123),(000)} = 0.050$ | | | | |

FIGURE 7HA

Information Content Report: Error-Free Task Occurrence Analysis

| Task Class Name | Level 1 | | | Level 2 | | | | Level 3 | | | |
|---|---|---|---|---|---|---|---|---|---|---|---|
| | Tally | Pr | $h_1$ | Tally | Pr | $h_{12}$ | $(h_{12}-h_2)$ | Tally | Pr | $h_{123}$ | $(h_{23}-h_3)$ $(h_{12}-h_2)$ |
| AcquireGraphicbyClick | 1 | 0.100 | 0.332 | | | | | | | | |
| AcquireGraphicbyPress ExitProgrambyIcon StrokeKeys_Data | 1 | 0.077 | 0.285 | 1 | 0.111 | 0.352 | · | 1 | 0.125 | 0.375 | · |
| AcquireIconbyClick AcquireGraphicbyClick AcquireIconbyClick AcquireTextbyDrag | 4 | 0.400 | 0.529 | 1 3 | 0.111 0.333 | 0.352 0.528 | · · | 3 | 0.375 | 0.530 | · |
| AcquireTextbyDrag AcquireIconbyClick AcquireGraphicbyClick AcquireTextbyDrag | 3 | 0.300 | 0.521 | 3 | 0.333 | 0.528 | · | 1 2 | 0.125 0.250 | 0.375 0.500 | · · |
| MoveGraphicbyDrag AcquireGraphicbyPress AcquireIconbyClick | 1 | 0.100 | 0.332 | 1 | 0.111 | 0.352 | · | 1 | 0.125 | 0.375 | · |
| Average information per sequence | $H_1 = 1.999$ $H_0 = 2.322$ $R_{1,0} = 0.139$ | | | $H_{12} = 2.112$ $H_{00} = 2.322$ $R_{(12),(00)} = 0.090$ | | | | $H_{123} = 2.155$ $H_{000} = 2.322$ $R_{(123),(000)} = 0.072$ | | | |

FIGURE 7HB

MMPRMPMRMMPRPR

FIGURE 8A  ⬌ 8A02

| Triad | $n_{Tr}$ | $p_{Tr}$ | Dyad | $n_{Di}$ | $p_{Di}$ | Monad | $n_{Mi}$ | $p_{Mi}$ |
|---|---|---|---|---|---|---|---|---|
| MMM | 0 | 0.0 | | | | | | |
| MMP | 2 | 0.1667 | MM | 2 | 0.1538 | | | |
| MMR | 0 | 0.0 | | | | | | |
| MPM | 1 | 0.0883 | | | | | | |
| MPP | 0 | 0.0 | MP | 3 | 0.2308 | M | 6 | 0.4286 |
| MPR | 2 | 0.1667 | | | | | | |
| MRM | 1 | 0.0883 | | | | | | |
| MRP | 0 | 0.0 | MR | 1 | 0.0769 | | | |
| MRR | 0 | 0.0 | | | | | | |
| PMM | 0 | 0.0 | | | | | | |
| PMP | 0 | 0.0 | PM | 1 | 0.0769 | | | |
| PMR | 1 | 0.0883 | | | | | | |
| PPM | 0 | 0.0 | | | | | | |
| PPP | 0 | 0.0 | PP | 0 | 0.0 | P | 4 | 0.2857 |
| PPR | 0 | 0.0 | | | | | | |
| PRM | 1 | 0.0883 | | | | | | |
| PRP | 1 | 0.0883 | PR | 3 | 0.2308 | | | |
| PRR | 0 | 0.0 | | | | | | |
| RMM | 1 | 0.0883 | | | | | | |
| RMP | 1 | 0.0883 | RM | 2 | 0.0883 | | | |
| RMR | 0 | 0.0 | | | | | | |
| RPM | 0 | 0.0 | | | | | | |
| RPP | 0 | 0.0 | RP | 1 | 0.0769 | R | 4 | 0.2857 |
| RPR | 1 | 0.0883 | | | | | | |
| RRM | 0 | 0.0 | | | | | | |
| RRP | 0 | 0.0 | RR | 0 | 0.0 | | | |
| RRR | 0 | 0.0 | | | | | | |
| Totals | 12 | 0.9998 | | 13 | 0.9999 | | 14 | 1.0000 |

FIGURE 8B

OBJECTIVE, QUANTITATIVE METHOD FOR MEASURING THE MENTAL EFFORT OF MANAGING A COMPUTER-HUMAN INTERFACE

CROSS-REFERENCE TO RELATED APPLICATIONS

This is a continuation-in-part of U.S. Provisional Application Ser. No. 60/061,934, filed Oct. 17, 1997, entitled "Schema for Computer-Human Interface Design."

BACKGROUND OF THE INVENTION

1. Field of the Invention

The invention relates generally to the usability of the computer-human interface and, more specifically, to defining and utilizing a method that provides an objective, quantitative measurement of the mental effort expended during manipulation of a computer-human interface.

2. Prior Art

Software systems designed for a general purpose computer provide a component to accomplish the functionality specified for the system and a component to expedite both the declaration of data to the computer and the specification of transformations to these data. Software of this latter component plus the input-output devices employed during communication with the computer will comprise the computer-human interface (CHI). Great effort has been expended by cognitive psychologists and software engineers to investigate cognitive factors involved in designing productive CHI that are easily learned, easily retained, and not prone to error. It is apparent that if an objective, quantitative technique were available for measuring the mental effort while manipulating a computer it would advance our ability to design CHI of high usability. Such a tool would find ready application in the areas of: (1) designing interfaces for new application software, (2) comparing the usability of extant software of equivalent functionality, and (3) the screening of applicants for computer based employment and evaluation of employees engaged in computer based employment.

The review of the current state of the cognitive arts relating to computer-human interface design presented below shows that these arts have not articulated an objective, quantitative technique for measuring the mental effort expended by a user while manipulating a CHI. It will then be shown how the present invention overcomes this failure.

Cognitive Aspects of the Computer-Human Interface

The Goals, Operations, Methods, and Selections (GOMS) model proposed by Card, Moran, and Newell (*The Psychology of Human-Computer Interaction*, 1983) underpins most research into cognitive aspects of user-computer interaction. GOMS presumes a user employs the computer during a "work session" to attain a goal-oriented activity which GOMS terms the "primary goal." It is posited that users devolve the primary goal into a set of cognitively comprehensible "sub-goals" that, when individually achieved, accomplish the work session's primary goal. Each sub-goal is achieved when the user correctly performs an appropriate "method" provided by the software designers. A method, in turn, comprises one or more "tasks" which, in their turn, comprise one or more permitted sequences of "physical operations" that accomplish a task. Card, et. al. (op. cit., p. 264) identify the "Key/Button Press", "Mouse-Point", "Hand-home", and "Draw-Straight-Line" as the physical operators provided by input devices of a computer and identify a "mentally prepare" operator that is activated when the user appraises results of prior actions, determines the next sub-goal, and develops an actualization plan. After promulgating heuristics to predict the occurrence of the mental operator within sequences of physical operators, Card, et al. (op. cit. pp.147–161; 167–179; 270–278) appraise whether knowledge of cognitive psychology is sufficiently advanced to permit acceptably accurate predictions of the methods selected and the time required to perform each. Many researchers conclude substantial problems remain.

Olson and Olson (The Growth of Cognitive Modeling in Human-Computer Interaction Since GOMS, *Human-Computer Interaction*, 1990, pp. 221–265) find that when employed by those skilled with GOMS usage, GOMS provides reasonable predictions of the type and occurrence of physical operator execution but is less successful in predicting mental activity. Observing that an estimated 40% of a work session is expended to comprehend, devolve and resolve the primary goal, Allen and Scerbo (Details of Command-Line Language Keystrokes, *ACM Transactions on Office Information Systems*, 1983, pp. 159–178) contend that successful application GOMS requires that the occurrence and duration of each mental operator be accurately predicted. To appraise whether GOMS meets these requirements Allen and Scerbo appraise the Card, et al. heuristics. The heuristics are found on, logical grounds, to contain definitional inconsistencies and, on empirical grounds, to not adequately predict either the occurrence or duration of mental activity.

The Cognitive Complexity Theory (CCT) model proposed by Kieras and Polson (An Approach to the Formal Analysis of User Complexity, *International Journal of Man-Machine Studies*, 1985, pp, 365–394) provides a relevant extension to the original GOMS model. CCT recasts GOMS to permit appraising the "mental load" of using computer interfaces by incorporating user how-to-do-it knowledge into production rules of the following structure:

NAME: IF( Condition 1 is true AND
: : : :
Condition k is true) THEN
PERFORM (set of specified physical operations)

Under CCT users are presumed to have in memory production rules necessary to accomplish each sub-goal of the primary goal. As external stimuli—exemplified by deciding the next sub-goal or reacting to error—are received they are compared against the set of production rule conditions. Any production rule having its conditions met is performed, thus altering the environment which, in turn, alters the external stimuli. The cycle repeats until the primary goal is attained.

To ascertain learnability of a production rule set Bovair, Kieras, and Polson (The Acquisition of Text Editing Skill: A Production System Analysis, *Human-Computer Interaction*, 1990, p. 1–48) posit that: (1) it is possible to define individual productions of a production rule set to embody equal knowledge content and (2) given the preceding ability the quantity of knowledge implicit in a rule is a linear function of the time required to learn the production rule set. Based on results of their experiments these authors conclude significant correlation exists between the number of new rules and total learning effort. Karat, Fowler, and Granville (Evaluating User Interface Complexity, in Bullinger and Shackel (eds.) *Human-Computer Interaction—INTERACT '87*, 1987, p. 489–495) however contend that while formulation of production rules is not difficult, successful formulation of productions of equal knowledge content is unlikely until an exogenous criterion is available that objectively quantifies such knowledge content. Absence of such a criterion produces a conundrum; namely: the logic of top-down problem decomposition dictates that productions should reflect user mental processes and not be crafted by the researcher to achieve production rule equivalence. Designing for equivalence suggests that production rules are developed to meet the criterion under test in order to test whether the criterion is valid.

The CCT presumption of zero learning load to activate different combinations of productions has been investigated by questioning whether user assimilation of complete production systems is an additive function of the learning time of individual productions. Vossen, Sifter, Ziegler (An Empirical Validation of the Cognitive Complexity Theory with Respect to Text, Graphics and Table Editing, in Bullinger and Shackel (eds.) *Human-Computer Interaction—INTERACT '87*, 1987, p. 71–75) justify this concern by presenting experimental evidence showing that learning time is not explained solely by a linear relationship of production rules. These authors conclude there is a burden to learning additional productions even though the new productions are deemed equivalent; a learning burden that can be lowered by increased consistency of interface design. Payne and Green (Task-Action Grammar: the model and its development, in Drapier, Dan (ed.) *Task Analysis for Human-Computer Interaction*, 1989, pp. 75–107) hypothesize that if productions contain equivalent learning loads, persons employing a system with few productions would accomplish a standard task in less time than when employing a functionally equivalent alternate system having more productions. A test of this hypothesis found that subjects utilizing a system with a large number of consistent productions performed stipulated activities in one third the time required by subjects utilizing a system with fewer but inconsistent productions. Payne and Green attribute these results to the deliberate provision of consistency between production sets enhanced by congruence between system and user perceptions of the problem domain.

Payne and Green (in Drapier, loc. cit.) endeavor to provide a mechanism leading to increased consistency of GUI designs by making their Task Action Grammar non-rigorous in order to more easily incorporate the concepts of consistency held by users. Payne and Greene contend this approach allows descriptions not only of the syntax; i.e., how to execute commands, but also the semantics; i.e., the relationship of commands to user perceptions of how a particular task should be accomplished. Payne and Green contend that users easily integrate syntactic regularities into their mental models of the software and generalize to unknown parts of the software from known parts, a contention they believe their results avow.

Efficacy of the Payne-Green approach is strengthened by Kellogg (Conceptual Consistency in the User Interface, in Bullinger and Shackel (eds.) *Human-Computer Interaction—INTERACT '87*. 1987, p. 93–133) who tested a limited Payne-Green type command set designed to maximize consistency. Kellogg's results suggest that when subjects are presented with productions purported to be consistent, near perfect recall of previously employed procedures usually enables subjects to correctly infer procedures not previously encountered. Additionally, subjects presented with the consistent command set found such systems more "user friendly" than did a control cohort subjected to a non-consistent command set. However, qualifications of this result are voiced by Grant and Mayes (Cognitive Task Analysis, in Weir and Alty (eds.) *Human-Computer Interaction and Complex Systems*, 1991, pp. 147–167) after reviewing published research into user perceptions of consistency. These authors conclude that for inherently well-structured tasks such as text editing, achieving consistency between computer interface and user perception is fairly self evident thus enabling interface designs to closely reflect human cognition. The inference is that, given the current state of the art, techniques for achieving consistency with less well-structured problem domains are less well understood.

Contemplation of such arguments promulgated by leaders in the art, however, leads to the conclusion that a rigorous, objectively quantifiable definition of consistency has not been articulated. Schiele and Green (HCI Formalisms and Cognitive Psychology: The Case of Task Action Grammar, in Harrison and Thimblebly (eds.) *Formal Methods in Human-Computer Interaction*, 1990, pp. 9–61) corroborate this by noting that even though the current art regularly promotes CHI consistency as a desirable quality, its realization in software requires that practitioners intuit its characteristics. It remains that in spite of an extensive literature supportive of the desirability of CHI consistency, achieving consistency still requires that those experienced in the art must rely on impressionistic and anecdotal criteria to intuit its presence.

Nowhere in the writings concerned with the cognitive aspects of manipulating the computer-human interface have those most skilled in these arts proposed an objective, quantitative technique for the actual measurement of either the cognitive efforts involved or the concept of consistency.

SUMMARY OF THE INVENTION

This invention provides such an objective, quantitative capability and overcomes many weaknesses of the current art. This is achieved by applying concepts of Information Theory to the set of ordered physical operations performed on the input devices of the general purpose computer. The invention analyzes the information content embodied in the stream of events emitted as result of user manipulation of a computer's CHI and shows that said stream of events correlate with the cognitive burden on the user to perform the manipulations that generate these computer events.

The invention provides a computer-implemented apparatus for evaluating computer-human interfaces and for assessing the computer skills of a user. Several embodiments of the invention are disclosed.

According to one aspect of the invention the user implemented apparatus comprises a memory for storing at least one work session history. The work session history comprises a sequence of tokens corresponding to events associated with performance of the test suite performed in conjunction with a first interface. A first processing mechanism evaluates the tokens to determine the quantity of information embodied within the token set. This first quantity of information defines a first metric reflecting the human effort associated with using the first computer-human interface to perform the test suite.

The apparatus comprises a memory for storing at least one inferred work session history comprising a sequence of tokens corresponding to events expected during performance of a predetermined test suite using a first proposed computer-human interface. A first processing mechanism evaluates the tokens and determines a first quantity of information embodied within or communicated by the tokens. This first quantity defines a first metric, reflecting the predicted cognitive effort required to perform the test suite. A second processing mechanism ascertains the ratio of the incremental quantity of information attributable to inclusion of an additional token to a predetermined base quantity of information. The second quantity defines a second metric, reflecting the redundancy inherent to the first proposed computer-human interface. A third processing mechanism identifies serial correlation within chronologically contiguous groups of tokens. It assesses the relative incremental quantity and relative information balance of information attributable to each token in at least one of the groups. The relative incremental quantity serves as a third metric, identifying sequences of user activity on computer input devices conducive to error generation associated with the first proposed computer-human interface.

According to one aspect of the invention, the above-described components are used in an apparatus for comparing proposed computer-human interfaces. A comparison mechanism compares the first, second and third metrics with correspondingly generated metrics obtained from a second proposed human-computer interface. The comparison mechanism compares the first, second and third metrics with predetermined metrics corresponding to a second human-computer interface.

In yet another aspect of the invention, the above-described components are used in conjunction with a forth processing mechanism which removes erroneous instances of tokens and ascertains the ratio of the quantity of information embodied within the remaining error-free tokens to a predetermined base quantity of information. The ratio is used as a forth metric, reflecting the level of error associated with the first computer-human interface. A fifth processing mechanism ascertains the ratio of information embodied within a predetermined sequence of tokens, corresponding to those generated by a person of arbitrary skill, to a quantity of information communicated by a person of expert skill performing the test suite using the first computer-human interface. The ratio is used as a fifth metric, reflecting the productivity differences between skilled and arbitrary usage associated with the first computer-human interface.

In another aspect of the invention, the above-described components are used in an apparatus for evaluating an extant computer-human interface. A comparison mechanism compares the first, second, third, forth and fifth metrics with correspondingly generated metrics obtained from a second human-computer interface. The comparison is used to evaluate the desirability of the first said extant computer-human interface vis-à-vis the second extant computer-human interface.

According to another aspect of the invention, the above-described components are used in an apparatus for assessing the computer skills of a user. A comparison mechanism compares the first, second, third, forth and fifth metrics obtained from the first user with correspondingly generated metrics obtained from a second user. The comparison is used to evaluate the skills of the first user vis-à-vis the second user.

As more fully set forth in the detailed description of the preferred embodiments described below, employment of this invention will generally commence with declaration of categories of user activity found within the work session history of the type proposed but not confined to the Task and Method divisions of the GOMS model and its derivatives. Each category of user activity present in the Event Occurrence History will be an occurrence of one of the classes from which Event Occurrence History was generated. The first activity of an analysis is to utilize the Class Declaration Generator to declare as many classes as is feasible given available documentation and access to persons knowledgeable in use of the software. Each different class is provided two identifiers: (1) a name composed on a compound three part text string provided to aid human comprehension of resulting analysis, and (2) a tag identifier comprising a three part bit pattern generally confined to a four byte computer word provided to improve efficiency of computer usage. The second step of analysis entails applying the Class Occurrence Generator to the Event Occurrence History to identify occurrences of classes declared in step one. The ordered listing of these class occurrences is written to disk file Class Occurrence History. Each element of the Event Occurrence History is uniquely identified by its class name/class token and its time of occurrence. While each of these class tokens could be comprehended by humans, it will not be presumed that these tokens are presented in a manner conducive to human communication. Because it is uncommon that all classes activated during a work session are known prior to encountering them when processing the Class Occurrence History file this step provides for declaration of classes during Class Occurrence Generation. The final activity of Class Occurrence Identification is to render identification of the class occurrences comprehensible to humans and thus amenable to human communication.

The third major activity iterates through elements of the Class Occurrence History, to identify and tally each different jad. If a jad has been previously encountered a tally is incremented. If the jad is new its location in the tree data structure that the Jad Generator builds is determined and insertion performed. Upon completion of the jad data structure the fourth step of analysis is entered to calculate the probability of the occurrence of each jad and the information transmitted by each. This step entails a single depth-first traverse through the jad data structure with application of equations described below. Specifically, Eq 3 is applied to calculate jad probabilities and Eq 4 is applied to calculate information transmitted by each jad. The final activities of step four is to calculate redundancy using Eq 10 and information balance based on the relation of Eq 11.

The final step is to employ the Mental Effort Report Generator to provide a basic summary view of the jad data, redundancy rates, and the jads likely to be conducive to creating error.

BRIEF DESCRIPTION OF THE DRAWINGS

In the following specification Figures are assigned numbers and are further subdivided into parts which are designated by an assigned letter suffix, as follows.

Part 2A is a CRT display designed to assist the user define and identify classes.

Parts 2B–2T disclose preferred data arrangements manipulated by the user to define and identify classes.

Parts 2U–2ZB disclose the preferred procedures for manipulating said data elements during definition and identification of classes.

FIG. 3 is a multi-part figure disclosing the preferred procedure for identifying the occurrences of classes defined by disclosures of FIG. 2:

Part 3A is a CRT display designed to assist the user define and identify each occurrence of each class present in the work session history or derived groupings thereof.

Part 3B is a CRT similar to the CRT display of Part 2A but altered to better assist the user define and identify a new class based on an actual occurrence of said new class.

Parts 3C–3J disclose preferred data arrangements manipulated by the user to define and identify class occurrences.

Parts 3K–3T disclose the preferred procedures for manipulating said data elements during definition and identification of class occurrences.

FIG. 4 is a multi-part figure disclosing the preferred procedures to identify and tally each different jad of exceeding a maximum size present in a work session history or any grouping derived therefrom:

Parts 4A–4D disclose preferred data arrangements manipulated during class token conversion, jad identification, and the tallying of jad occurrences.

Parts 4E–4H disclose preferred procedures for manipulating said data elements to affect token conversion that produces jad displays conducive to human comprehension.

Figure 5A:
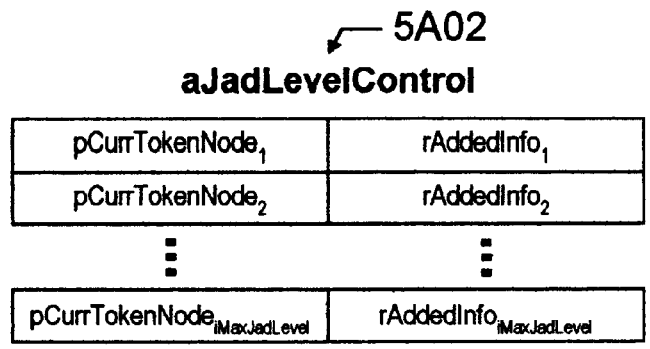

Parts 4I–4J disclose preferred procedures for manipulating said data elements to generate the data identifying all jads present in a work session history or any grouping derived therefrom:

FIG. 5 is a multi-part figure disclosing the preferred procedures for determination of endogenously generated jad probabilities and the information content of each:

Part 5A disclose preferred data arrangements manipulated to determine jad probabilities and the information content of each.

Parts 5B–5C disclose preferred procedures for manipulating said data elements to determine jad probabilities and the information content of each.

Figure 6A:
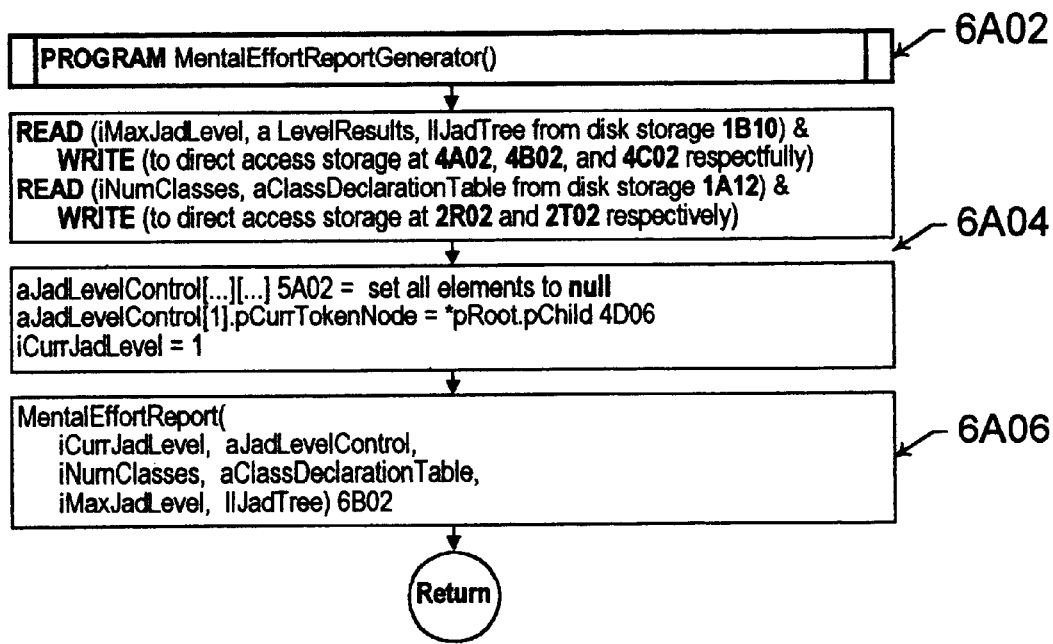
Figure 6B:
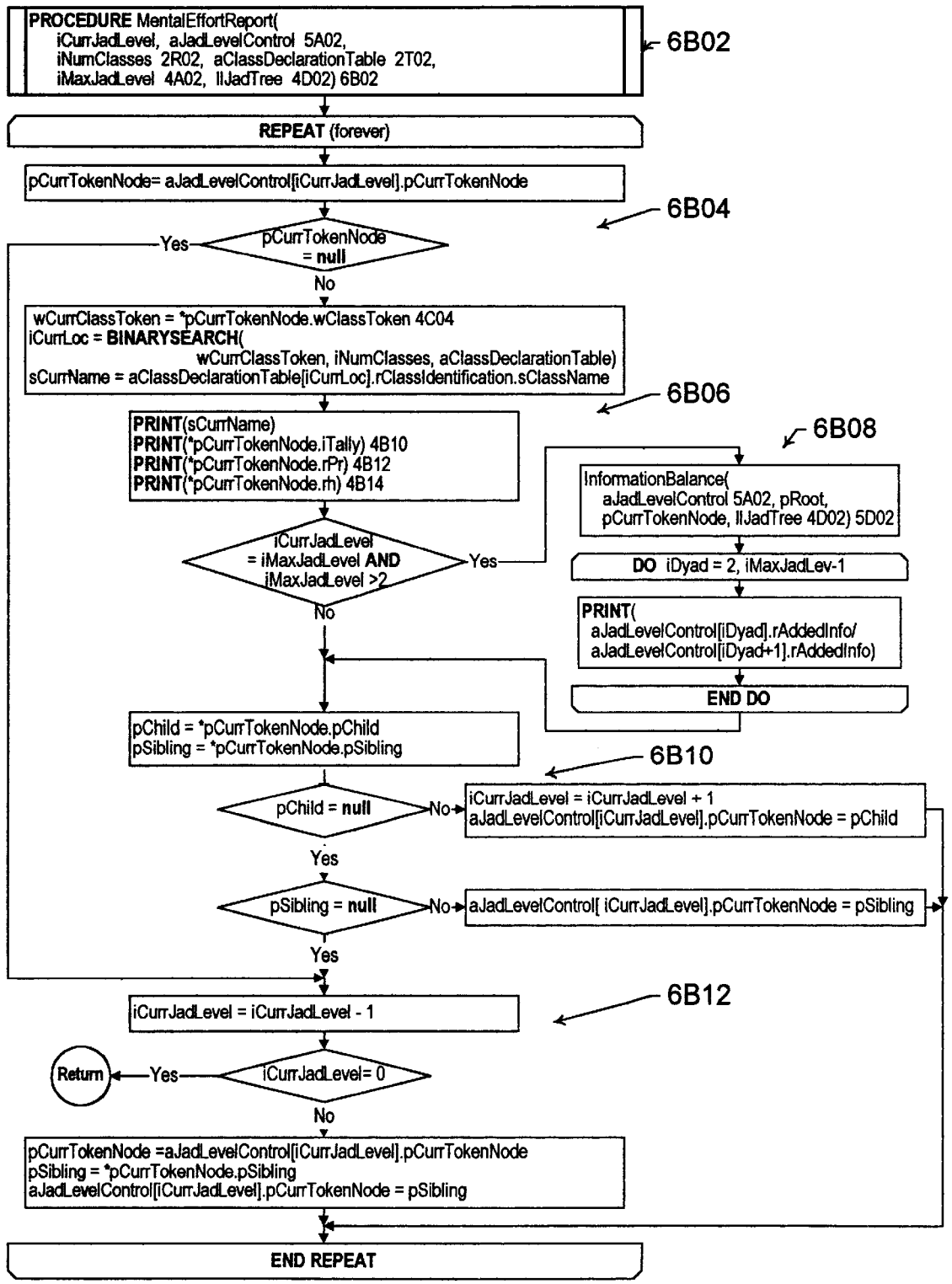
Figure 6C:
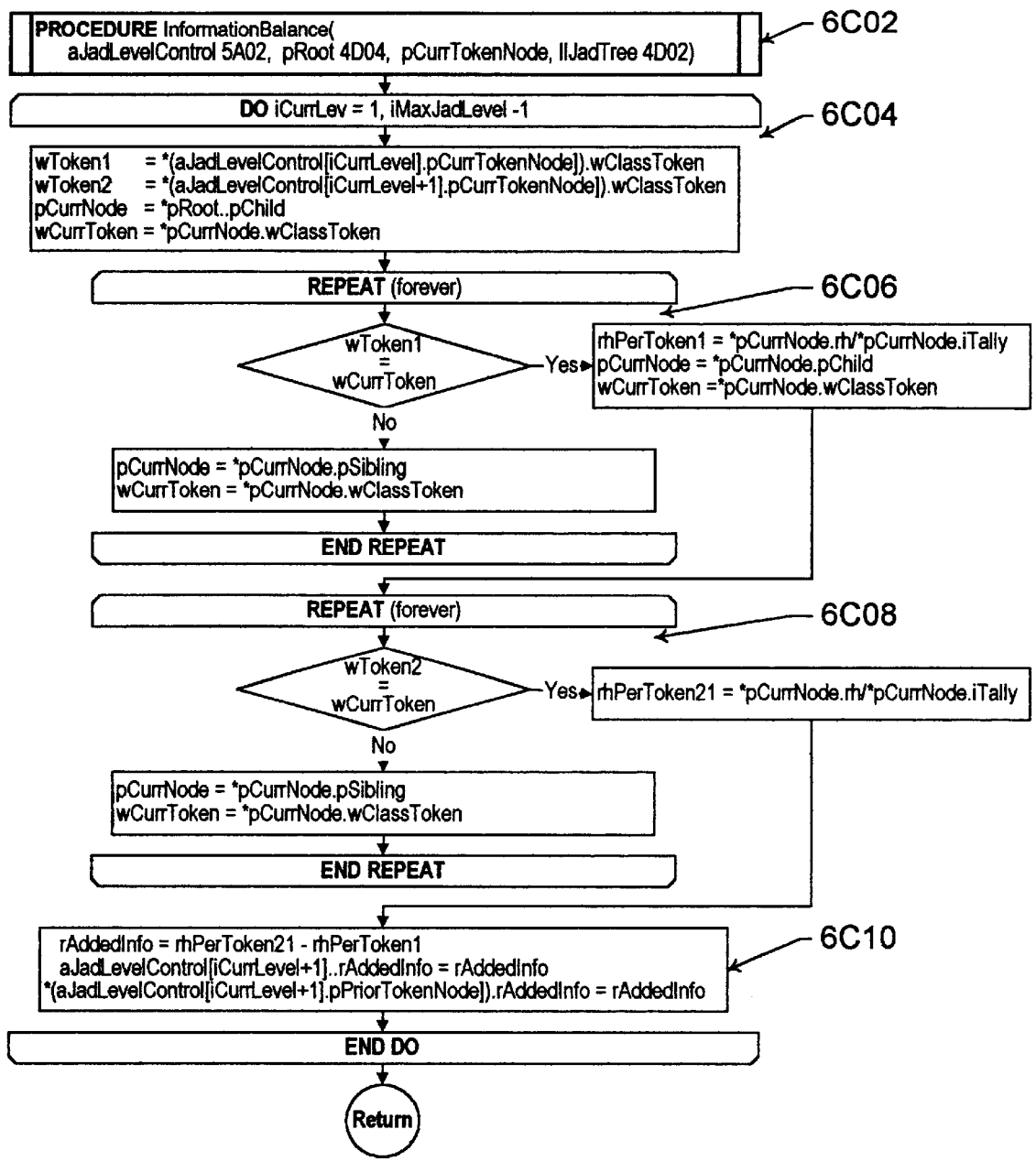

FIG. 6 is a multi-part figure disclosing the preferred procedure for display of the jad tree and redundancy rates of the work session history or derived groupings thereof.

FIG. 7 is a multi-part exemplar illustrating each stage involved in implementation of the invention:

Part 7A is a document presenting the assumptions of the exemplar, specifying the Standard Test Suite, and presenting a partial but sufficient list of Physical Operators provided by the computer-human interface.

Part 7B is a diagram depicting user behavior while performing the Standard Test Suite specified by FIG. 7A.

Part 7C is a table illustrating a work session history and possible groupings resulting from performance of the Standard Test Suite.

Part 7D is a list of classes provided by the software appropriate for performance of the Standard Test Suite.

Part 7E presents four tables illustrating classes that result from successful completion of FIG. 2.

Part 7F presents the computer version of two tables: (1) the physical operator occurrence history, and (2) the task occurrence history derived from the physical operator occurrence history that result from successful completion of FIG. 3.

Part 7G presents jad data structures illustrating: (1) identification and tallying of jads that result from successful completion of FIG. 4 and (2) determination of endogenous probabilities and information content of jads that result from successful completion of FIG. 5. Jad generation is presented for both real world and error free work session histories.

Part 7H is a multi-part figure displaying results of the exemplar for both real world and error free work session histories. Presented are: (1) jad tallies, probabilities, and jad information content, and (2) redundancy levels as would result from successful completion of FIG. 6.

FIG. 8 is a multi-part figure generalizing the jad concept:

Part 8A is a minimal work session history based on a three token set.

Part 8B is a table showing triad generation and related probabilities.

DESCRIPTION OF THE PREFERRED EMBODIMENTS

Foundations to Measurement of the Mental Effort of Computer Usage

Definition of the Work Session and the Work Session History

The present invention presumes that, among other purposes, a computer-human interface exists to transmit data pertinent to the user's goal into the computer, to permit transforms to these data in ways explicitly or implicitly specified by a Requirements Specification, and to manage the appearance of the computer-human interface in a manner to optimize usability. It is also presumed that software evaluations undertaken through utilization of the present invention will employ data which derive from utilizing a computer to attain an explicit or implicit set of goals reflective of typical use of the application software undergoing evaluation. This set of explicit or implicit goals and all materials to which they relate is termed the "Standard Test Suite." The time during which a user performs a Standard Test Suite on the computer while employing a specified software is termed the "Work Session." While exigencies of a particular environment may necessitate additional devices, it is presumed that input-output devices generally available to the user comprise but are not restricted to the keyboard, mouse, trackball, joystick and CRT. These devices encompass the following physical operations: key press, key release, single key stroke, multi-key stroke, cursor move, cursor drag, button click, button double-click, hand-homing, and finger-homing. The "Work Session History" is the chronologic listing of physical signals emitted by the computer input devices in response to operations performed by a user on said input devices during a work session.

These concepts permit a formal definition of the work session. A work session comprises the performance of a set of methods, $M_a$, $1 \leq a \leq b$, which accomplish the sub-goals, $G_i$, $1 \leq i \leq k$, into which the primary goal, P, is decomposed. Performing a method, $M_a$, comprises executing an ordered set of one or more tasks, $T_d$, $1 \leq d \leq e$. Performing each task of a method comprises executing an ordered sequence of one or more physical operations, $O_j \ldots O_f$, that conform to the syntactic rules defined for the software during its design. A work session history thus comprises execution of a temporally ordered sequence of physical operators, $O_1 \ldots O_q$, in which sub-goal 1 is achieved before sub-goal 2, etc., thus:

| P = | $G_1$ | ... | $G_i$ | ... | $G_k$ | (Exp 1) |
| --- | --- | --- | --- | --- | --- | --- |
| → | $M_1$ | ... | $M_a$ | ... | $M_b$ | (Exp 2) |
| → | $T_1$ ... $T_b$ ... $T_d$ | ... | $T_e$ | ... | $T_q$ ... $T_h$ | |
| → | $O_1 ... O_b$ ... $O_d ... O_e$ ... | $O_g ... O_h$ | ... | $O_j ... O_l$ ... | $O_m ... O_n$ ... $O_p ... O_q$ | (Exp 3) |
| → | $E_1 ... E_b$ ... $E_d ... E_e$ ... | $E_g ... E_h$ | ... | $E_j ... E_l$ ... | $E_m ... E_n$ ... $E_p ... E_q$ | (Eq 4) | where:

P the primary goal.

$G_i$ a sub-goal; i.e., a subdivision into which the user devolves P.

$M_a$ a method; i.e., a semantic construct embodying an ordered sequence of task activations that attain a sub-goal.

$T_d$ a task; i.e., a syntactic construct embodying an ordered sequence of physical operator executions that accomplishes one part of a method.

$O_g$ a physical operation; i.e., an action performed on an input device of a general purpose computer mapping physical operation tokens one-to-one or one-to-many with physical signals emitted by the input device in response to said physical operation.

$E_g$ an input device signal; i.e., a unique symbolic code identifying each unique signal or set of signals emitted by a computer input device in response to a physical operation performed by the user.

The present invention proposes to analyze symbol sequences such as but not limited to the work session history expressed by Exp 3 and groupings derived therefrom as illustrated by Exp 1 and Exp 2 to objectively determine the quantity of information transmitted by the user through the input devices of a general purpose computer. Objective quantification of the information content of a work session history or its derivative groupings is accomplished through employment of Information Theory.

Synopsis of Information Theory

Foundations

Shannon and Weaver (*The Mathematical Theory of Communication,* 1949) define the degree of uncertainty with regard to the choice selection from among "n" equally likely, discriminable choices as the minimum number of dichotomous questions that must be asked to be certain of knowing the choice. Shannon shows this minimum number to be $\log_2(n)$. To illustrate, assume a character based CRT screen of 128 columns and 32 rows defines 4096 cells. To communicate an arbitrary cell's columnar location via dichotomous questions, commence by asking: "Is the column greater than 64?" If the answer is yes, ask: "Is the column greater than 96?" If the answer to the first question is no, ask: "is the column greater than 32?" Continuing in this manner removes all uncertainty as to the columnar location of the cell with at most $\log_2(128)=7$ "Yes"/"No" questions. Similarly, at most $\log_2(32)=5$ "Yes"/"No" questions are required to identify the cell's row. Information theory states that all uncertainty regarding the cell's location can be removed by communicating at most 12 "bits" of information.

Shannon's formulation of the information content of a single choice from among independent, equally probable alternatives is:

$$h = \log_2(n) \qquad \text{(Eq 1)}$$

where:

h quantity of information (bits).

n number of independent, equally likely choice alternatives.

With equally probable alternatives the chance of observing a given token during any single choice can be represented as $p=1/n$, allowing the information content of a single choice to be expressed as:

$$h = \log_2\left(\frac{1}{p}\right) \qquad \text{(Eq 2)}$$

With equal probabilities and independence between the n choices, the information transmitted by—or, stated alternatively the average level of uncertainty of—exercising each of these choices one time is:

$$H_0 = h_1 + h_2 + \ldots + h_n$$

Because items are seldom chosen with equal frequency, assume unequal probabilities between alternate choices. Also assume that a large number of trials, n, have been performed and the "$i^{th}$", ($1 \leq i \leq n$), choice has occurred "$n_i$" times where $\Sigma_1^m n_i = n$, giving a probability of occurrence for the "$i^{th}$" choice of:

$$p_i = \frac{n_i}{n} \qquad \text{(Eq 3)}$$

Shannon shows that expected information per token is obtained by weighing information content of individual alternatives by their probability of occurrence, thus:

$$h_i = p_i \log_2\left(\frac{1}{p_i}\right) \qquad \text{(Eq 4)}$$

or when aggregated over all individual tokens $$H_1 = p_1 \log_2\left(\frac{1}{p_1}\right) + p_2 \log_2\left(\frac{1}{p_2}\right) + \ldots + \qquad \text{(Eq 5)}$$

$$p_m \log_2\left(\frac{1}{p_n}\right) = \sum_1^m p_i \log_2\left(\frac{1}{p_i}\right)$$

$$= \sum_1^m p_i \log_2(n) - \sum_1^m p_i \log_2(n_i)$$

$$= \log_2(n) - \sum_1^m p_i \log_2(n_i) \qquad \text{(Eq 6)}$$

$$= \log_2(n) - \frac{1}{n} \sum_1^m n_i \log_2(n_i) \qquad \text{(Eq 7)}$$

Serial Correlation

When contiguous tokens are serially correlated, the quantity of information transferred is not independent of preceding selections. The letter "u" offers an example from the English language. If the choice sequence is "blank", "q", "u", the "u" adds little information since of more than 500 words in an English language that start with "q" only about eleven words that are not abbreviations or proper nouns do not have "u" as the second letter (*Webster's New Universal Unabridged Dictionary*, 1996). Knowledge that "u" follows "q" approximately 99% of the time does not greatly help in predicting the symbol that follows "u." However, the "u" of the triad "blank", "z", "u" notably reduces the uncertainty of the succeeding symbol since a knowledgeable person will realize that the symbol following the "u" must be from the set (c, g, p, r) as this is the set of third letters of generally recognized English words that commence with "zu." Being unusual, "u", in this case removes considerable uncertainty regarding the symbol that follows "u".

To determine the average net information per symbol of serially correlated tokens consider a dyad comprising the arbitrary tokens α and β. When the dyad formed by symbols αβ is considered as a single entity, ω, the following quantity of information is transmitted:

$$H_\omega = \Sigma p_\omega \log_2 \left(\frac{1}{p_\omega}\right)$$

where summation is over all different ω.

Average net information content per symbol of ω is obtained by dividing $H_\omega$ by the number of symbols comprising ω.

Information added by inclusion of β is determined by:

$$H_\beta = H_\omega - H_\alpha$$

Similarly, the information added by inclusion of a $3^{rd}$ token is:

$$H_\gamma = H_{\alpha\beta\gamma} - H_{\alpha\beta}$$

Representing an ordered sequence of "j" tokens as either (j-k)ad or (j)ad [hereafter "jad" when token count is unspecified], depending on context, the proceeding is generalized as:

$$H_j = H[(j)ad] - H[(j-1)ad] \quad (Eq\ 8)$$

Redundancy is defined as the ratio of the quantity of uncertainty removed by inclusion of an additional token to some base quantity of maximal uncertainty. Total redundancy at the jad level is thus calculated by the expression:

$$R = \frac{[H_0 - H(jad)]}{H_0} = 1 - \frac{H(jad)}{H_0} \quad (Eq\ 9)$$

with differential redundancy described between any two levels of the jad, say, the $s^{th}$ and $t^{th}$ levels (s<t) expressed as:

$$R = \frac{[H((s)ad) - H((t)ad)]}{H((s)ad)} = 1 - \frac{H((t)ad)}{H((s)ad)} \quad (Eq\ 10)$$

Empirical evidence exists that shows the presence of redundancy reduces communication error. A Shannon study cited by Attneave (*Applications of Information Theory to Psychology: A Summary of Basic Concepts, Methods, and Results*, 1959, pp. 30–31) instructed subjects to successively guess letters of an English language passage of approximately 75 percent redundancy. Of 102 letters comprising the passage, 79 were guessed correctly on the first attempt. It is noteworthy that of the eight symbols requiring more than five guesses all followed the blank seperating words. Ben-efits of deliberately utilizing redundancy is illustrated by the argot employed by air traffic controllers to minimize error during life-critical decisions. This argot, designed to comprise a limited vocabulary, deliberately incorporates a level of redundancy such that uncertainty of a pending token is reduced to 28 percent of the rate experienced in the absence of redundancy. The implication of these studies to interface design is that increases in redundancy enables users to achieve a higher rate of correctly inferred syntax, thus lowering the error rate when correct syntax is not known.

Information Balance

While "global" redundancy of a work session history has been theoretically and empirically shown to provide benefits of learnability, retainability and reduced error propensity, how "local" redundancy manifests in information content of individual jads can be employed to quantify what will be termed "Information Balance.". Consider a triad composed of serially correlated tokens "ABC" having a known average information content. The relation between dyads comprising the triad can have three basic representations:

Most uncertainty embodied in the token sequence "ABC" relates to understanding that "C" follows "B" with little uncertainty in understanding that "B" follows "A." This is the case illustrated by the English language dyad "qu?" where"?" symbolizes the uncertainty of what follows "u."

Of the uncertainty embodied in the token sequence "ABC" that related to understanding "C" follows "B" is approximate equal the uncertainty related to understanding that "B" follows "A".

Little uncertainty embodied in the token sequence "ABC" relates to understanding that "C" follows "B" with substantial uncertainty in knowing "B" follows "A." This is illustrated by the over 500 English words that start with "z." Only about 9 percent of words starting with "z" have "y" as the second letter. But of the approximately 45 English language words starting with "zy" approximately 43 have either "g" or "m" as the third letter. Thus, most uncertainty related to "z??" usage relates to uncertainty of the second letter and very little to the third letter if the second letter is "y."

Consider any arbitrary triad "ABC" employed to manipulate an interface in which either the "AB" or "BC" dyads embody most of the uncertainty of the triad. This invention posits that an interface with such Information Imbalance will be harder to learn and be more prone to error than an interface having approximately equal division of information between the "AB" and "BC" dyads if the parent triads.

It is considered that "Information Balance" is achieved when dyads formed from consecutive tokens of a jad of arbitrary size possess approximately equal information content; i.e., represent approximately equal levels of uncertainty. To generalize, consider that a jad of arbitrary size formed from serially correlated tokens "abcd . . ." embodies $h_{abcd\ldots}$ bits of information. Eq 8 expresses how to extract information attributable to an additional token given knowledge of the preceding token. Eq 8 can be applied to generate the values required to appraise Information Balance. Eq 11 expresses the ratios involved:

$$\frac{[h(bc) - h(b)]}{[h(ab) - h(a)]} \cong \frac{[h(cd) - h(d)]}{[h(bc) - h(b)]} \cong \ldots \cong 1 \quad (Eq\ 11)$$

While Eq 11 does not offer an objective definition of a desirable range within which a ratio is sufficiently close to unity to be balanced, experience will suggest meaningful bounds. Once identified these bounds can be utilized to flag any jad possessing imbalance.

Information Quantity as an Indicator of Mental Effort

Niven and Gopher (On the Economy of the Human Processing System, *Psychological Review*, 1979, pp. 214–255) show that during performance of activities such as a computer work session individuals, in their own self interest, allocate personal resources to equate the marginal value of each resource expended; i.e., a person allocates resources in a manner to minimize total expenditure of personal effort. It follows, presuming no diminishing returns to personal resource utilization, that if a task can be shown quantitatively to entail twice as much activity as an alternate task that task will require twice the effort to complete. It is therefore concluded that if a means were available to link cognitive resources expended to manipulate a computer interface to the quantity of information transmitted to the computer by that manipulation, a work session that transmits twice the information quantity of another will expend twice the cognitive effort. The Hick-Hyman Law provides this link.

Hick (On the Rate of Gain of Information, *Quarterly Journal of Experimental Psychology*, 1952, pp. 11–26) and Hyman (Stimulus Information as a Determinant of Reaction Time, *Journal of Experimental Psychology*, 1953, pp. 423–432) determined that when selecting one from among multiple choices a person does so in time expressed as a linear function of the information content of the choice set. Their result, the Hick-Hyman Law, is expressed as:

$$T=a+bH \qquad \text{(Eq 12)}$$

where:

T Total time (seconds) to respond to a stimulus.

a Sum of human latencies unrelated to option selection (seconds).

b Time (seconds/bit) required to process one bit of information.

H Information content of the choice set (bit).

Fitts, Peterson, and Wolpe. (Cognitive Aspects of Information Processing: Adjustments to Stimulus Redundancy, *Journal of Experimental Psychology*, 1963, pp. 423–432) experimentally altered the probabilities of stimuli occurrence to show stimuli of low or high probability resulted in selection times of related options to be lower or higher in a manner to fall on the log-linear Hick-Hyman function.

Defining cognitive bandwidth as the reciprocal of "b", Hick concluded that humans process information at an average rate of 6.7 bits per second. After appraising the influence of various factors on bandwidth, Wickens (*Engineering Psychology and Human Performance*, 1984, p. 355) agrees that within a constant level of any practice, repetition, and discriminability the Hick-Hyman law is valid. Card, et al.(op. cit. p. 27) also accept the validity of Hick-Hyman but contend various factors disallow considering 6.7 bits per second as definitive. Olson and Nilson (Analysis of the Cognition Involved in Spreadsheet Interaction, *Human Computer Interaction*, 1988, pp. 309–350) concluded, during a study based on the Hick-Hyman Law, that complex computer applications exemplified by Lotus 1-2-3 evidence bandwidth values for choice responses that exceed 6.7 bits per second. Successful application of this invention is not influenced by uncertainty regarding human cognitive bandwidth since the focus is wholly with the information content, h and H, as defined above. While cognitive resources may process information at differential rates depending on characteristics of the real world activity being appraised, this invention performs analysis on data derived from sets of work session histories derived from a common Standard Test Suite for which "b" can be presumed constant.

By consolidating the above referenced ideas it has been shown that the quantity of information (measured in bits) transmitted through input devices of a general purpose computer can be used as an objective, quantitative surrogate directly proportional to the mental effort expended by a person to accomplish a specified task during a computer work session. To recapitulate, Niven and Gopher show that persons minimize their individual effort to accomplish a set goal. Thus, if a technique to quantify cognitive effort expended were available, a task that measures twice the "cognitive units" as another, this task represents two times the expenditure of the person's resources. Hick-Hyman shows the time resource consumed, a resource conserved by workers facing a set task, is directly proportional to $\log_2$ of the number of choices a person must cognitively decide between; a relation also empirically shown to hold with unequal probability choice selection. With latencies of option response presumed given in a specified Test Suite and "b" shown not relevant to any given Standard Test Suite, cognitive load will be directly proportional to "H". Finally, it has been shown that Shannon's Information Theory can be applied to quantify the information content of signals emitted by computer input devices during manipulations that accomplish a set goal represented by the Standard Test Suite. Finally, it has also been shown how serial correlation between contiguous symbols can represent a means for investigating the learnability, retainability, and propensity for error of manipulating a computer interface given the semantics and syntax designed into a computer-human interface by software developers.

Considerations of the Application of Information Theory to CHI Analysis

The mental effort expended to perform CHI manipulation is embodied in activities a user performs during a work session. To illustrate, assume a work session generates the fourteen token work session history "MMPRMPMRM-MPRPR" from the token set (M, P, R); where M, P, and R are tokens that denote "cursor move", "button press", and "button release" respectively. If this sequence were appraised at the triad level, the leftmost triad of the illustrative work session history is "MMP", the next leftmost "MPR", the third "PRM", etc. When expressed in a manner conducive to human comprehension the triad "MPR" expresses a mouse move followed by mouse click while "PMR" expresses a button press, a mouse move, and release of the button; i.e., a drag. When the work session history is appraised at the dyad level the leftmost dyad is "MM", the next dyad is "MP", etc. The sequence of monad tokens is simply the work session history itself; i.e., "M", "M", "P", etc.

While not representative of any actual application, FIG. 8 illustrates several aspects of jad management influencing analysis of a work session history for information content. The 27 possible triads of the token set token set (M, P, R) are displayed by column 8B02 of FIG. 8. The number of occurrences of each triad present in the work session history 8A02 appear as entries in the column labeled "$n_{TT}$" of FIG. 8B. The probability of an arbitrary triad, say 8B02, is the quotient 8B06 resulting from division of the number of occurrences of the triad 8B04 by the total number of triads 8B12 present in work session history 8A02. Equivalent information showing the identity, number of occurrences of each, and the probability of occurrence for each dyad and monad of work session history 8A02 appear in FIG. 8B as columns 8B08 and 8B10 respectively. Although alternate methods for tallying the (j–1)ads, the (j–2)ads, . . . , and the (1)ads will generally be employed, FIG. 8B is presented in a manner to show that tallies for the lower level (j–k)ads, j>k>0, requires only that tallies at the highest jad level be determined by reference to the work session history. FIG. 8B conveys how (J–1)ad tallies are obtained by summation of appropriate subsets of jad tallies with (j–2)ad tallies obtained by summation of (j–1)ad tallies. This technique readily extends to jads of larger size.

An implication of FIG. 8B is that the number of jads encountered might be very large for large token sets since the number of jads possible from "k" tokens not exceeding size "n" is $k^n + k^{n-1} + \ldots k^1$. Excluding targetable GUI objects and key-equivalent codes, the PC keyboard in conjunction with the two button mouse typically presents 103 tokens. This token set can generate approximately $103^4 + 103^3 + 103^2 + 103^1 \approx 1.1 \times 10^8$ jads at the four token level. Similarly, this token set can generate approximately $1.1 \times 10^6$, $1.1 \times 10^4$ and $10^2$ triads, dyads, and monads respectively. Generation of tokens from GUI targets extends these numbers substantially. If these numbers reflect the quantity of jads actually manipulated, a CHI analysis would be impractical either because the quantity of data required to ascertain the jad probabilities would be unattainable and/or the value of computer resources expended to perform the analysis would exceed benefits of the analysis.

However, FIG. 8B conveys that a work session history will generate many fewer jads than the maximum number possible. Several reasons explain this: (1) a jad may be logically impossible; i.e., RMR, PP and RR; (2) a jad may be undesirable; i.e., MMM, (3) a jad may be unemployed by the application; i.e., MRP. When considering actual applications a "General Function" key followed by "Del" or a "Shift" followed by "CapsLock" lock are illogical. Contiguous clicks of different mouse buttons, multi-keys that incorporate special function keys with mouse buttons, inclusion of "Del" in command sequences are also illogical. Additionally, the "hand home" and "finger home" tokens need not be entered into the token set since occurrence of hand and finger homing can be inferred from knowledge of the current hand/finger location and the target being acquired. Of perhaps greater relevance is that designers knowledgeable in the arts of human factors will seek to design an interface having a modest jad set as it is generally appreciated that this enhances usability.

Exemplar Uses of the Information Content of a Work Session History

Preliminary Considerations

Exp 1, Exp 2, and Exp 3 represent widely recognized ways the current art categorizes user activity during a work session. Since programs to capture or generate these symbol sequences do not entail new art, their rendering is not here presented. Presented instead are preferred procedures for analyzing the varied symbolic representations of the work session history for information content; an art not heretofore suggested by those experienced in the arts of analyzing a CHI for cognitive load.

While a work session to which this invention is applied can entail any arbitrary set of activity, the preferred implementation proposes that a "Standard Test Suit" be developed that specifies the activities of a work session in a manner to simulate typical use of the application software in a normal production environment. Given that humans are prone to error, performance of any specified Standard Test Suite will generate a work session history with at least the following anomalies:

Slip Error: Error occasioned by inadvertent performance of one or more inappropriate physical operations when the correct activity is known. Slip error commonly appears as immediate cancellation of the erroneous physical operations with rapid execution of the appropriate physical operations.

Mistake Error: Error caused by not knowing the syntax appropriate to achieving the next desired activity. Mistake error commonly leads to activation of the HELP system, consultation with a colleague, or by "guessing" the appropriate method based on the user's mental model of the application software. Mistake error commonly appears as protracted delay and several activity sequences that fail to advance the Standard Test Suite.

Browsing: The deliberate execution of methods not directly leading to attainment of the current subgoal. Browsing is commonly undertaken when the user does not know correct syntax and finds application syntax inadequately consistent to permit a reasoned guess.

It is possible to infer an error free performance of the Standard Test Suite. By comparing actual user activity recorded by the work session history against methods appropriate for performance of the Standard Test Suite it is possible to identify and tag anomalous user actions. Logic and art not relevant to disclosure of this invention permit classification of such anomalous activity into but not limited to the categories of slip error, mistake error, HELP reference, browsing.

It is also to be appreciated that a work session can be performed by expert and non-expert users and that irrespective of the skill level, all users can evidence any of the above noted error behavior. The following typology of work session histories can prove beneficial to furthering any evaluation involving application of this invention:

Real-World Work Session History: A work session history inclusive of error performed by a user of arbitrary skill.

Typical Work Session History: A work session history inclusive of error performed by a user of typical skill.

Typical Error-Free Work Session History: A work session history exclusive of error performed by a user of typical skill.

Expert Work Session History: A work session history inclusive of error performed by an expert user.

Expert Error-Free Work Session History: A work session history exclusive of error performed by an expert user.

As will become apparent, the concept of top-down devolution of the primary goal into methods, tasks, and physical operations utilized in conjunction with generation of error and real-world versus error-free work session histories permit those of normal skill to envisage many and diverse ways to measure the mental effort expended while manipulating a CHI. The following present schemata for applying the invention to the three application categories introduced in Prior Art:

Evaluation of Proposed Computer-Human Interfaces

Designers are able to conceptualize many CHI that are "useful;" i.e., CHI that enable users to perform these activities. Since not all proposed CHI are equally "usable," it is desirable to have design tools that assist identification of the most usable from the plurality of proposed useful CHI. By providing an objective quantitative measure of the mental effort expended to manage a CHI, this invention provides a tool that can: (1) identify from among a set of proposed CHI that CHI requiring least mental effort to perform normal activity, (2) identify those commands of the proposed command set likely to prove difficult to learn and retain, and (3) identify those commands of the proposed command set likely to generate user error. Employing the invention in this capacity proceeds by inferring the probable sequence GOMS methods executed to perform the Standard Test Suite; one such method sequence to be inferred for each proposed CHI.

While other approaches will be apparent to others of appropriate skill that lie within the scope of this patent's application, software can be written by those of requisite skill utilizing my "Interface Grammar" patent application (Title "Method to Access the Physical Effort to Acquire Physical Targets", Ser. No. 08/991,480 Divisional Submitted Dec. 16, 1997) to generate the sequence of physical operations that would be executed during actual execution of each inferred method sequence. The Interface Grammar provides a set of notation and a syntax that enable an interface designer to infer a likely work session history. The approach is to identify the each Method and related Tasks implicit in activation of each data defining and data transforming function possible using a proposed interface. The Interface Grammar enables the defining of each Method and related tasks. A work session is inferred for a predefined Standard Test Suite by anticipating the expected order in which the set of sub-goal will be attained if the Standard Test Suite were actually performed. The designer considers each sub-goal in turn, selects that Method felt most desirable for its achievement, and employs the Interface Grammar to succinctly express the Method selected and its parameters. Once the complete set of ordered Methods have been expressed via the Interface Grammar these methods are parsed by appropriate software and tokens generated that represent signals the computer input devices would emit if the proposed interface existed and employed to perform the Standard Test Suite. This output from the expansion of Methods into inferred signals will represent the Work Session History this invention utilizes as the token sequence analyzed for information content.

Analysis of the information content of each such inferred work session history can be obtained by implementing Eq 3 and Eq 5 or their variants, Eq 9 or its variants and Eq 11. When appraised solely by cognitive criteria, the Payne and Green studies suggest most desirable of the proposed CHI will be that CHI evidencing the highest redundancy rate with, ideally, the lowest total information load. A refinement employs the present invention to analyze levels of mental effort expended in conjunction with my Physical Effort Metric (Title "Method to Access the Physical Effort to Acquire Physical Targets", Ser. No. 08/641,230 Submitted Apr. 30, 1996) to ascertain physical effort expended. The ideal CHI from a set of proposed CHI would be that CHI incurring low mental effort but high redundancy while also incurring low physical effort to accomplish the Standard Test Suite.

Evaluation of Extant Computer-Human Interfaces

The present invention permits objective, quantitative comparisons between equally functional software to ascertain the mental effort expended to accomplish a set of stipulated activities on each. This is accomplished by subjecting each software product evaluated to a Standard Test Suite representative of typical usage, capture the work session histories of each, and apply the present invention to objectively quantify the mental effort expended. Based on these results reports can be generated that detail mental effort expended then apply measures of redundancy and information balance to appraise productivity, ease of learning, expected retention, and likely error sources.

Evaluation of Personnel

The invention provides a non-invasive way to appraise whether a user productively employs specified software. An evaluation commences with an individual performing the Standard Test Suite. Analysis then entails: (1) categorize the work session history into methods and scan for spurious methods unrelated to the next sub-goal, (2) categorize the work session history into tasks and scan for task activations that are not part of a method, and (3) directly scan the work session history to identify error patterns indicative of slip error. Next, perform an information content analysis for real-world jads and for no-error jads as detailed below. The difference between these two analyses represents the amount of information transmitted during performance of error activity. Form the ratio between error information and total information of the user's Typical Work Session History. Users possessing detailed knowledge of software semantics and syntax and manipulate the interface accurately will be those users with the lowest ratio of "Error Information" to "Total Information" when compared to a worker cohort of typical skill. If it is desired to appraise whether the most knowledgeable users identified by the preceding are truly knowledgeable, ascertain the ratio of "Error Information" to "Total Information" for known expert users and employ the expert's ratio as a basis for comparison. If an accounting of the value of a unit of production in the application domain represented by the Standard Test Suite has been performed, the preceding comparison of typical and expert user will permit a benefit-cost analysis of computer training programs.

Consideration for Implementation of the Invention

Implementation of this invention generally involves performance of appropriate computer procedures. For the purpose of this invention a computer procedure is perceived by those familiar with the computing arts as a self-consistent sequence of steps isomorphic to steps implicit in the mathematical formalisms that quantify the information transmitted into the computer during a work session. Accomplishing individual steps of a procedure presumes manipulation of magnetic signals within the computer which allocates storage, initiates location transfer, and performs arithmetic and logical manipulation. To communicate these processes it is usual, though not necessarily required, that the unique internal arrangements of signals which identify interface manipulations be expressed in terms which reflect human perceptions of purposes served by performance of these manipulations. It is appreciated that whereas this terminology permits those experienced in the interface art to communicate between themselves, as implemented by the present invention these terms are only labels convenient to humans to represent unique physical quantities actually existing within the mediums of the computer.

Further, terms implied and employed by these procedures relate to mathematical and computer manipulations commonly performed by humans of requisite skill. Realization of such capability by a human is not implied, nor generally desirable, during the actualization of the invention which is expected to be performed by computer operations directed by procedures implicit to the preferred implementation presented below. To those experienced in the programming arts, the manner of accomplishing any particular manipulation will not ordinarily be unique. Thus, it is contemplated that many changes and modifications may be made to the preferred implementation of the invention by one of ordinary skill in the art without departing from the spirit and scope of the invention.

Notation and Nomenclature

In the following disclosures, numerous details are presented that employ mathematical and computational arts which can be more readily comprehended through employment of definitions and nomenclature pertinent to the present invention. It is to be recognized that certain mathematical formulations and computational procedures not explicitly detailed are present by implication to those skilled in the requisite arts. Additionally, it is apparent to those skilled in these arts that the present invention may be described utilizing different notation without these specific details.

To aid understanding of these disclosures the following notational conventions are observed. Names presumed reserved for exclusive use by the programming environment in which the invention is rendered appear in bold, capital script. Names assigned to identify data areas in computer memory are alphabetic strings. Each such data name comprises one or more lowercase letters identifying the type of data stored prefixed to one or more words or abbreviations descriptive of the content of the memory area. The preffixed symbols are notated as:

a→array
b→Boolean
bit→bit string
i→integer value
ll→linked list
p→pointer
*p→data area referenced by "p"
r→real or record (context dependent)
w→four byte computer word When compound words or abbreviations are employed to name a data area the strings comprising these components are concatenated with the first letter of each component capitalized.

Some of the data areas defined are identically formatted with identification differentiated by a single letter as exemplified by "aVWord", "aNWord", and "aQWord". When all such array data areas are to be referenced the notation a{V&N&Q}Word is employed.

When all elements of an array are referenced the notation employed for the array index is [ . . . ]; i.e., as in aThisArray[ . . . ]

Consider a data array comprising elements formatted in the style known as a record in programming languages. Consider also that one element of each such record is an array of integers. The following illustrates referencing: aBigArray[m].rRecord.aIntegerArray[n]. This example shows referencing of an integer value contained within the $n^{th}$ element of the aIntegerArray which is an element of rRecord which, in turn, is the $m^{th}$ element of aBigArray.

Overview to the Activities Performed by the Preferred Implementation

The present invention does not encompass techniques for capture of computer events resulting from user actions performed on computer input devices during a work session. Additionally, the present invention does not presume specific techniques for categorization of a work session history (i.e. Exp 4) into groupings of events that represent occurrences of the task classes (i.e. Exp 2) or the further grouping of tasks into method classes (i.e. Exp 1). The present invention, instead, pertains to determination of the information content of any ordered sequence of symbols representative of any conceptually relevant activity sequence performed on a computer. To this end, this invention presents procedures that: (1) generate a unique name for each relevant sequence comprising one or more elements of the work session or groupings derived therefrom, (2) generate a unique token for each aforementioned unique name and assign the appropriate token to each individual name of such an ordered sequence, (3) specify revision of class tokens to assure that ascending order of the token values creates the same ordering as ascending order of names, (4) identify each unique jad up to and including a user specified size, (5) tally the occurrences of each said jad, (6) determine the probability of the occurrence of each said jad, (7) determine the information content of each jad suggested by but not confined to: (a) total information quantity, (b) average information embodied per jad, (c) redundancy rate of the analyzed symbol string, and (d) information balance.

Considerations of Assigning Unique Names to Unique Symbols

The following introduces the preferred approach to the generation of names that enhance communication between persons implementing this invention. Although the naming procedure presented is illustrated with examples derived from the GOMS conceptual framework, this does not imply these procedures are applicable only to event categorizations subsumed by the GOMS model.

While alternate approaches will be apparent to those skilled in the arts, this invention assigns to each such different event classification a unique name formed from the concatenation of three text strings; each text string selected to suggest one cognitive aspect of the classification. Specifically, it is posited that every relevant classification entails performing a particular activity that can be described by an appropriate verb on some artifact stored within the computer that, in turn, can be described by an appropriate noun. It is finally posited that since said action performed on said object can generally be performed in different ways the verb-noun descriptor can be refined by assigning an appropriate qualifier suggestive of the particular approach to achieving the action of the target.

To illustrate within the GOMS paradigm, text strings for the verb and noun component of a method's name can generally be identified by reference to documentation accompanying the software. Thus, the primary goal of writing a professional paper might contain the sub-goal of setting margins. Well designed software documentation will have a section headed with a phrase such as "Adjusting Margins and Indentations". Possible verbs suggestive of the sub-goal's activity might be "Adjust" or "Set" with a suggestive noun for the target being "Margin." Documentation relating to "Set Margin" will detail various ways to achieve the "SetMargin" sub-goal. For "SetMargine" suggestive qualifiers might be to set the margin "byRuler" or "byMenu" or "byIcon. Application of this naming convention might thus generate the following unique text strings to describe three specific methods with which users can achieve the set margin sub-goal: "SetMarginbyRuler", "SetMarginebyMenu" and "SetMarginbyIcon."

Assigning names to the physical operations, as denoted in Exp 3 by $O_1 \ldots O_p$, performed on the input devices of a general purpose computer is a variant of the above approach. Input mechanisms can be: (1) hardware as exemplified by but not constrained to keyboard, mouse, track ball or light pen, or (2) GUI depictions detailed but not limited to those presented in Richard Simon ("Chapter 1: Windows 95 Programming", *Windows* 95: *WIN* 32 *Programming API Bible: Book* 1. 1996). Each individual physical operation entails performing some type of "motion" that can be described by an appropriate verb upon some "Interface Component" of the computer-human interface identified by an appropriate noun to attain a specific "Target" that can be described by an appropriate qualifier. While not constrained to actual hardware devices or GUI abstractions provided by the GUI accompanying any particular computer and its operating system, the verb and noun components of the physical operator name can generally be identified by direct reference to the computer's input capabilities. Examples of meaningful physical operator names are "MoveCursortoCutIcon", "StrokeKey_Delete", "StrokeKey_a", and "HomeHandtoMouse".

Considerations of Assigning a Unique Token to Unique Name

Computer manipulations undertaken to determine the information content of a symbol sequence are more efficiently performed using short, uniform length tokens generated from the unique name assigned to each of the plurality of event categorizations. To this end this invention ascribes a unique binary string to the "verb", "noun", and "qualifier" components comprising a unique name. Bit manipulation with the "OR" instruction available to most programming languages allows generation of a bit pattern in fixed length storage area that uniquely identifies each different unique name. A goal of this "OR" manipulation is to generate a token set in which all tokens are of equal but minimum length subject to the storage allocated being an even number of computer bytes. Those skilled in the art will appreciate that the number of bits minimally required for such said tokens is $\Sigma[TRUNC(\log 2(m_j)+1]$ where TRUNC denotes truncation, "$m_j$" the number different component names for each of the "j" components where "j" is "verb", "noun" and "qualifier" respectively. For the typical application system it is generally possible to express these tokens in a 32 bit computer word Considerations of the Identification of Jads Determination of the information content of a token sequence entails tallying each different jad of length 1, 2, . . . , "n" present in said token sequence. The preferred means for accomplishing this is via a tree data structure in which, with exceptions related to initiating the structure, the path length from level 1 node to a leaf is the number of tokens in the jad of maximum size. In this structure the most recently executed token of the jad is located in level 1 with the token most remote time being the jad's leaf. Contained within the nodes of this structure will be elements necessary for determination of the jad tally, probability and, eventually, information content for the jad of the size represented by path length from level 1 to the level of the current node.

Approaches to the Determination of the Set of Token Probabilities

Implementation of Eq 3 through Eq 11 presumes that users possess: (1) appropriate knowledge of the Problem Domain served by the application software, (2) appropriate knowledge of the application software with which the Problem Domain is to be manipulated and (3) skill with use of a computers input devices. When these conditions are satisfied jad probabilities can be determined based on data not influenced by transient behaviors that alter as the users acquire knowledge of the software and the Problem Domain in which the Standard Work Session is performed. While alternate approaches to the determination of the $Pr_i$ set can be conceived by those of appropriate skill, the present invention proposes two approaches.

Exogenous Determination of $Pr_i$: The set of $Pr_i$ can be determined from an extensive, sample of actual work requirement unrelated to data produced by the work session history. In consultation with persons experienced in performing the sample work requirement in its actual production environment identify the individual sub-goals that achieve the work requirement and arrange them in the likely order of performance. Based on the listing of sub-goals identify a GOMS method for accomplishing each sub-goal. The recommended approach to method selection is to initially identify a Generic Method; i.e., the method set identified by the "verb+noun" name components only, appropriate for attaining each sub-goal. To achieve each goal in optimal fashion review the Specific Methods; i.e., the identification of individual methods from the generic set by the "Qualifier" name component, subsumed by a Generic Method and identify the specific method most appropriate for each possible computer state (cursor location, hand position, target visibility, etc.) faced during performance of the sample of work. This is accomplished by consulting knowledgable users to solicit their opinion regarding which specific method is optimal for each computer state. From these consultations construct the sequence of specific methods that would likely be employed while undertaking the example of work requirement.

To generate the actual jad probabilities employ my Interface Grammar to express the sequence of specific methods developed above. It is presumed a computer program exists capable of expanding the method sequence expressed in the Interface Grammar into the set of Physical Operator activations the Interface Grammar is designed to emulate. The output produced by the Interface Grammar is the physical operator stream depicted by Exp 3. Employ the present invention to process this physical operator stream using categorizations in the manner relevant to the actual analysis being performed. The preferred means by which to accomplish this is presented in FIG. 5 detailed below.

Endogenous Determination of $P_i$: The $Pr_i$ set can be developed by processing work session histories in the manner suggested by FIG. 8B, detailed by FIG. 4 and FIG. 6, and illustrated by FIG. 7. To be valid, this approach requires that work session histories be obtained from a sufficient number of users that idiosyncratic activity of a single user does not adversely effect the set of $Pr_i$ values.

EXAMPLE OF A PREFERRED IMPLEMENTATION OF THE INVENTION

The following initially notes the two data sets which an application of the invention presumes are made available by means not integral to the invention. There follows a brief overview of the stages completed during analysis. Because the actualization of this invention involves several stages an exemplar accompanying the preferred implementation is introduced. The final section discloses the preferred implementation of this invention.

Preparatory Activities

The basic data analyzed by this invention—the work session history resulting from performance of the Standard Test Suite—is presumed to be acquired by mechanisms not pertinent to this invention as these mechanisms do not entail skills beyond those normal to practitioners of the requisite arts. The work session history, once acquired, comprises an ordered sequence of symbols with at least one symbol for each signal emitted by a computer input device in response to user actions on those input devices. To differentiate between the work session history and any subsequent classifications developed therefrom the more general term Event Occurrence History 1B02 will be utilized. For purposes of this invention an event will be considered to be any symbol denoting a signal or signals emitted by the input devices of a general purpose computer in response to one user physical operation or any derived configuration of such signals as exemplified by, but not limited to Tasks and Methods. The chronologically ordered sequence of events resulting from performance the Standard Test Suite are stored to disk in the Event Occurrence History 1B02 file of a general purpose computer. The format of elements in 1B02 may or may not be easily comprehension by a human observer.

Activities preparatory to applying the invention requires that, as a minimum, the each different event present in 1B02 be identified and stored in the Event Type Table 1A02 file. The techniques employed to acquire 1A02 are not relevant to the disclosure of this invention even though elements of the 1A02 may directly derive from a prior application of the invention. To elaborate based on the GOMS model, analysis of the information content of tasks present in 1B02 is based on analysis of the signals emitted from input devices. The physical operators employed for such analysis directly describe the different signals emitted by said input devices and are thus exogenous to invention. However, if methods are analyzed for information content the Event Type Table 1A02 will usually derive from the set of different tasks declared during a prior application of the invention.

Exemplar to Communicate Application of the Preferred Implementation

Figure 7B:
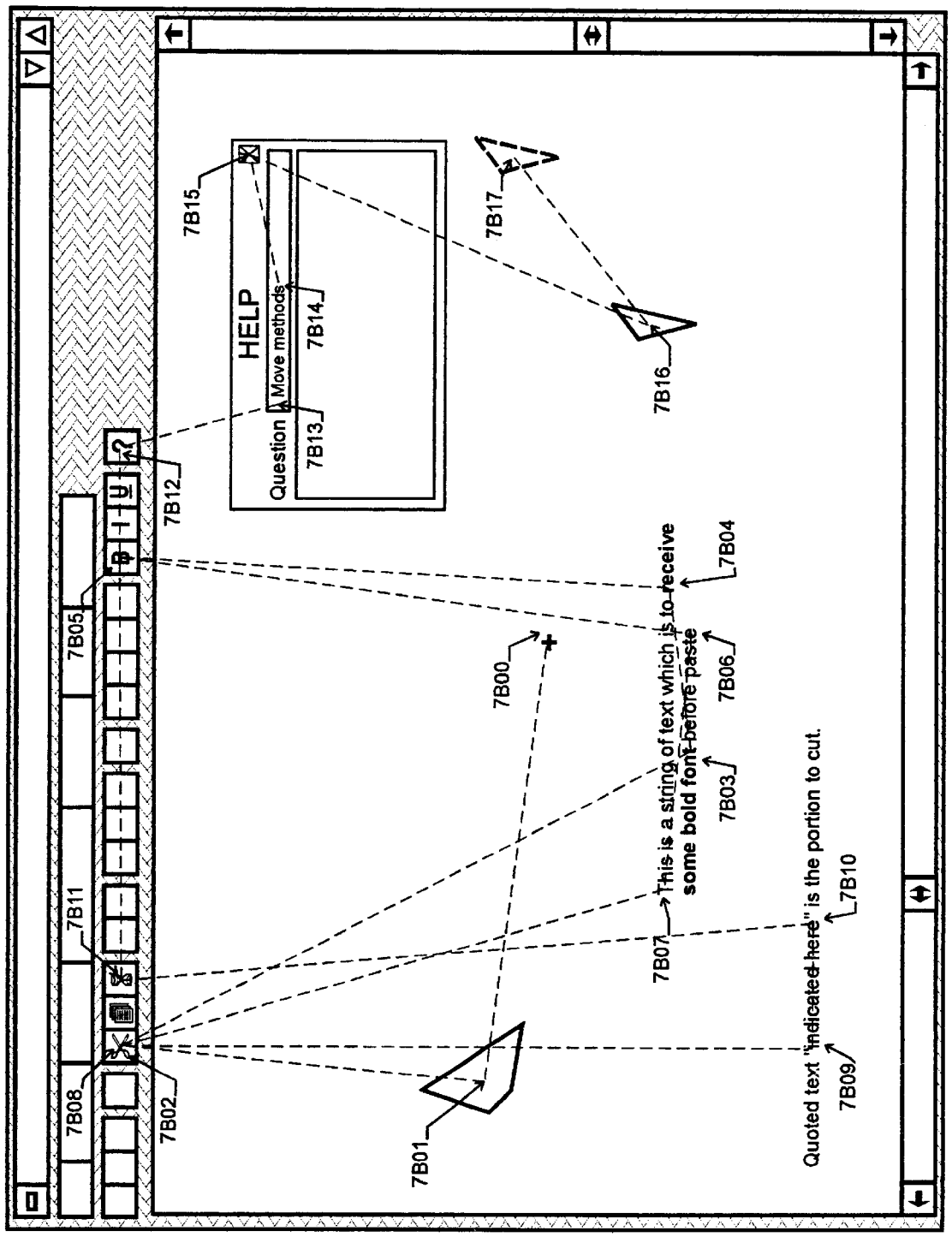

FIG. 7 presents a contrived but extensive exemplar employing the preferred implementation presented below to ascertain the information content of a work session history. The "Assumptions" section of FIG. 7A specifies the sequence of user activity appropriate to performance of the standard test suite as detailed by "Specifications of the Standard Test Suite" of FIG. 7A. A likely sequence of user activity while performing the standard is pictorially presented by FIG. 7B with the resulting sequence of events emitted by the input devices presented in human comprehensible form by FIG. 7C. Note the column "Physical Operator Events" of FIG. 7C contains only entries made available by the the aEventTypeTable of FIG. 7A. The Task Occurrence column categorizes the physical operator events and is the focus of the exemplar's analysis. The Method Occurrence column, while not analyzed by the exemplar, is presented to illustrate the further categorization from the physical operator level suggested by the semantic level of GOMS while also conveying the analytical equivalence to the task analysis the exemplar illustrates.

It will become obvious that analyzing information content of a work session in the manner of the preferred implementation entails numerous data structures and extensive data manipulation. It is the intent of the remainder of this exemplar to help elucidate these data structures and manipulations. FIGS. 7D–7H will be referenced frequently during the following disclosures to illustrate actual results of the preferred implementation.

Disclosure of the Preferred Implementation

Figure 1:
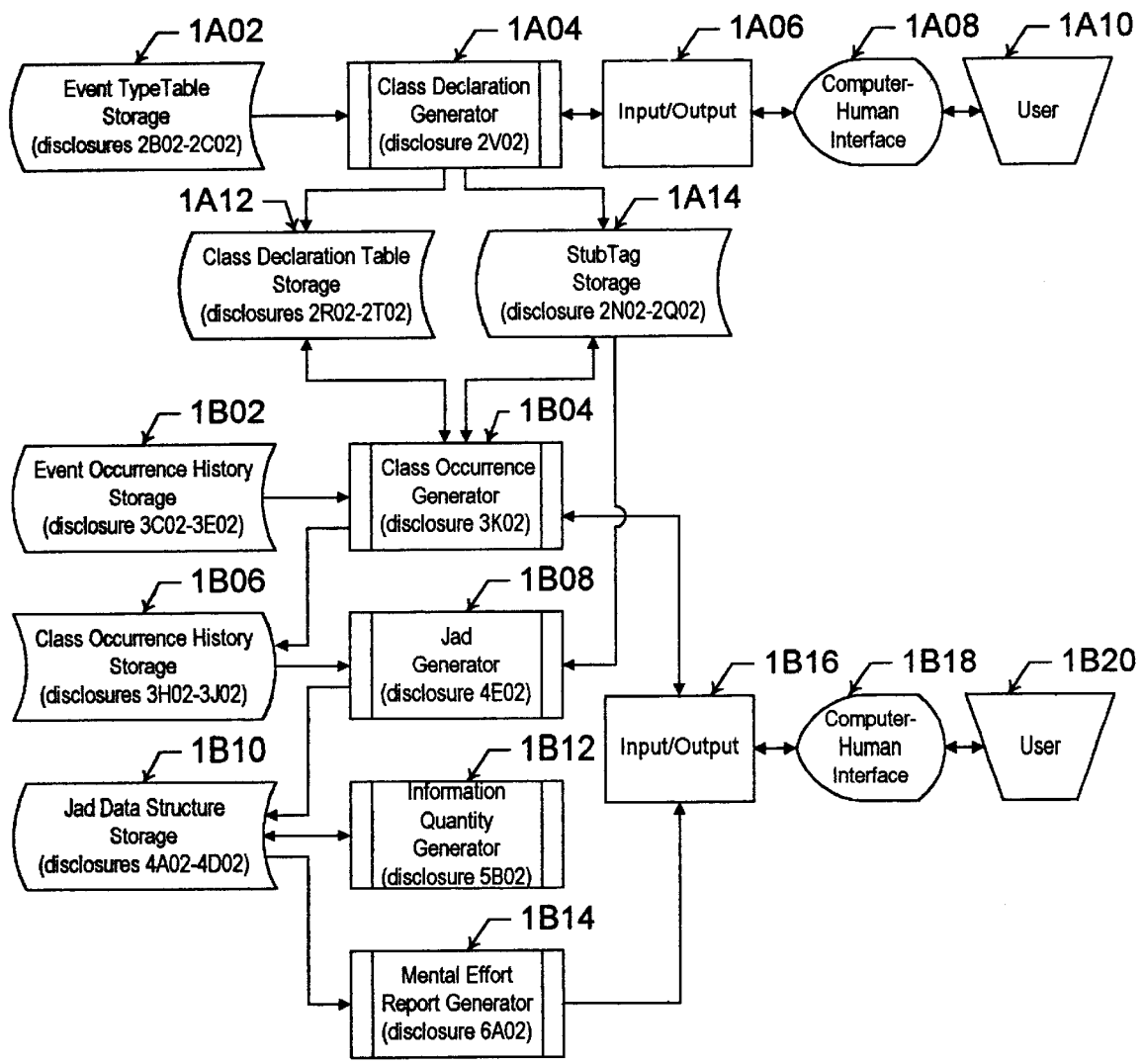
FIG. 1 is the primary diagram disclosing the overall apparatus and logic flow of the invention.
Figure 2A:
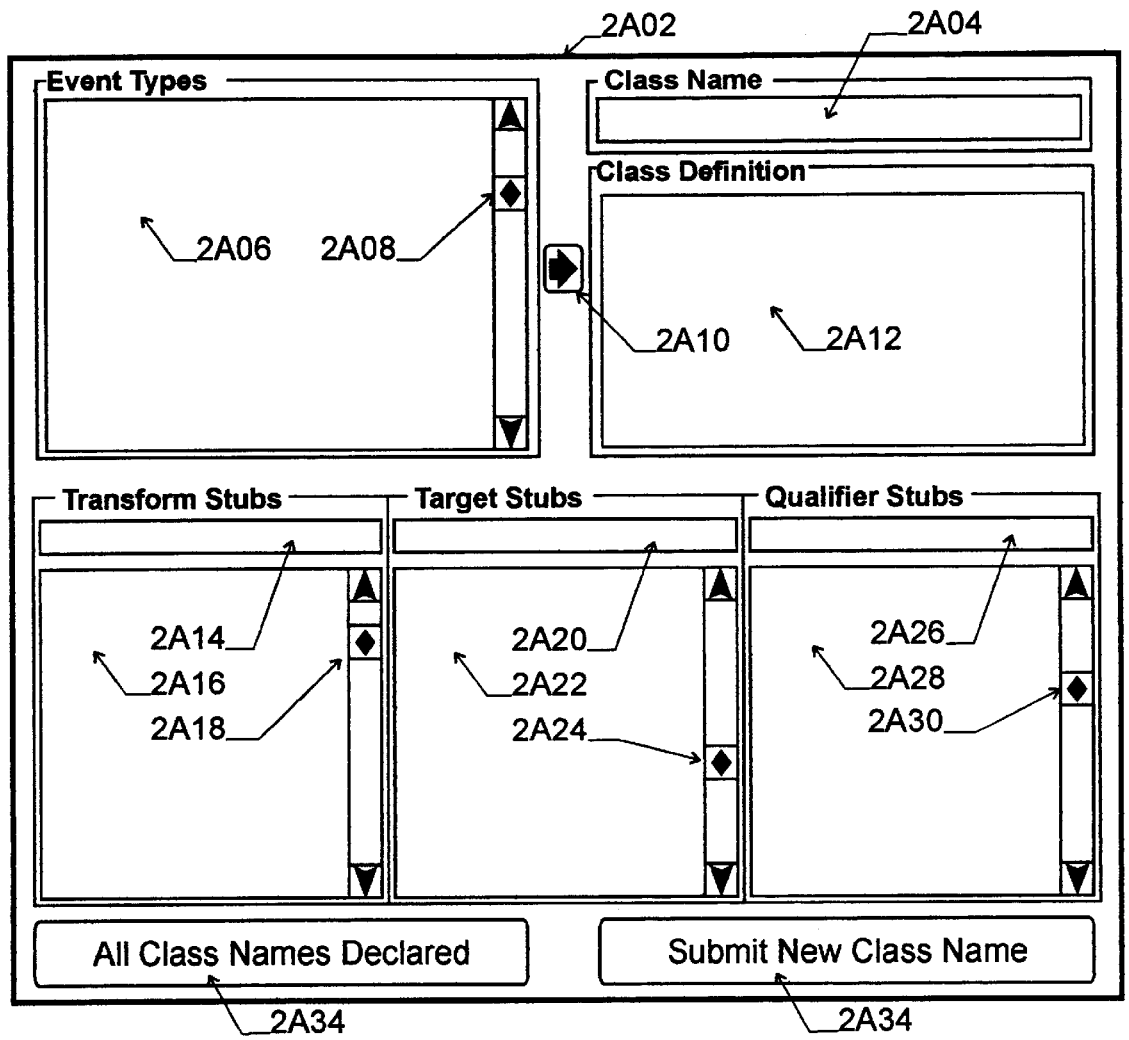
FIG. 2 is a multi-part figure disclosing the preferred procedure for generating class names and tokens from an event list.
Figure 2K:
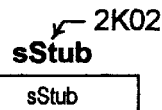
Figure 2L:
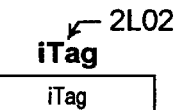
Figure 2M:
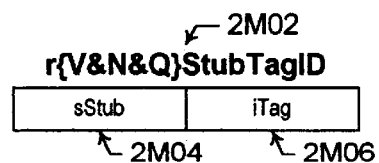
Figure 2N:
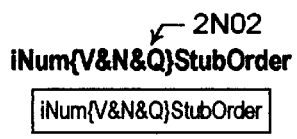
Figure 2P:
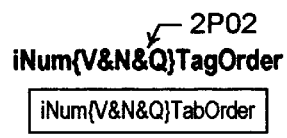
Figure 2O:
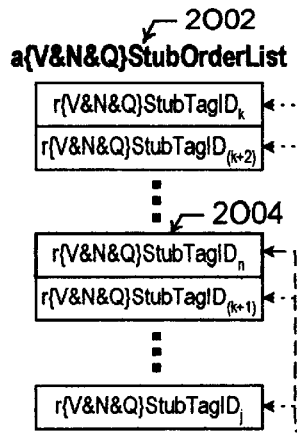
Figure 2Q:
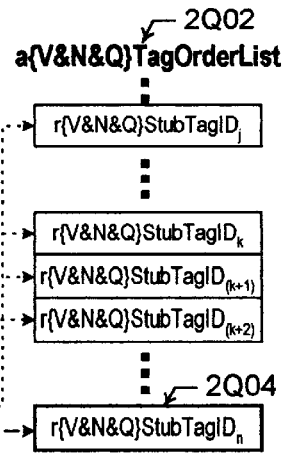
Figure 2R:
Figure 2T:
Figure 2S:
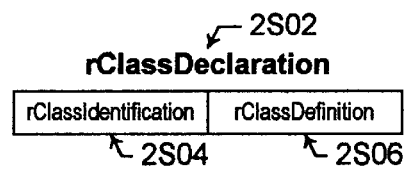
Figure 2U:
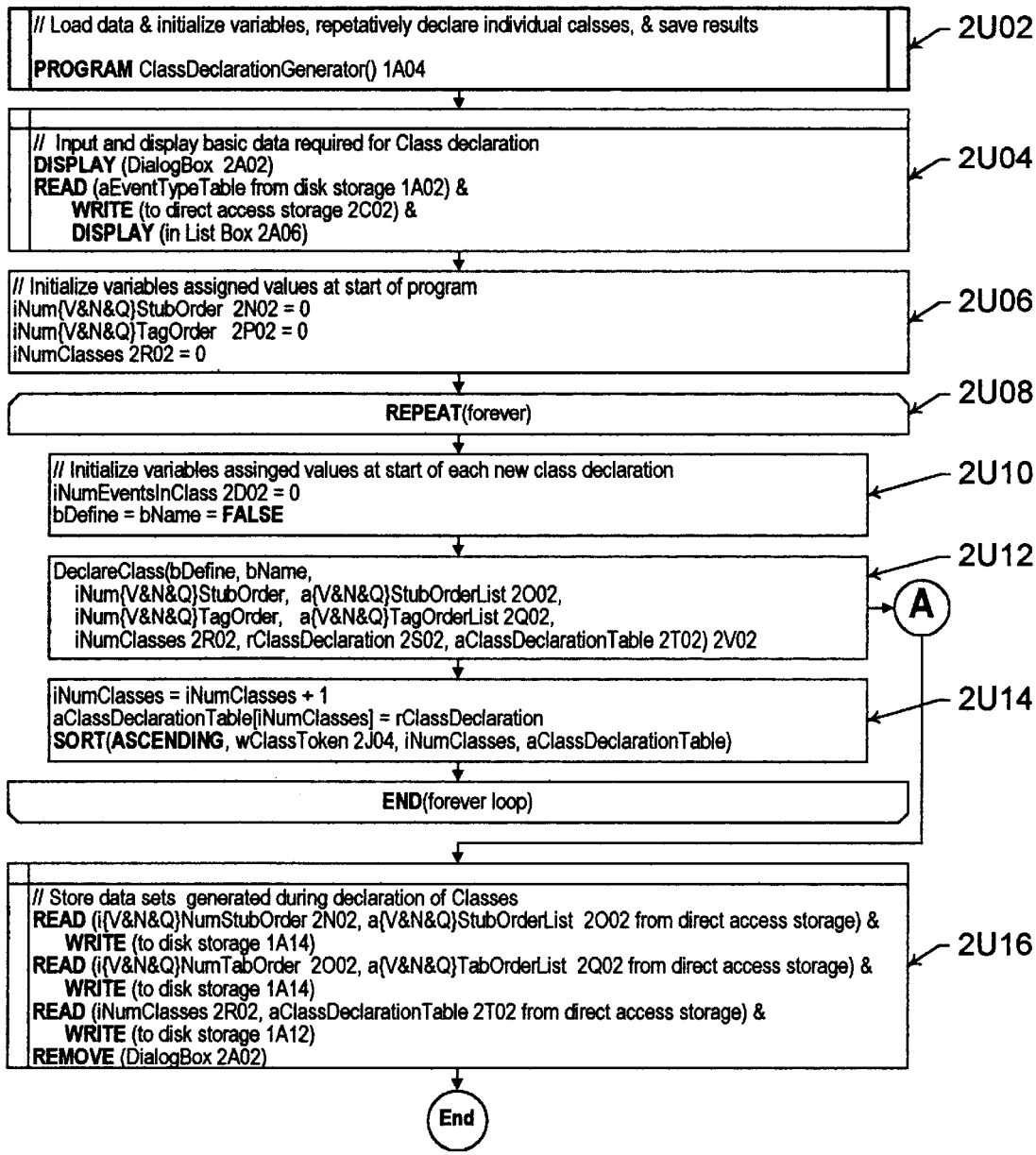
Figure 2V:
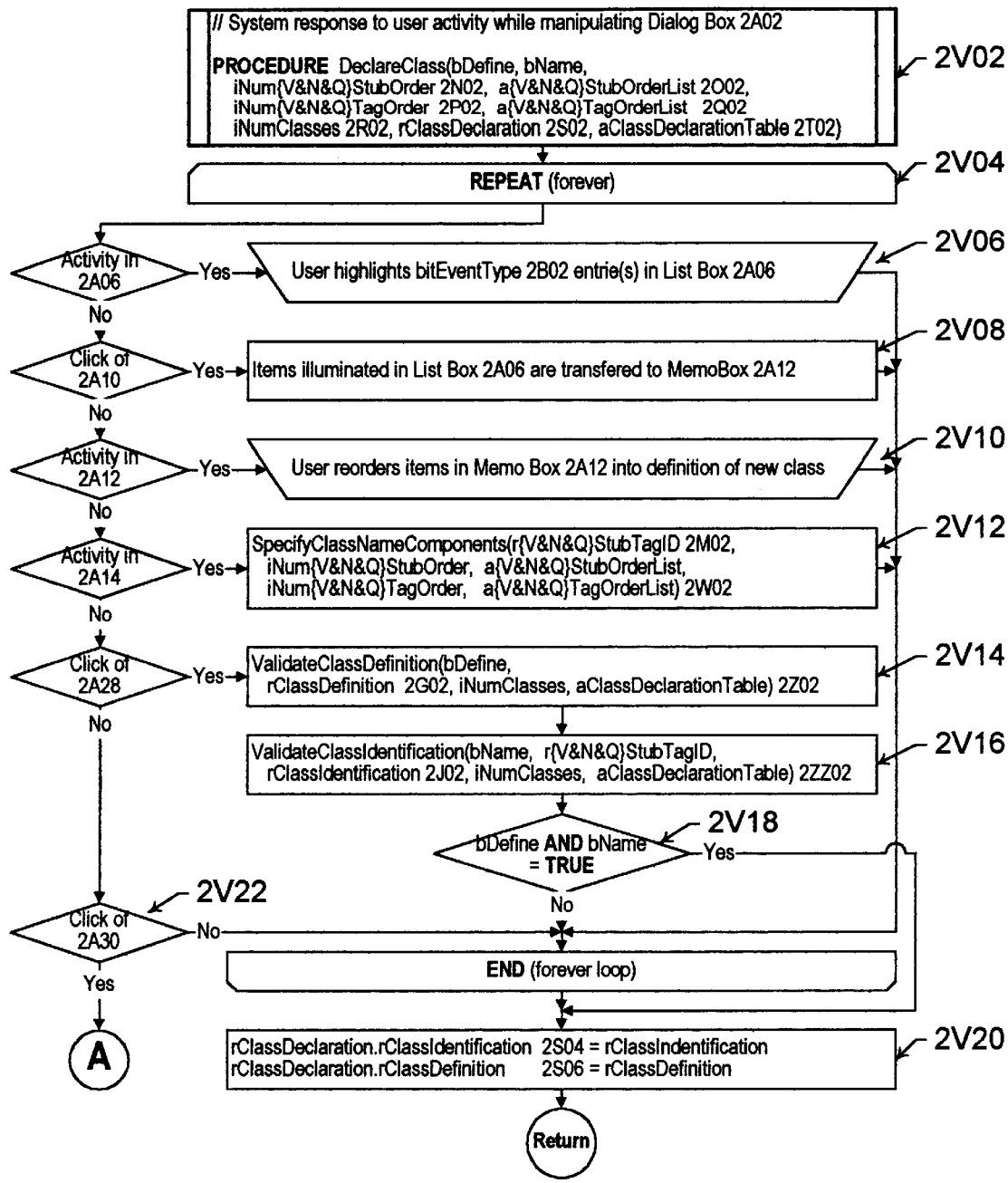
Figure 2W:
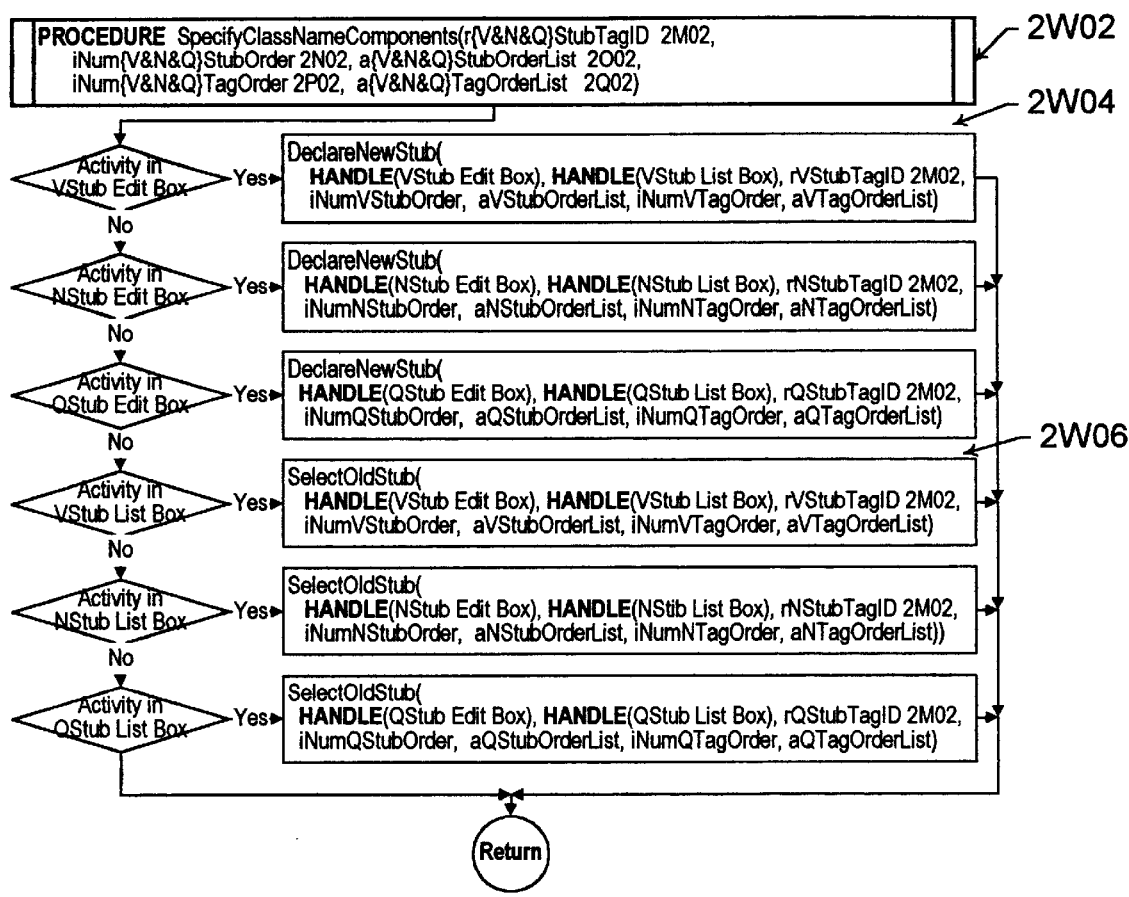
Figure 2X:
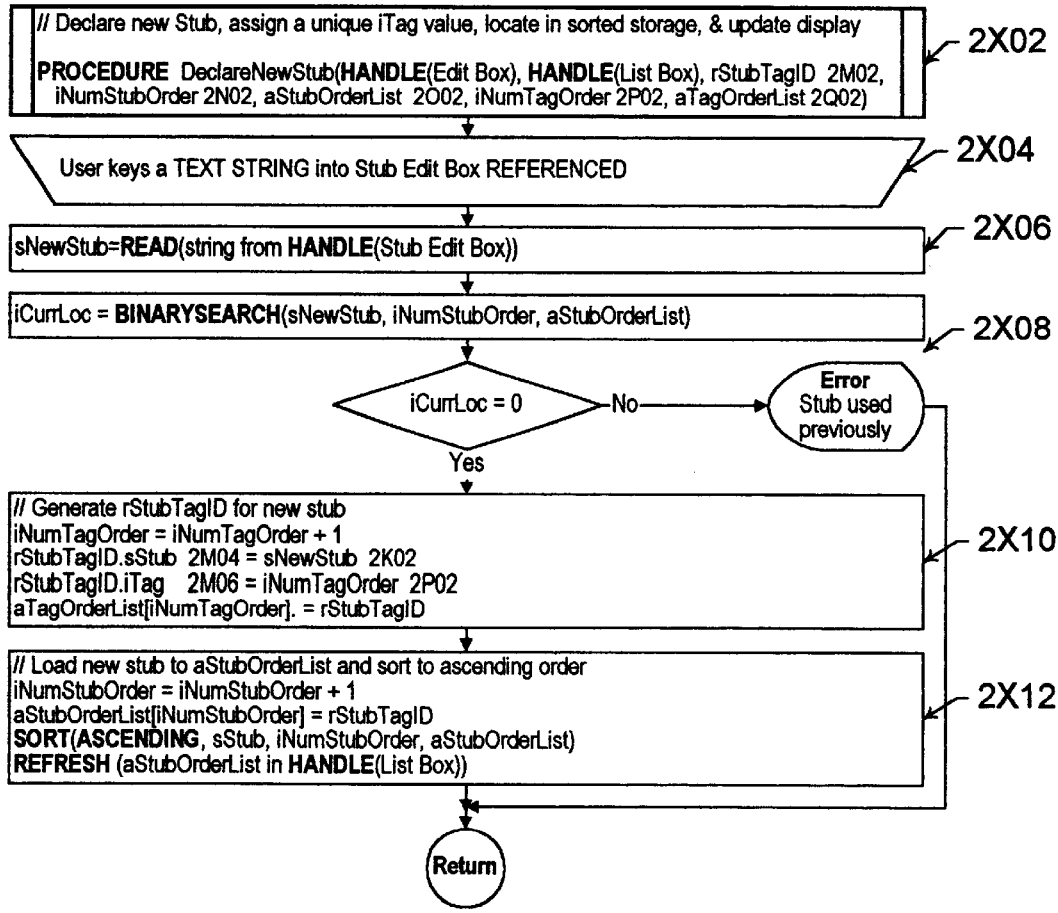
Figure 2Y:
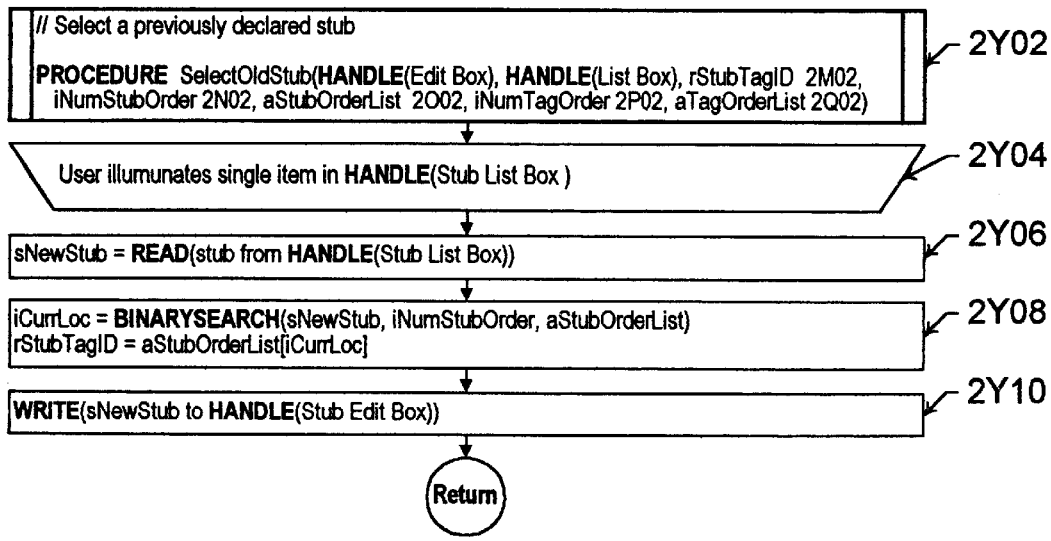
Figure 2Z:
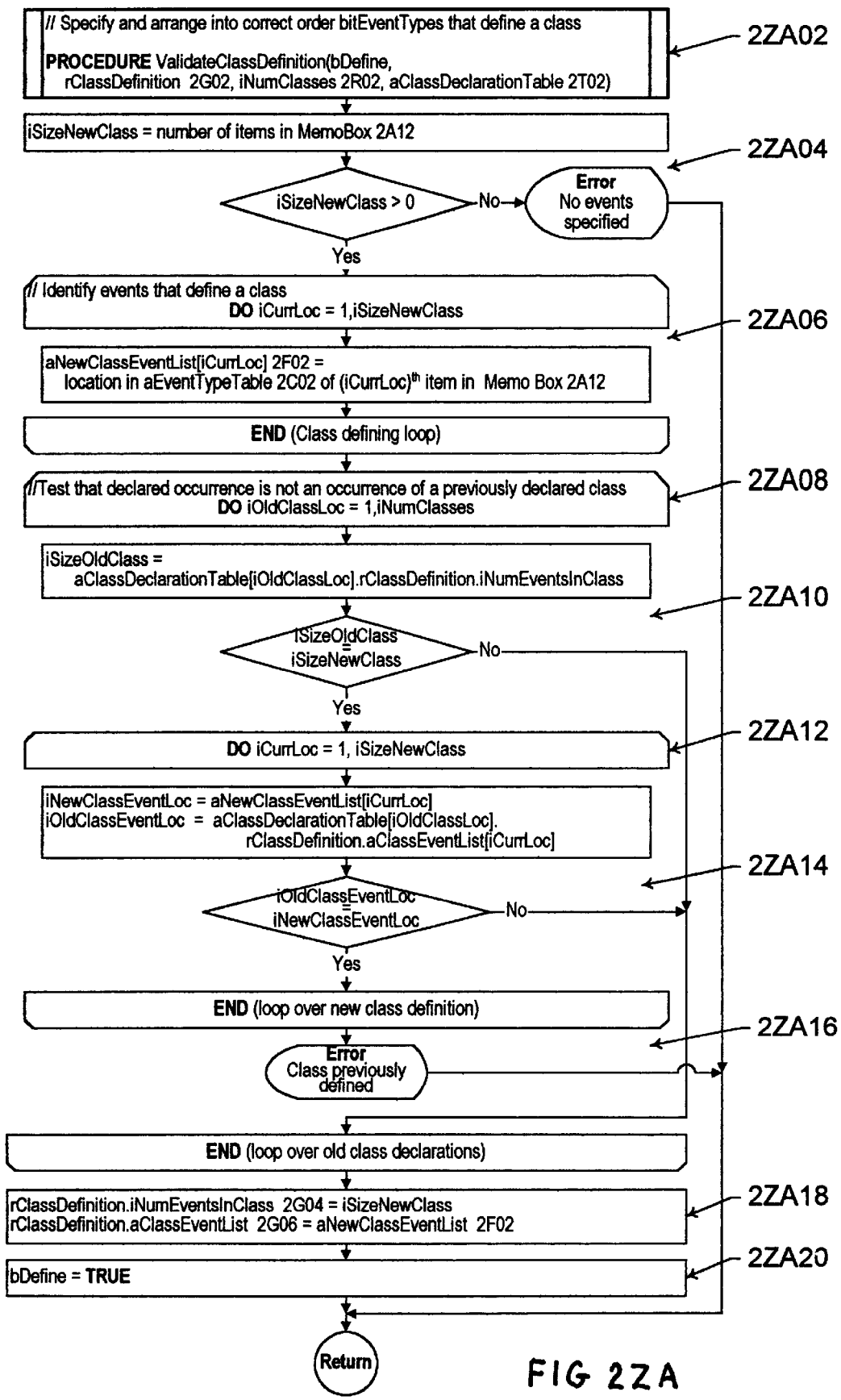
Figure 2Z:
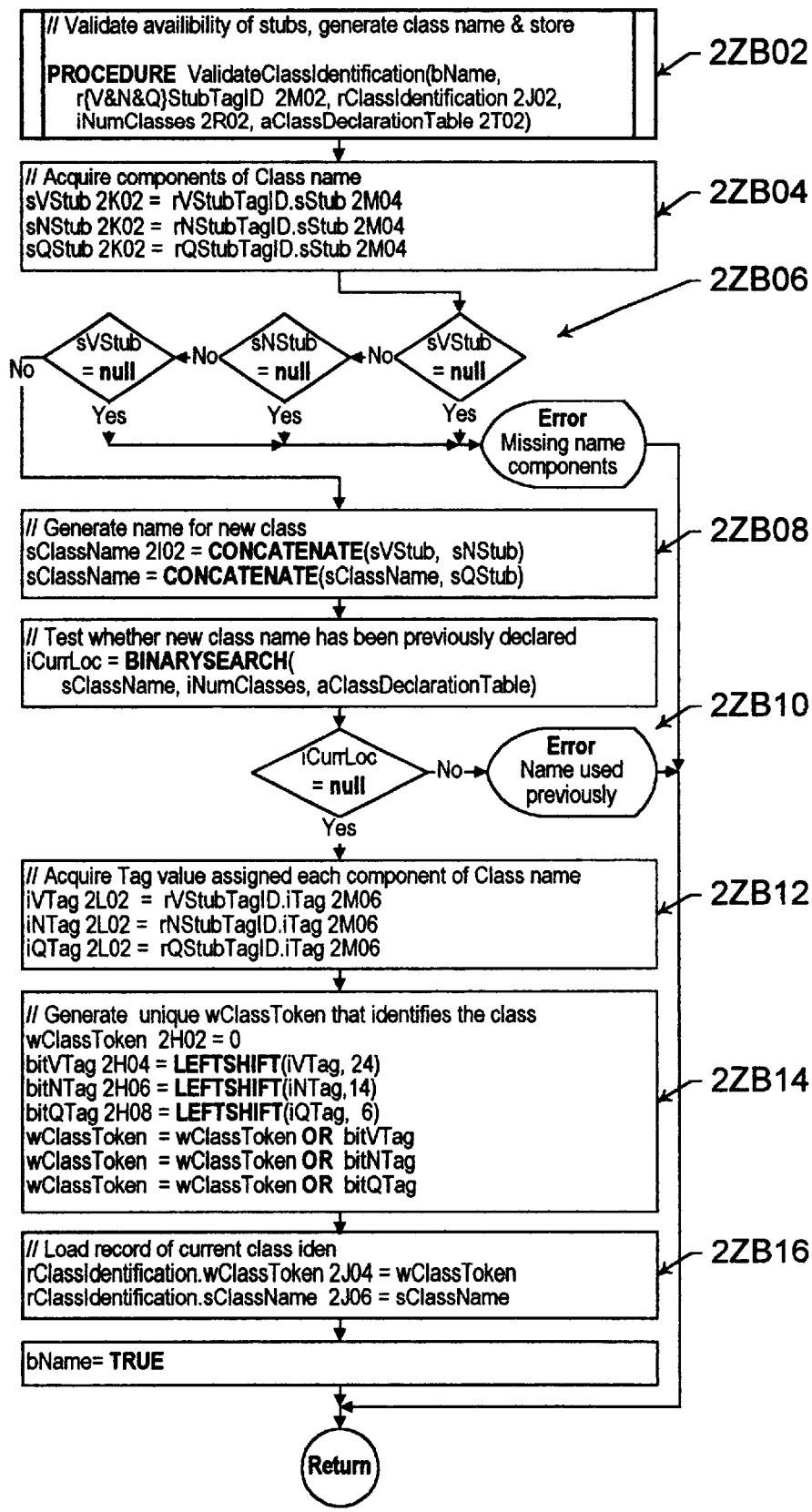

I. FIG. 1: Primary Figure

This figure discloses overall data management and manipulation required to identify that computer-human interface from among the plurality of proposed or extant computer-human interfaces requiring least cognitive activity to manipulate; in particular it FIG. 1 provides:

A. Disclosure: Declaration of Classes (1A02–1A14)

These processes detail the preferred methods for declaring the set of classes into which occurrences of said event types are categorized by the software under evaluation.

B. Disclosure: Declaration of Class Occurrences (1B02–1B06, 1B16–1B20)

These processes detail: (1) the preferred methods for uniquely identifying of each occurrence of a class present in the Event Occurrence History and (2) for conversion the initial class token identifiers into values that aid comprehensibility of displayed results. Any error present within these class occurrences is identified in a manner to make it available for later analysis.

C. Disclosure: Identification and Tally of Jads (1B10–1B12)

These processes detail the preferred method for uniquely identifying each different jad present in the Event Occurrence History and the methods for tallying the number of occurrences of each either inclusive or exclusive of error events.

D. Disclosure: Generation of the Jad Probability Set (1B10–1B12)

These processes detail the preferred methods for obtaining the probability of occurrence of each jad present within the Event Occurrence History: one disclosure to provide jad probabilities from data of the Event Occurrence History data; an alternate disclosure to provide jad probabilities from information exogenous to Event Occurrence History data.

E. Disclosure: Determination of Information Content (1B10, 1B12)

These processes detail the preferred methods for objectively determining a quantitative measure of the information content embodied within a Event Occurrence History.

F. Disclosure: Generation of Reports of Information Content of Computer Usage (1B10, 1B14–1B20)

These processes detail the preferred methods for rendering jads and their related data into a display conducive to human comprehension.

II. FIG. 2: Declaration of New Classes

This figure discloses the preferred structure and initialization of requisite data areas, the preferred means for managing the specification of class definitions, the specification of class identification, the validation of preceding said definition and identification specifications, and the storage of resulting class data.

A. FIG. 2U

This figure details the preferred method for the initialization of data areas, the managing of class definition and identification, and the storage of resulting class definitions.

1. GUI description and initialization of data areas:
   a) Process 2U04:
     (1) Display Dialog Box 2A02 to expedite user declaration of classes.
     (2) Read the aEventTypeTable 1A02 and store to direct access storage at location 2C02. In the exemplar the "aEventTypeTable" of FIG. 7A presents a humanly comprehensible display of this table.
     (3) Make the list of event types visually available to the user by displaying aEventTypeTable 2C02 in List Box 2A06 of Dialog 2A02.
   b) Process 2U06:
     (1) Perform the once-only initialization to zero of iNum{V&N&Q}StubOrder 2N02 and iNum{V&N&Q}TagOrder 2P02. It is noted that disclosure of the invention can be accomplished without the presence of the iNum{V&N&Q}TagOrder 2P02 and a{V&N&Q}StubOrderList 2Q02 data structures. It will be apparent to those of requisite knowledge that the full benefit of these structures relates to editing and deleting activities; activities necessary for implementation of the invention but extraneous to disclosure of the invention.

2. Class declaration entails: (1) defining the class; i.e., specifying the events and their order and (2) identifying the class; i.e., specifying a textual identifier conducive to human comprehension and a numeric identifier conducive to cost-effective computer processing:

a) Process 2U08: The user enters an endless loop which is exited only by explicit click of button 2A30. While in this loop the user is able to declare an arbitrary number of classes in an arbitrary order. Each successful completion of this loop results in declaration of one class. Non-successful activity within a loop results in display of appropriate error messages that solicit corrective action.

b) Process 2U10: Initialize those data areas storing values that require initialization for each class declared:
      (1) The class event count iNumEventsInClass 2D02 is set to 0.
      (2) The temporary Boolean variables bDefine and bName, which communicate specification successes, are initialized to FALSE.

c) Process 2U12: Initiates processes that guide the user through declaration of a new class. Detail is provided by FIG. 2V below.

d) Process 2U14: Upon successful specification of the definition and identification of a new class, data specifying the new class are loaded to direct access storage at aClassDeclarationTable 2T02. 2T02 is next sorted to ascending order by wClassToken 2J04, an element of rClassIdentification 2J02 which is an element of a record of 2T02.

3. Store data of a class:

a) Process 2U16: The user indicates that class declarations are complete by a click of button 2A30:
      (1) Read the data structures i{V&N&Q}NumStubOrder 2N02 and I{V&N&Q}StubOrderList 2O02 from direct access and write to disk storage at 1A14.
      (2) Read the data structures i{V&N&Q}NumTagOrder 2P02 and I{V&N&Q}TagOrderList 2Q02 from direct access and write to disk at 1A14
      (3) Read iNumClasses 2R02 and aClassDeclarationTable 2T02 from direct access and write them to disk storage at 1A12.

B. FIG. 2V

This figure details the preferred method to support user activity while manipulating Dialog 2A02. Class declaration data are prepared for permanent storage before returning to Process 2U14.

1. Initiate class declaration loop:

a) Process 2V04: The user enters a loop which is exited only by successful declaration of a class. While in this loop the user submits specifications of a class in arbitrary order.

2. Specify a class definition:

a) User Activity 2V06: User enters List Box 2A06 and clicks one or more bitEventType 2B02 elements of the aEventTypeTable 2C02 displayed therein. As needed the user utilizes the Scroll Button 2A08 to display additional 2C02 elements. In the exemplar consider the Task declared in row 4 of aTaskDeclarationTable of FIG. 7E. The user would commence task definition by illuminating, in any order, the Physical Operators 7, 8, 9, 10 of the aEventTypeTable of FIG. 7A, then click 2A10 to display physical operators 7, 8, 9, and 10 in 2A12.

b) Process 2V08: After all 2B02 items required for the class definition have been selected the user clicks Button 2A10. All selected items of 2A06 are displayed in 2A12.

c) User Activity 2V10: As required the user reorders items in 2A12 to that order which completes the definition of the new class. In the exemplar, this reordering is shown in the aTaskEventList of aTaskDeclarationTable which shows the physical operator locational identifiers reordered to 8, 9, 7, 10.

3. Specify a class identification:

a) User Activity 2V12: User enters any Edit Box or List Box of 2A14 and specifies components from which the new class name will be generated. Detail is provided by FIG. 2W below.

4. Declare the class specification complete:

a) User clicks Button 2A28.

b) Process 2V14: Initiates validation and storage of class definition. Detail is provided by FIG. 2Z below.

c) Process 2V16: Initiates generation, validation, and storage of class identification. Detail is provided by FIG. 2ZZ below.

d) Process 2V18:
      (1) The success of Processes 2V14 and 2V16 preceding are tested by reference to Boolean results returned from FIG. 2Z and FIG. 2ZZ.
         (a) If either bDefine or bName are FALSE the class has not been successfully declared. The system resets for corrective action from the user.
         (b) If both bDefine or bName are TRUE the class has been successfully declared. Process 2V20 is initiated.

e) Process 2V20:
      (1) The number of items and the list of ordered 2B02 items defining the class are formatted as 2D02 and 2F02 respectively for storage as elements iNumEventsInClass 2G04 and aClassEventList 2G06 respectively of the rClassDefinition record 2G02.
      (2) The class token and class name are formatted as 2H02 and 2I02 respectively for storage as elements wClassToken 2J04 and sClassName 2J06 of the rClassIdentification record 2J02.
      (3) Processing passes to Process 2U14 where 2J02 and 2G02 become elements 2S04 and 2S06 respectively of record rClassDeclaration 2S02. The resulting 2S02 is lastly placed in alphabetic order in aClassDeclarationTable 2T02. With the "Revised" column excluded, FIG. 7E illustrates this for the "AcquireText byDrag" task via row 4 of the aTaskDeclarationTable table. Assuming arbitrary order of its declaration a humanly comprehensible display of this task appears as the next to last entry in the left column of FIG. 7D.

5. Class declaration activity is declared complete:

a) Process 2V22:
      (1) The user indicates that class declaration is complete by click of button 2A30.
      (2) Storage processes of 2U16 are initiated.

C. FIG. 2W

This figure details the preferred method for management of user activity during specification of class name components. Because the arts of text editing are well known, the issues of deleting or altering a previously declared name component are not addressed by these disclosures. It is here presumed the user specifies a previously undeclared string.

1. The user declares a new alphanumeric string:
  a) Process 2W04:
    (1) User activity is in Edit Box 2A16, 2A20, or 2A24.
    (2) The user keys an alphanumeric string (hereafter "stub") 2K02 into one of said edit boxes available to receive a name component.
    (3) Upon user stroke of "RETURN" parameters appropriate to the Edit Box of focus are referenced:
      (a) Processes initiated by user activity in 2A16:
        (i) The user declares a new verb component for the class name.
        (ii) Data referenced at initiation of DeclareNewStub 2X02 are iNumVStubOrder 2N02, aVStubOrderList 2O02, iNumVTagOrder 2P02, and aVTagOrderList 2Q02.
        (iii) Detail of stub processing are presented in FIG. 2X below.
      (b) Processes initiated by user activity in 2A20:
        (i) The user declares a new noun component for the class name.
        (ii) Data referenced at initiation of DeclareNewStub 2X02 are iNumNStubOrder 2N02, aNStubOrderList 2O02, iNumNTagOrder 2P02, and aNTagOrderList 2Q02.
        (iii) Detail of stub processing are presented in FIG. 2X below.
      (c) Processes initiated by user activity in 2A24:
        (i) The user declares a new qualifier component for the class name.
        (ii) Data referenced at initiation activation of DeclareNewStub 2X02 are iNumQStubOrder 2N02, aQStubOrderList 2O02, iNumQTagOrder 2P02, and aQTagOrderList 2Q02.
        (iii) Detail of stub processing are presented in FIG. 2X below.
    (4) The upper three tables of FIG. 7E illustrate stub declarations for the verb, noun, and qualifier name components. (See the a{V&N&Q}TagOrderList columns excluding the "Revised iTag" column.) These tables show that in the tag ordered tables stubs are stored in the order declared with the unique value assigned a stub's tag being the row in which the stub is stored.

2. The user selects a previously declared stub:
  a) Process 2W06:
    (1) User activity is in List Box 2A18, 2A22, or 2A26.
    (2) The user selects a stub 2K02 from one of the specified List Boxes.
    (3) Upon a button click over the desired stub, data appropriate to the List Box identified by HANDLE are referenced:
      (a) Processes initiated by user activity in 2A18:
        (i) The user selects a previously declared verb component for the class name.
        (ii) Data referenced at initiation of SelectOldStub 2Y02 are iNumVStubOrder 2N02, aVStubOrderList 2O02, iNumVTagOrder 2P02, and aVTagOrderList 2Q02.
        (iii) Detail of stub processing are presented in FIG. 2Y04 below.
      (b) Processes initiated by user activity in 2A22:
        (i) The user selects a previously declared noun component for the class name.
        (ii) Data referenced at initiation of SelectOldStub 2Y02 are iNumNStubOrder 2N02, aNStubOrderList 2O02, iNumNTagOrder 2P02, and aNTagOrderList 2Q02.
        (iii) Detail of stub processing are presented in FIG. 2Y04 below.
      (c) Processes initiated by user activity in 2A26:
        (i) The user selects a previously declared qualifier component for the class name.
        (ii) Data referenced at initiation of SelectOldStub 2Y02 are iNumQStubOrder 2N02, aQStubOrderList 2O02, iNumQTagOrder 2P02, and aQTagOrderList 2Q02.
        (iii) Detail of stub processing are presented in FIG. 2Y04 below.

D. FIG. 2X

This figure details the preferred method to manage declaration and validation of a newly specified name component:

1. User Activity 2X04: The user specifies a new name component by keying a string into one of the edit boxes of 2A14 and stroking RETURN.
2. Process 2X06: The string is read from the Edit Box identified via the referencing value HANDLE and loaded to temporary variable sNewStub having format 2K02.
3. Process 2X08: A binary search determines whether sNewStub has been previously declared:
  a) If sNewStub has been previously declared, an error message is displayed prompting the user to take corrective action.
  b) If sNewStub is new, Process 2X10 is initiated.
4. Process 2X10:
  a) iNumTagOrder 2P02, the length of aTagOrderList 2Q02, is incremented by 1.
  b) The iNewTag 2L02 value assigned to identify sNewStub is the number of the row it occupies in 2Q02.
  c) aNewStub and iNewTag are stored in elements 2M04 and 2M06 respectively of record rStubTagID 2M02.
  d) The 2M02 record is inserted into aTagOrderList 2Q02 at the row specified by 2P02.
5. Process 2X12:
  a) iNumStubOrder 2N02, the length of the aStubOrderList 2O02, is incremented by 1 and sNewStub appended.
  b) Array 2O02 is sorted into ascending alphanumeric order by sNewStub 2M04 and the List Box identified by HANDLE is updated.
  c) Processing continues in FIG. 2W.

E. FIG. 2Y

This figure details the preferred method to manage use of a previously declared name component:

1. User Activity 2X04: The user selects a previously declared name component by clicking on anitem in one of the list boxes of 2A14
2. Process 2Y06: The designated stub 2K02 is read from the List Box identified by HANDLE.
3. Process 2Y08:
  a) A Binary search for the designated stub is performed to obtain its location in the aStubOrderList 2O02.
  b) The record identified by this search is loaded into a temporary record rStubTagId formatted as 2M02.

4. Process 2Y10:
   a) The stub is displayed in the Edit Box identified by HANDLE.
   b) Processing continues in FIG. 2W.

F. FIG. 2ZA

This figure details the preferred method for accessing the set of ordered events that define a class, testing this definition for uniqueness, and storing results.

1. Extract the class size and class definition:
   a) Process 2ZA04:
      (1) Reference 2A12 and assign to temporary variable iSizeNewClass formatted as 2D02 the number of bitEventType 2B02 items present.
      (2) Test whether iSizeNewClass is zero:
         (a) If iSizeNewClass is zero, an error message is displayed prompting the user to take corrective action.
         (b) If iSizeNewClass is not zero, initiate the processes of 2ZA06.
   b) Process 2ZA06:
      (1) A loop is entered that references each bitEventType 2B02 item displayed in 2A12.
      (2) As each item is read from 2A12 its location in 2C02 is determined and stored in the temporary array aNewClassEventList, formatted as 2F02, at the location indicated by the loop index, iCurrLoc. To convert the difficult to comprehend aNewClassEventList into a humanly comprehensible display, select each entry in turn from aNewClassEventList and use it reference a row in aEventTypeTable.

2. Enter an outer loop that references in turn each previously declared class and compare it to the new class.
   a) Process 2ZA08: Initiate a loop indexed by iOldClassLoc that successively references each class stored in aClassDeclarationTable 2T02.
   b) Process 2ZA10:
      (1) Determine the number of items in the definition of the currently referenced previously declared class. This value is found in the element iNumEventsinClass 2G04 of the element rClassDefinition 2G02 of the rClassDeclaration 2S02 stored at aClassDeclarationTable[iOldClassLoc] 2T02.
      (2) Compare the number of items in the definitions of the new class definition and the previously declared class:
         (a) If iSizeNewClass ≠iSizeOldClass, the two class cannot be the same. Continue the loop to reference the next previously declared class.
         (b) If iSizeNewClass=iSizeOldClass in the two classes, initiate Process 2ZA12.

3. Enter an inner loop that successively pairs by location each item of the two class definitions and tests them for equality:
   a) Process 2ZA12: Initiate an inner loop indexed by iCurrLoc that successively compares each item of the two class definitions.
   b) Process 2ZA14: Access the iCurrLoc item of each class definition:
      (1) For the previously declared class access the (iCurrLoc)$^{th}$ element of aClassEventList 2F02 of the element rClassDefinition 2G02 of aClassDeclarationTable[iOldClassLoc] 2T02.
      (2) For the new class access the (iCurrLoc)$^{th}$ element of aNewClassEventList.
      (3) Compare the two items for equality:
         (a) If the event numbers are equal the two classes can but need not be the same. Continue the inner loop to reference the next event of definitions.
         (b) If the event numbers are unequal the two classes cannot have equal definitions. Continue the outer loop 2ZA08 to reference the next previously declared class.
   c) Process 2ZA16:
      (1) When the definition of the new class is identical to that of a previously declared class an error message is displayed prompting the user to take corrective action.
      (2) If the outer loop completes, the a new class definition has been compared against all previously declared classes and a match is not found, Process 2ZA18 is initiated.

4. Prepare the new class definition for storage.
   a) Process 2ZA18:
      (a) Store iSizeNewClass in element 2G04 of rClassDeclaration 2G02.
      (b) Store aNewClassEventList in element 2G06 of rClassDeclaration 2G02.
   b) Process 2ZA20:
      (1) Declare the class definition valid by setting the temporary variable bDefine to TRUE.
      (2) Continue with Process 2V16 of FIG. 2V.

5. The aTaskDefinition columns of the bottom table of FIG. 7E illustrate these processes. Row 4, as example, indicates a task containing the four ordered events 8, 9, 7, and 10. When row 8 of the aEventTypeTable of FIG. 7A is referenced the "MoveCursorto TextStart" is supplied. This is can then be displayed in human comprehensible form as the first "PO" of "TASK: AcquireTextbyDrag" in FIG. 7D. Similar references for events 9, 7, and 10 provide the complete definition of the task referenced.

G. FIG. 2ZB

This figure details the preferred method for acquisition and validation of stub declarations, the generation of a class name from the component name stubs, the validation of declared identification for uniqueness, the generation of a unique class token for the class name, and the preparation of the class name for storage.

1. Acquire and validate stub declarations:
   a) Process 2ZB04: The three components of the new class name are extracted to temporary variables r{V&N&Q}Stub formatted as 2K02. These components are located in the 2M04 elements of the three r{V&N&Q}StubTagID 2M02 records generated by processes of FIG. 2W.
   b) Process 2ZB06: Test whether a stub has been specified for each name component:
      (1) If less than three stubs have been specified, an error message is displayed prompting the user to take corrective action.
      (2) If three stubs have been specified Process 2ZB08 is initiated.

2. Generate the class name from component stubs and validate its uniqueness.
   a) Process 2ZB08: Concatenated the three stubs in Verb+Noun+Qualifier order and load to sClassName 2I02.
   b) Process 2ZB10:
      (1) Perform a binary search on aClassDeclarationTable 2T02 to ascertain whether the new class name has been previously declared.
         (a) If the new class name has been previously declared, display an error message prompting the user to take corrective action.
         (b) If the name is new initiate Process 2ZB12.

3. Generate a unique class token for the new class name:
   a) Process 2ZB12: The three tag identifiers of the new class name are extracted to temporary variables r{V&N&Q}Tag formatted as 2L02. These tag components are located in the 2M06 elements of the three r{V&N&Q}StubTagID 2M02 records generated by processes of FIG. 2X.
   b) Process 2ZB14:
      (1) Each tag from Process 2ZB12 is left shifted in its 32 bit word in a manner dependent on specific exigencies of the user's needs. Experience suggests shifts of 24, 14, and 6 bits for the verb, noun, and qualifier tags respectively.
      (2) Using the OR operation available to major computer languages to consolidate these three four byte words into a single four byte word formatted as wClassToken 2H02.
4. Prepare class name for permanent storage
   a) Process 2ZB16:
      (1) Store wClassToken 2H02 and sClassName 2I02 respectively in elements 2J04 and 2J06 of rClassIdentification 2J02.
      (2) Declare the new class valid by settin bName to TRUE
      (3) Continue with Process 2V18.
5. Excluding the "Revised" column, the "a Taskidentification" columns of the bottom table of FIG. 7E illustrate this process. Row 4, as example, indicates a task containing the verb stub #2, noun stub #6, and qualifier stub #5. Row 2 of aVTagOrderList stores the stub "Acquire." Similarly rows 6 and 5 of aNTagOrderList and aQTagOrderList contain stubs "Text" and "byDrag" respectively. When concatinated these stubs produce a humanly comprehensible task name "AcquireTextbyDrag".

III. FIG. 3: Declaration of Class Occurrences and of Additional Classes

This figure discloses the preferred structure and initialization of requisite data areas and the preferred means for managing the declaration of class occurrence definitions, the declaration of class occurrence identification, the declaration of new classes based on an example of its occurrence, the validation of preceding said declarations, and storage of resulting class occurrence data. After the preceding have been successfully preformed, the figure concludes by disclosing the preferred method for redefining class tokens to promote display of the basic information content of a Class Occurrence History in a manner comprehensible to human comprehension:

A. FIG. 3K

Figure 3A:
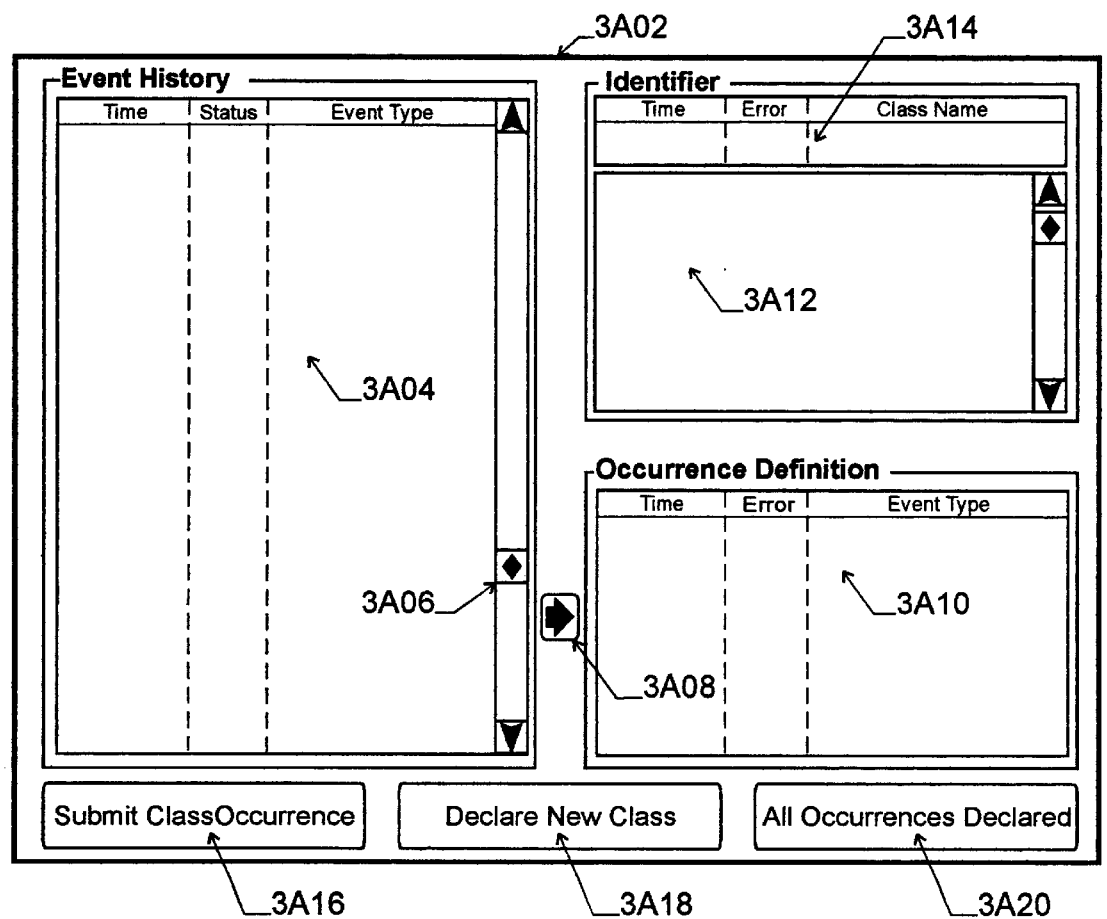
Figure 3B:
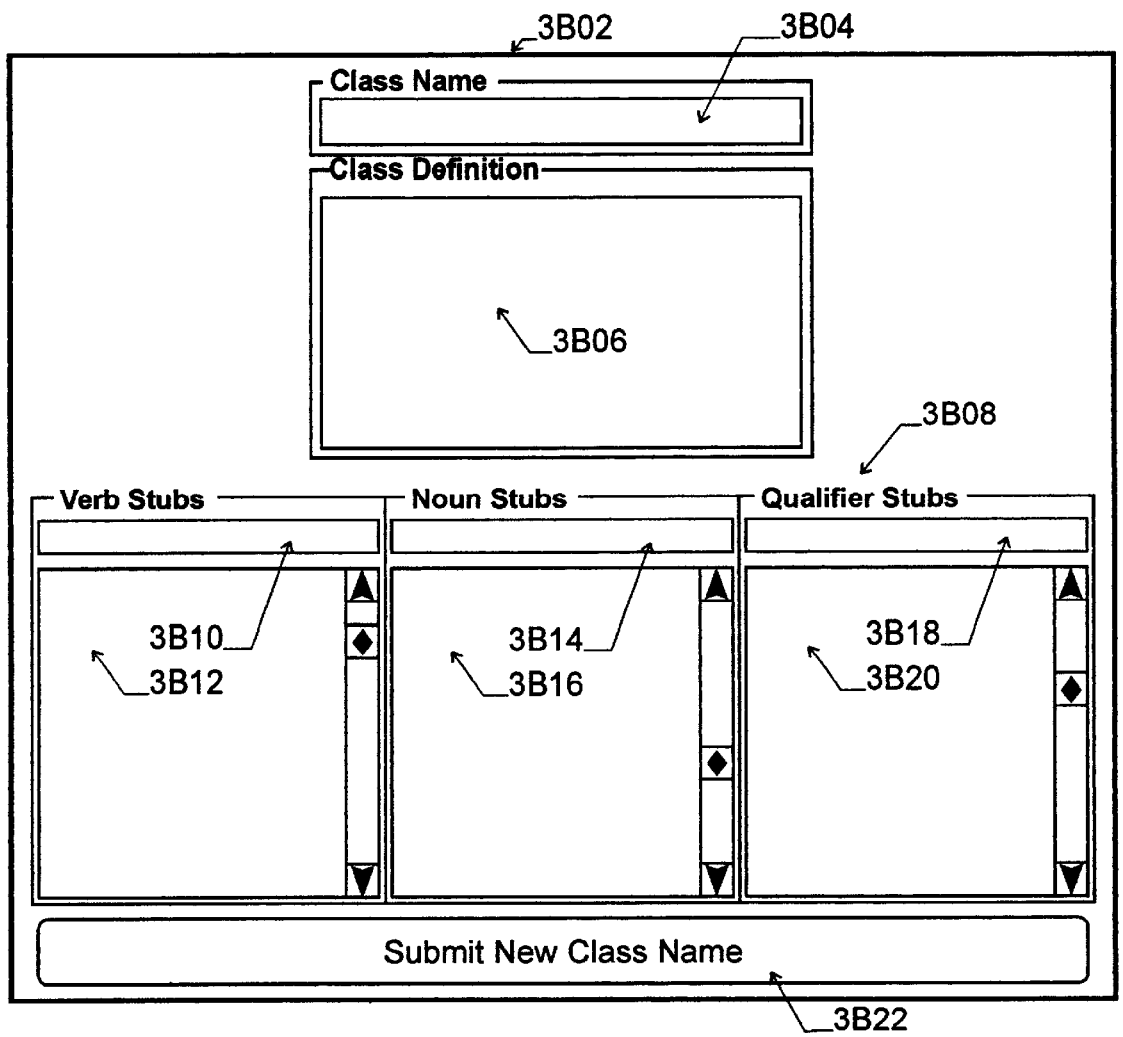
Figure 3K:
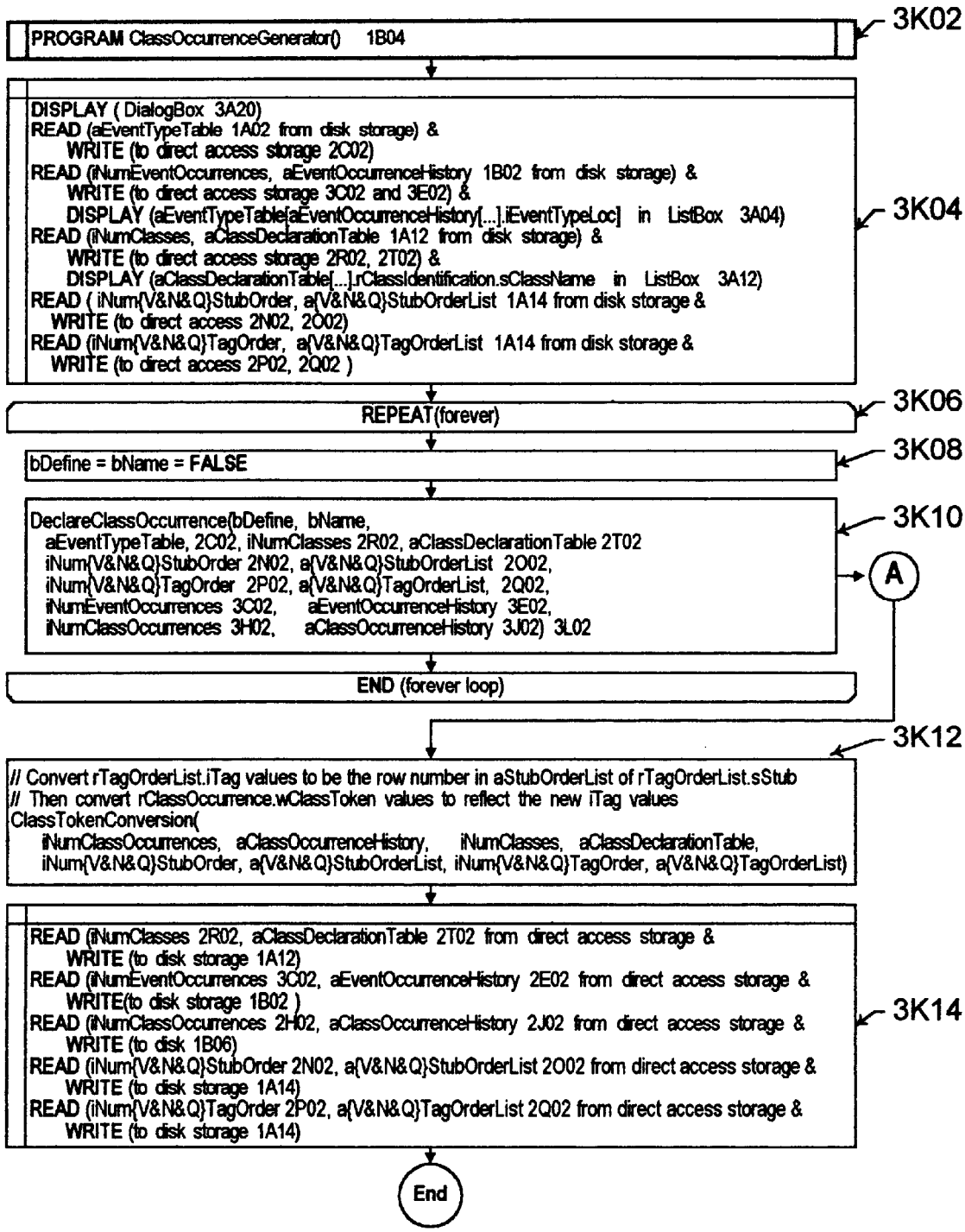
Figure 3L:
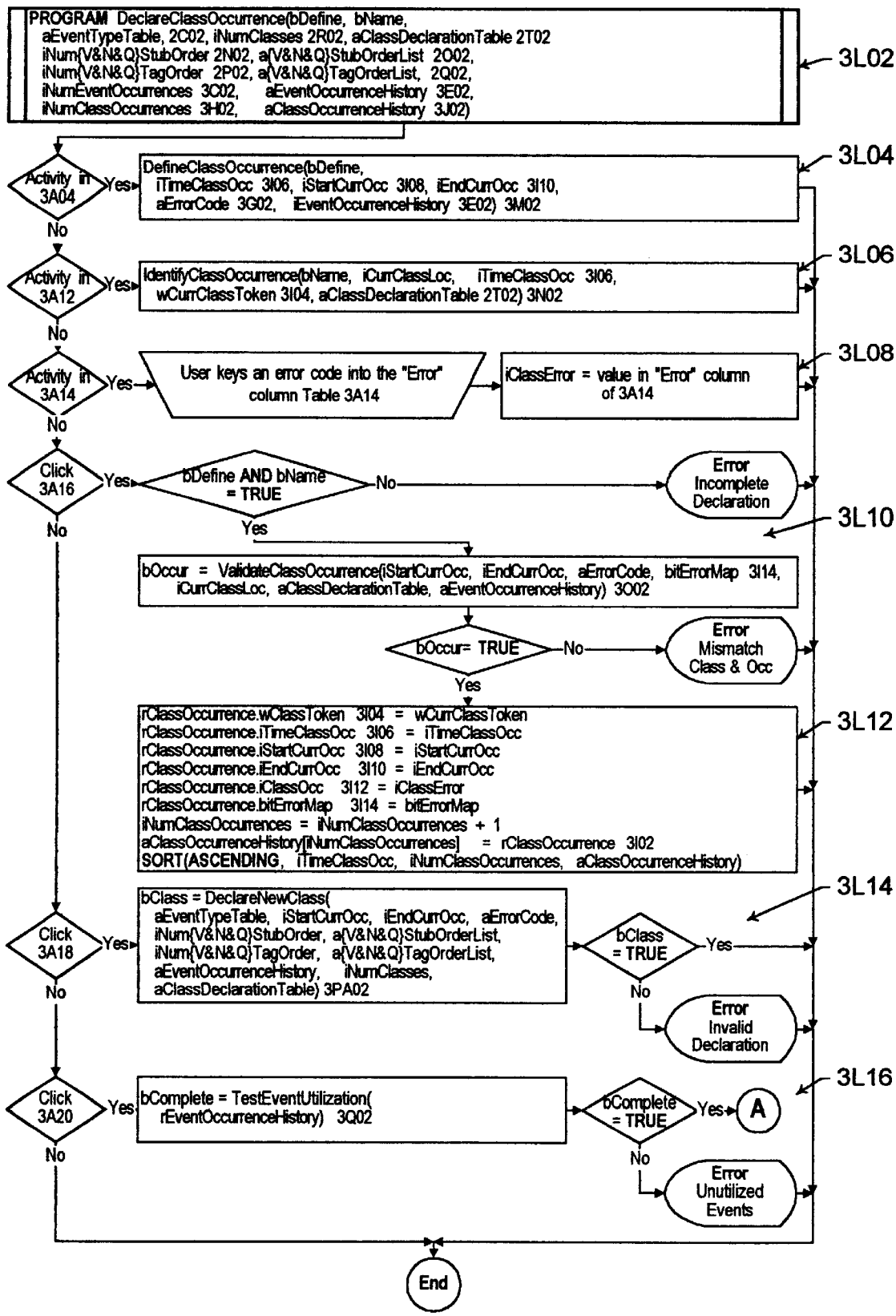
Figure 3M:
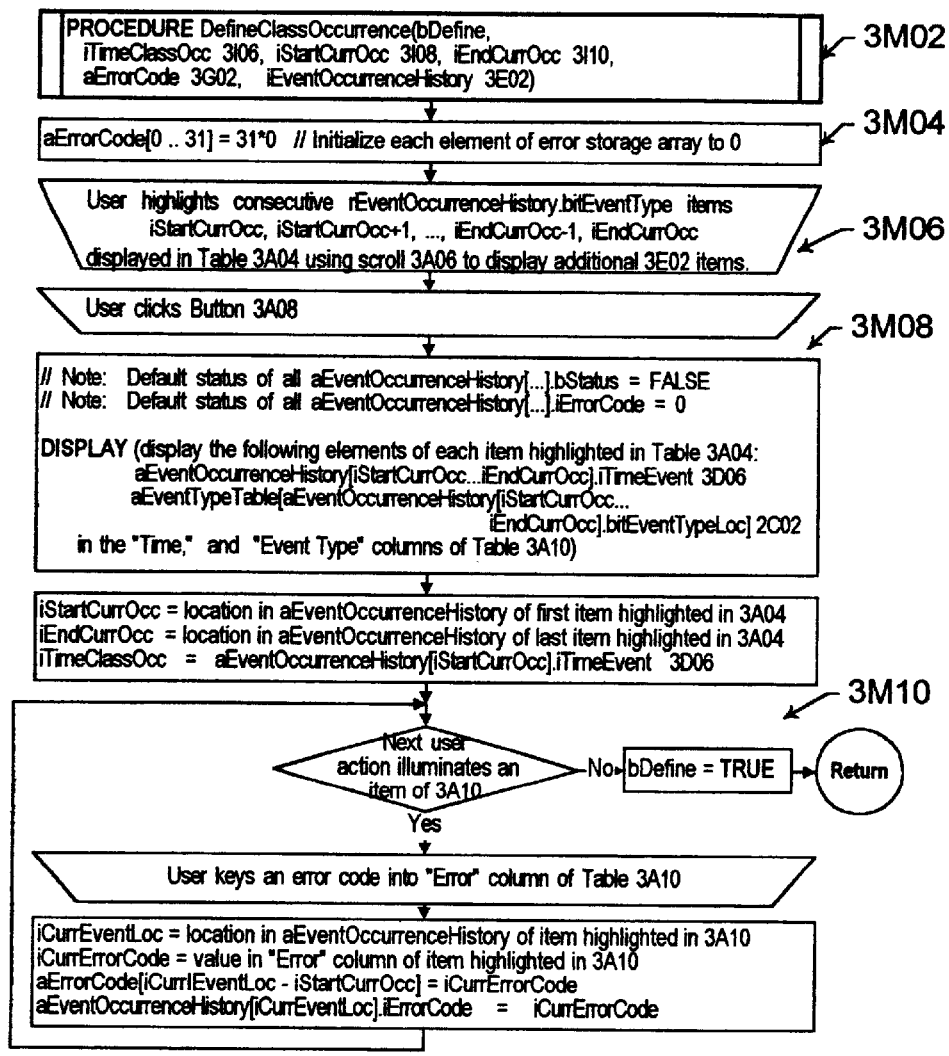
Figure 3N:
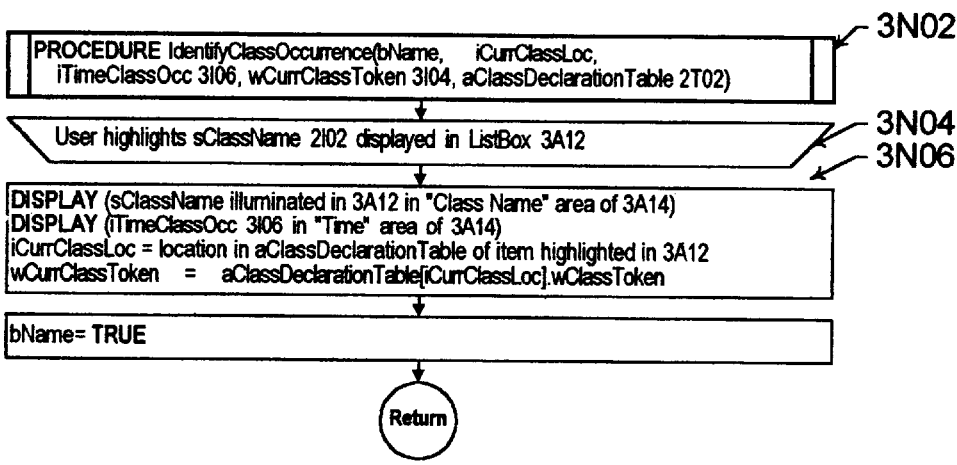
Figure 30:
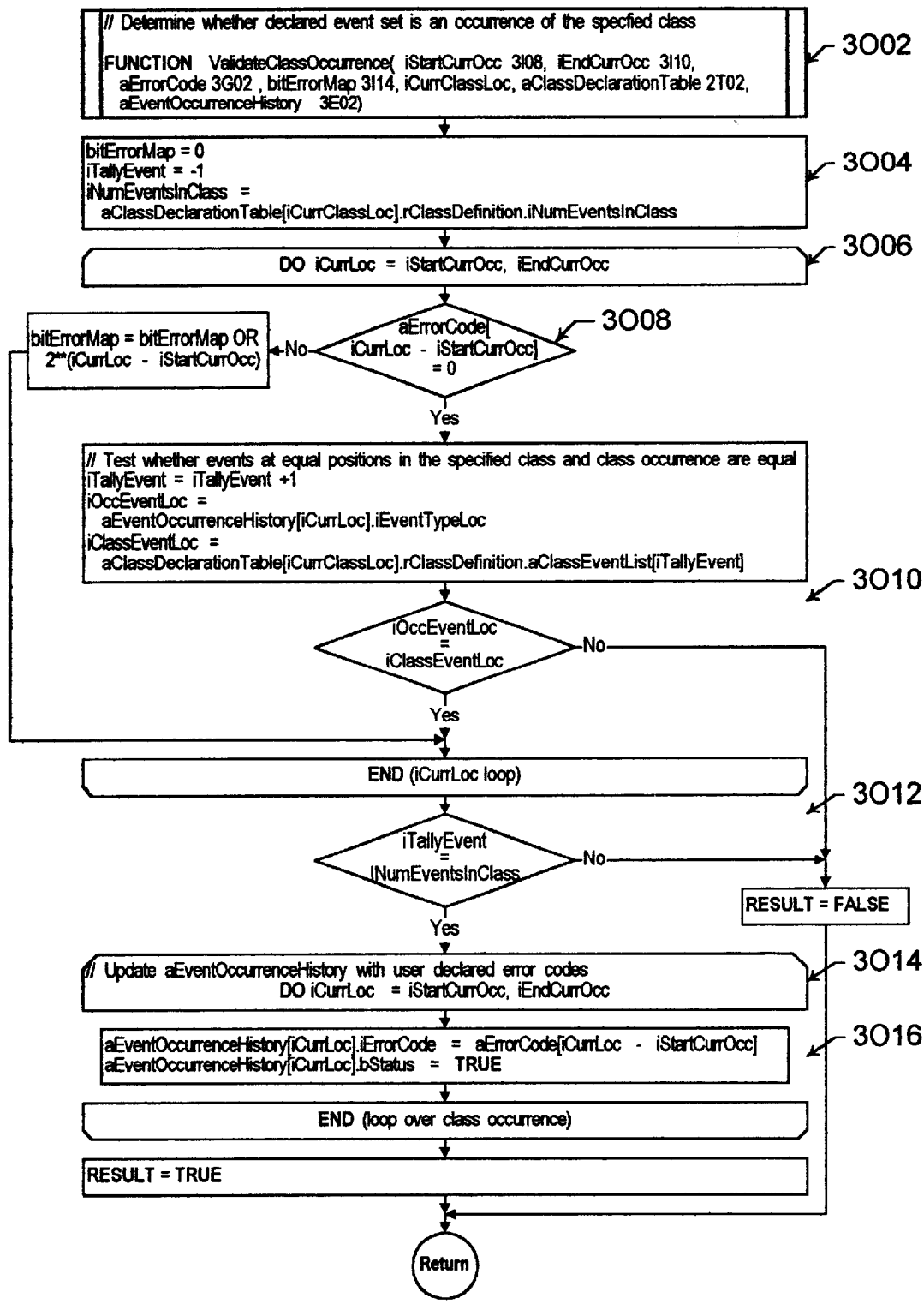
Figure 3P:
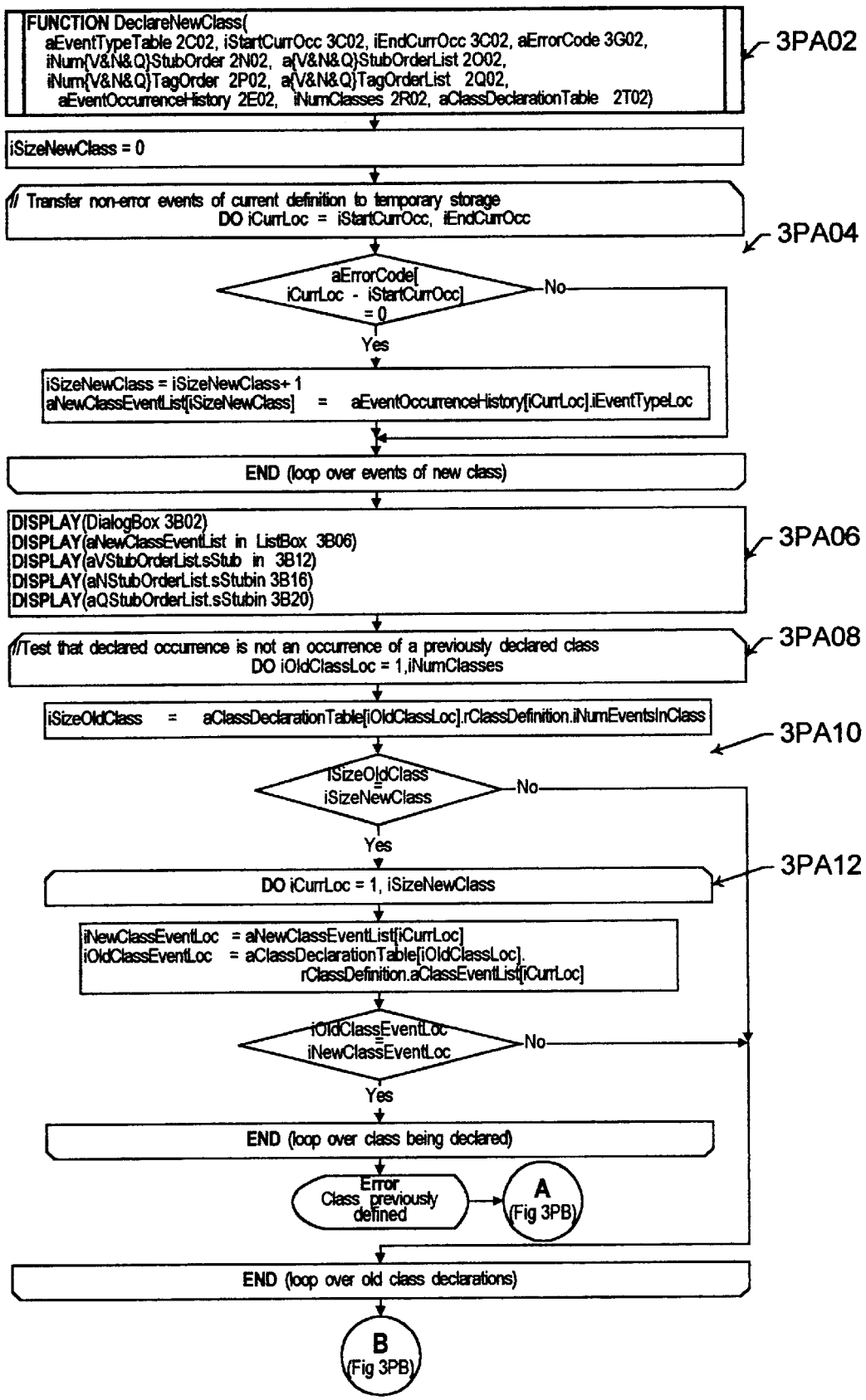
Figure 3P:
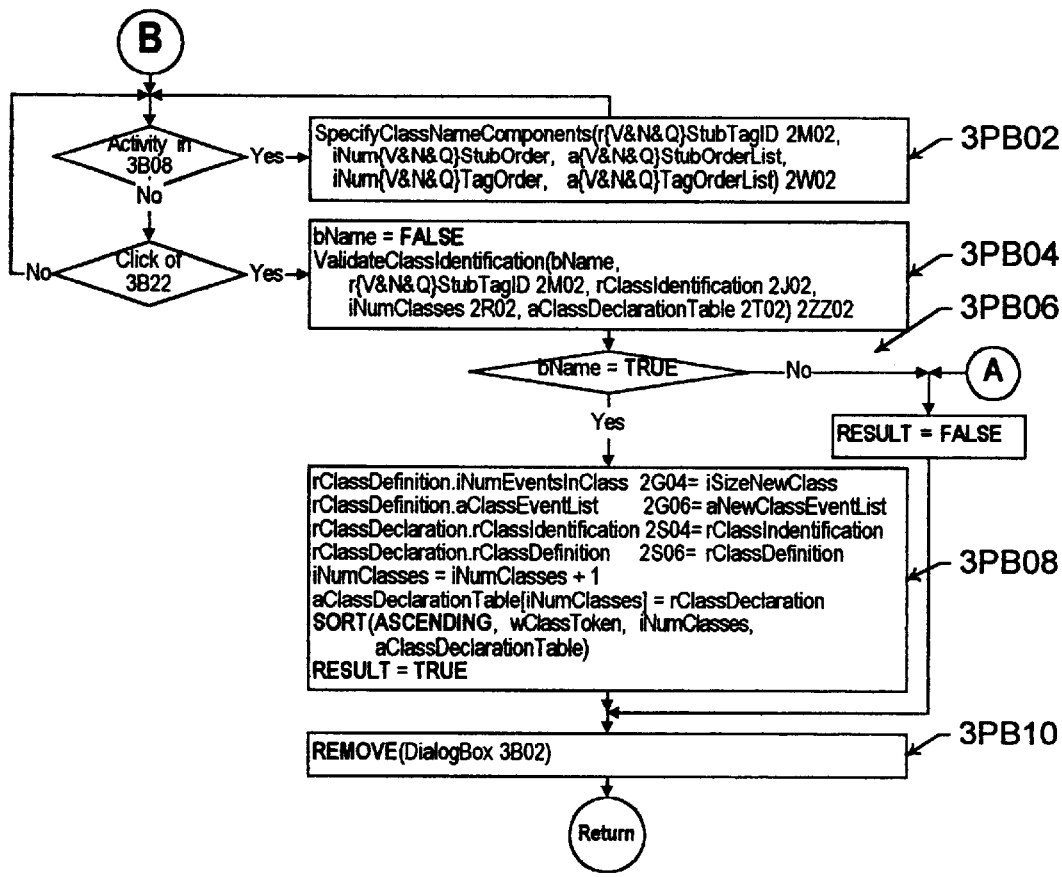
Figure 3Q:
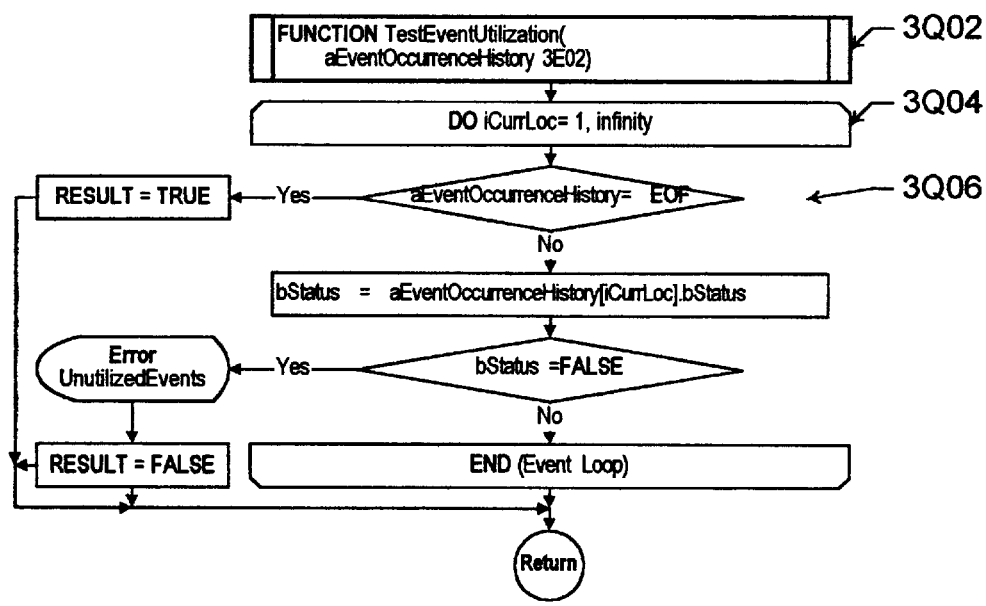
Figure 3R:
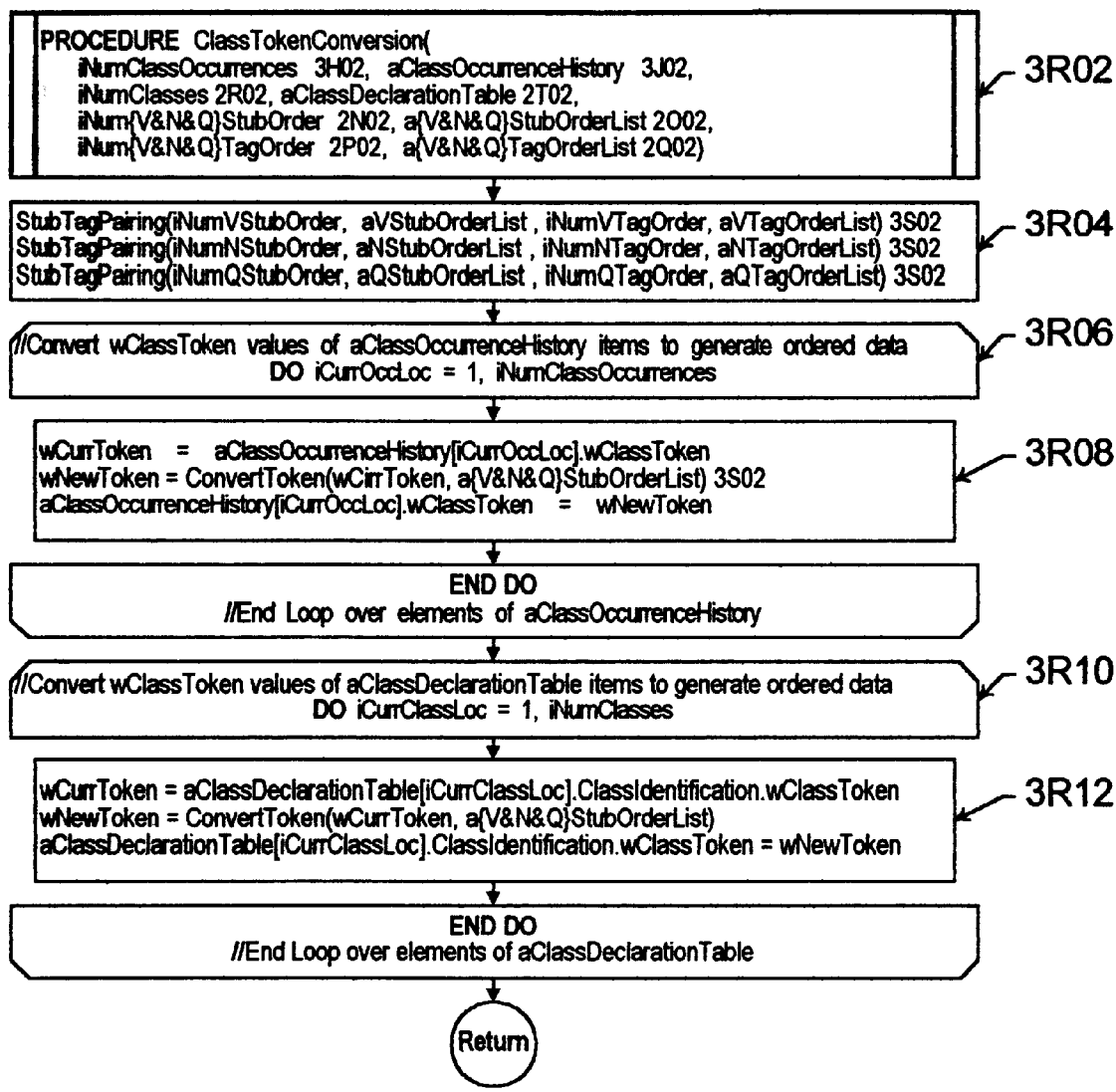
Figure 3S:
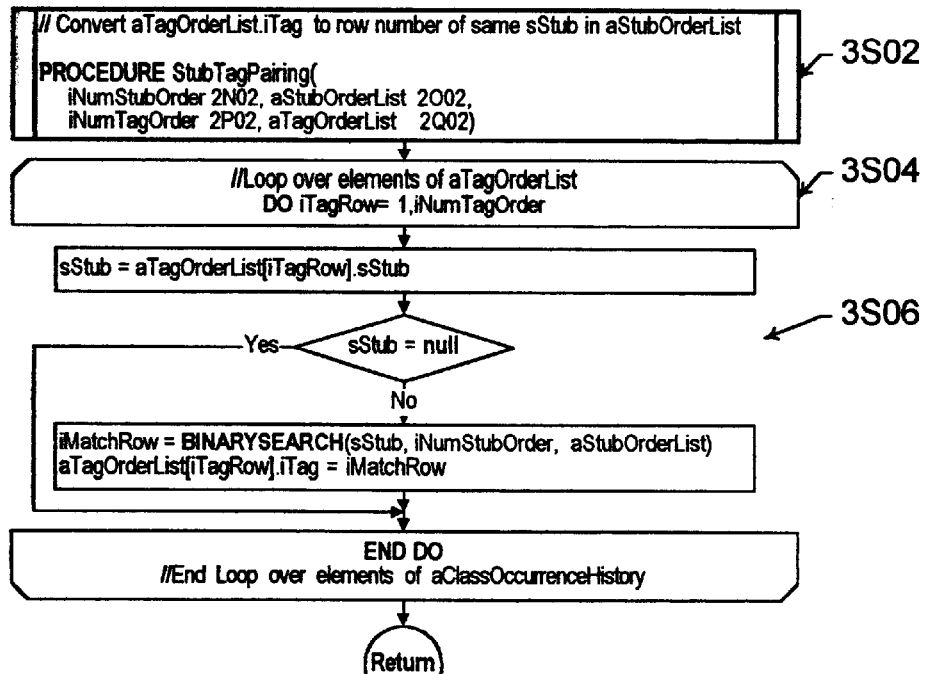
Figure 3T:
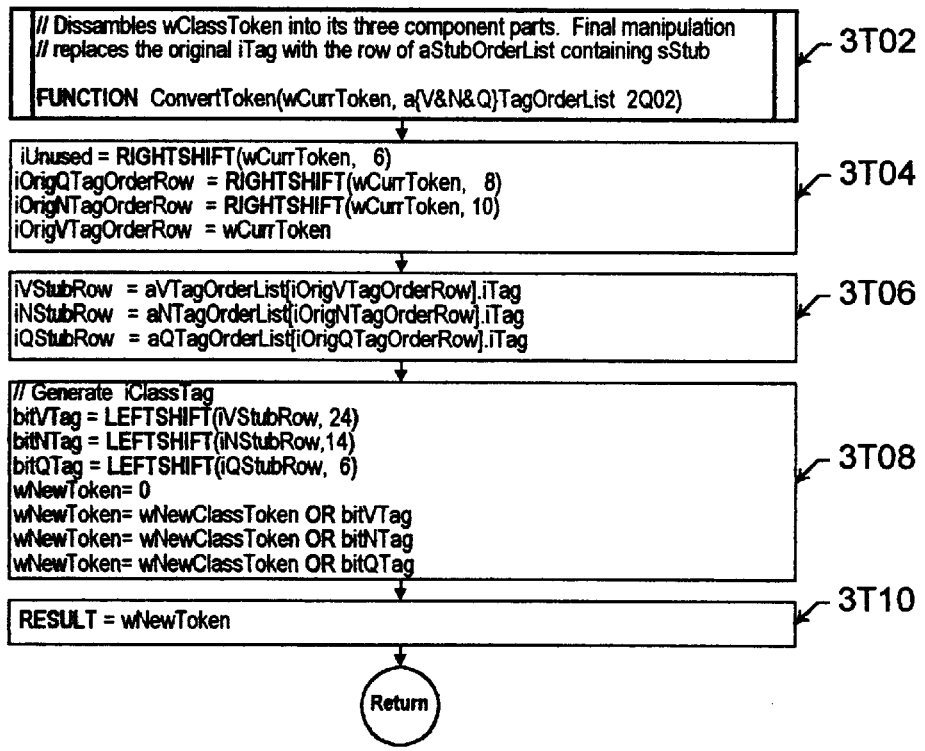

This figure details the preferred method to initialize data areas, to declare class occurrences, to test that processing of the aEventOccurrenceHistory is complete, initiate revision of wClassTokens, and to store resulting data.
1. Load direct access storage, initialize of data areas and display dialog box 3A02:
   a) Process 3K04:
      (1) Display Dialog Box 3A02 to expedite user declaration of class occurrences and, as appropriate, specification of error contained therein.
      (2) Read aEventTypeTable 1A02 from disk and write to direct access storage at location 2C02.
      (3) Read iNumEventOccurrences and aEventOccurrenceHistory from disk at 1B02 and write to direct access storage at locations 3C02 and 3E02 respectively. The event type and time of each are displayed in appropriate columns of List Box 3A04 of Dialog 3A02. A human comprehensible display of event types is possible by reference to iEventTypeLoc 3D04 of aEventOccurrenceHistory 3E02 which points to actual labels in aEventTypeTable 2C02. The time of each event is accessed by reference to iEventTime 3D06 of aEventOccurrenceHistory 3E02. In the exemplar the iEventTime and iPhyOpLoc columns of the top table of FIG. 7F are the columns used in development of the 3A04 display. At commencement of the exemplar iErrorCode is initialized to 0 and "bStatus" to "FALSE" but become altered by completion of analysis.
      (4) Read iNumClasses and aClassDeclarationTable from disk at 1A12 and write to direct access storage at locations 2R02 and 2T02 respectively. Display the list of class names in Box 3A12 of 3A02. Class names are accessed by reference to sClassName 2J06 of rClassIdentification 2J02 which is an element of aClassDeclarationTable 2T02. In the exemplar, column "sTaskName" is generated by processes of FIG. 2ZB appear in the "aTaskDeclarationTable" of FIG. 7E. These exemplify the sTaskName strings to be displayed in 3A12.
      (5) Read iNum{V&N&Q}StubOrder and i{V&N&Q}StubOrderList from disk at 1A14 and write to direct access storage at locations 2N02 and 2O02 respectively. In the exemplar, columns "s{V&N&Q}Stub" of the a{V&N&Q}StubOrderList tables are generated by processes of FIG. 2W and presented in FIG. 7E in the " "{V&N&Q} Components of Task Names" tables. These exemplify the sStub strings to be displayed in 3B12, 3B16, and 3B20 respectively whenever the dialog box of FIG. 3B is displayed.
      (6) Read iNum{V&N&Q}TagOrder and i{V&N&Q}TagOrderList from disk at 1A14 and write to direct access storage at locations 2P02 and 2Q02 respectively.
2. Declare class occurrence
   a) Process 3K06: The user enters an endless loop which is exited only by explicit click of button 3A20. While in this loop the user is able to declare an arbitrary number of class occurrences in an arbitrary order. Each successful completion of this loop results in declaration of one class occurrence. Non-successful activity within a loop results in display of appropriate error messages that solicit corrective action.
   b) Process 3K08: Prepare for declaration of each new class occurrence by setting two Boolean variables bDefine and bName to FALSE. These variables are employed to denote the successful definition and the successful identification of a class occurrence respectively.
   c) Process 3K10: Initiates processes that guide the user through declaration of a class occurrence. Detail is provided in FIG. 3L below.
3. Convert the class tokens of each element of the aClassDeclarationTable and aClassOccurrenceHistory data structures to promote humanly comprehensible display of aClassOccurrenceHistory analysis:
   a) Process 3K12: Initiates processes of FIG. 3R. See FIG. 3R.
4. Store the set of class occurrences:
   a) Process 3K14:
      (1) Read iNumClasses 2R02 and aClassDeclarationTable 2T02 from direct access storage write to disk at 1A12.

(2) Read iNumEventOccurrences 3C02 and aEventOccurrenceHistory 3E02 from direct access storage and write to disk at 1B02.
(3) Read iNumClassOccurrences 3H02 and aClassOccurrenceHistory 3J02 from direct access storage and write to disk at IB06.
(4) Read iNum{V&N&Q}StubOrder 2N02 and i{V&N&Q}StubOrderList 2O02 from direct access storage write to disk at 1A14.
(5) Read iNum{V&N&Q}StubOrder 2P02 and i{V&N&Q}StubOrderList 2Q02 from direct access storage from direct access storage write to disk at 1A14.

B. FIG. 3L

This figure details the preferred method to support user manipulation of Dialog box 3A02 during definition of class occurrences, identification of class occurrences, and specification of error. This figure also details the preferred method to permit the declaration of a new class based on the events defining an occurrence of said new class. Finally, this figure details the preferred method for validating class occurrence declarations and subsequent tests that all events are utilized when class occurrence declarations are stated to be complete.

1. Declare a class occurrence:
   a) User Activity 3L04:
      (1) The user defines a class occurrence by selecting a set of contiguous events displayed in List Box 3A04 of Dialog 3A02, employing scroll button 3A06 to display additional events as required. In the exemplar the task occurrence "AcquireTexbyDrag" illustrates The user might illuminate the "Physical Operator Events" events located in rows 5 through 10 of the "Work Session Log" of FIG. 7C. A second occurrence of this task class appears in locations 13 through 16 and a third at locations 19 through 22. Note that the first of these task occurrences contains error events (denoted by **) within the sequence of consecutive events delimited by the definition.
      (2) Upon click of button 3A08 selected 3A04 events are written to 3A10
      (3) Processes of 3M02 initiated. Detail of defining class occurrences appears in FIG. 3M below.
   b) User Activity 3L06:
      (1) The user identifies a class occurrence by selecting a previously declared class name from List Box 3A12 of Dialog 3A02.
      (2) Upon click of the mouse the selected 3A12 class name is written to 3A14 and processes of 3N02 are initiated. Detail of identifying class occurrences appears in FIG. 3N below.
   c) User Activity 3L08:
      (1) If the class occurrence is not related to behavior expected from performance of the Standard Test Suite, the class occurrence is declared erroneous.
      (2) To denote an erroneous class occurrence the user keys the appropriate error code into the "Error" cell of 3A14 of Dialog 3A02.
      (3) Upon stroke of the RETURN key the class occurrence error code is read as an integer value to temporary storage named iClassError. In the exemplar event numbers 6 and 7 of FIG. 7C are declared by the user as erroneous by keying error code using values of meaningful in the context of the CHI being evaluated. In the exemplar the user specifies error values of 12 and 26 for Events number 6 and 7 respectively. These values are stored in rows 6 and 7 of iErrorCode column of aPhysicalOperatorOccurrenceHistory; i.e., the upper table of FIG. 7F.

2. Validate declaration of class occurrence:
   a) Process 3L10:
      (1) The user clicks Button 3A16 to indicate the declaration of a class occurrence is complete.
      (2) Test that both the definition and the identification of the class occurrence have been successfully performed. This is accomplished by testing that temporary variables bDefine and bName are both TRUE:
         (a) If the test is unsuccessful an error message is displayed prompting the user for corrective action.
         (b) If the test is successful processes of 3O02 are initiated to ascertain whether the class occurrence declaration is acceptable. Detail of testing acceptability of a class occurrence declaration appears in FIG. 3O below.
      (3) At return from the processes of 3O02 a test is performed to ascertain whether the class occurrence was validated. This is accomplished by testing that the temporary variable bOccur is TRUE:
         (a) If bOccur is FALSE an error message is displayed prompting the user for corrective action.
         (b) If bOccur is TRUE final processing of the class occurrence is performed and storage performed. Initiate Process 3L12.
   b) Process 3L12:
      (1) Load the rClassOccurrence 3I02 record as follows:
         (a) Load the wCurrClassToken value returned by processes 3N02 to element 3I04.
         (b) Load the time of the first event of the class occurrence from the "Time" column of List Box 3A12 of Dialog 3A02 to 3I06.
         (c) Load the row location in aEventOccurrenceHistory 3E02 of the first event displayed in List Box 3A10 to 3I08.
         (d) Load the row location in aEventOccurrenceHistory 3E02 of the last event displayed in List Box 3A10 to 3I10.
         (e) Load the class error code into iClassError 3I12.
         (f) Load the bitErrorMap generated by process 3O08 into 3I14. This data element is available for types of error pattern analysis not directly related to measures of information content. Provision for the bitErrorMap is included at this time because it is a natural addition to this disclosure.
      (2) Increment the value of iNumClassOccurrences 3H02.
      (3) Load the preceding rClassOccurrence 3I02 record to the (iNumClassOccurrence)$^{th}$ row of aClassOccurrenceHistory 3J02
      (4) Sort aClassOccurrenceHistory to ascending order by the time stamp 3I06. For purposes of disclosure this sort is not required until after completion of processes of FIG. 3. However, for implementation of the invention sorting at this time is required for edit and deletion capability.

3. Declare a new class from an example of its occurrence:
   a) Process 3L14:
      (1) The user clicks Button 3A18 to initiate processes of 3PA02 that enable the user to declare a new class based on the non-erroneous events displayed in 3A10. See FIG. 3PA.
      (2) Upon return from the processes of FIG. 3PA a test determines whether a new class was successfully declared. This is accomplished by testing that temporary variable bClass is TRUE:

(a) If bClass is FALSE an error message is displayed prompting the user to take corrective action.
(b) If bClass is TRUE the system sets for the next user activity.
4. Validate event utilization at completion of all declarations:
   a) Process 3L16:
      (1) The user clicks button 3A20 to indicate all AdSs occurrences have been declared.
      (2) The processes of 3Q02 are initiated to ascertain whether all declaration of class occurrences is complete. Detail of testing for completion appears in FIG. 3Q below.

C. FIG. 3M

This figure details the preferred method for specifying the sequence of events forming a class occurrence definition and the designation of erroneous events within the event sequence:

1. Define a class occurrence:
   a) Process 3M04: Initialize all elements 3F02 of array aErrorCode 3G02 to 0. This assures that non-error events will be correctly identified during loading into the iErrorCode 3D08 element of rEventOccurrence 3D02. The size of the aErrorCode 3G02 array is set to 32 elements based on maximum anticipated requirements but is to be altered to meet exigencies of the software under test.
   b) User Activity 3M06:
      (1) The user delimits the set of contiguous events displayed in List Box 3A04 of Dialog 3A02 that encompasses all events of a class occurrence definition. This sequence is inclusive of erroneous elements present.
      (2) The user clicks button 3A08 when selection is complete.
   c) Process 3M08:
      (1) Data of each event selected in 3A04 is transferred to the "Time" and "Event Type" columns respectively of Table 3A10 of Dialog 3A02.
      (2) The low location un aEventOccurrenceHistory 3E02 of the first event and last event of the class occurrence being defined are placed in tempory storage iStartCurrLoc and iEndCurrLoc respectively. The time of the start event is placed in temporary storage iTimeClassOcc.

2. Designate erroneous events within the event sequence in 3A10. If the next user action is to designate an event displayed in 3A10, processing continues with the processess of 3M10. Any other user activity returns processing to 3L02.
   a) Process 3M10:
      (1) The user illuminates an event in 3A10, keys an event error code into the "Error" column and strokes RETURN.
      (2) At stroke of RETURN:
         (a) The location in aEventOccurrenceHistory 3E02 of the erroneous event is determined and placed in temporary storage in iCurrEventLoc.
         (b) The value of the error code keyed by the user is placed in temporary storage at iCurrErrorCode.
         (c) The relative location of the designed event in aErrorCode is determined as the difference between iCurrEventLoc and iStartLoc. iCurrError then placed at this location in aErrorCode.
         (d) The error value is placed in aEventOccurrenceHistory[iCurrEventLoc] 3E02 in element 3D08.
      (3) Processing can continue with additional user activity 3M10.
3. In the exemplar, event numbers 6 and 7 of FIG. 7C are determined to be erroneous by some criteria not related to the invention. Also by considerations not related to the invention the user declares error code values that reflect meaningful value to the application tested. In the exemplar the error values, 12 and 26 for Events number 6 and 7 respectively, are stored in rows 6 and 7 of the iErrorCode column of aPhysicalOperatorOccurrenceHistory found as the top table of FIG. 7F.

D. FIG. 3N

This figure details the preferred method for specifying the class name of events displayed in 3A10:

1. Identify the class occurrence:
   a) User Activity 3N04:
      (1) The user appraises the previously declared class names displayed by List Box 3A12.
      (2) For specification of the class occurrence to proceed, the desired name for the current class occurrence must have been previously declared:
         (a) If the desired name is displayed in 3A12 the user clicks on it and Process 3N06 is initiated. In the exemplar, the list of currently specified task names is the set of names declared during processed of FIG. 2. This list appears as the sTaskName column of the aTaskDeclarationTable table of FIG. 7E. If the user were to declare the task occurrence defined by events 5–10 of FIG. 7C, the task name selected in 3A12 will be the fourth listing; namely, "AcquireTextbyDrag". Upon selection "AcquireTextbyDrag" is displayed in the "Class Name" column of 3A14. If the user has successfully performed class occurrence definition, the time of the first event of the definition; i.e., 1.5 from event number 5, is displayed in the "Time" column of 3A14.
         (b) If the desired name is not displayed in 3A12 the user must click Button 3A18 to initiate the processes of 3PA02 that permit declaration of a new class based on non-erroneous items of the class occurrence defined in 3A10. The exemplar does not depict the declaration of a new class based in the non-error events of a defined task occurrence.
   b) Process 3N06:
      (1) The row location of the selected name in array aClassDeclarationTable 2T02 is determined and stored in temporary variable iCurrClassNameLoc.
      (2) The wClassToken for this class name is extracted from the identified row of 2T02 and placed in temporary variable wCurrClassToken which has format 2H02.
      (3) The processes of 3N02 are declared successful by setting the Boolean variable "bName" to TRUE.
      (4) Processing continues with the processes of 3L02.

E. FIG. 3O

This figure details the preferred method to verify that a declared class occurrence is an occurrence of the designated class. These methods exclude error events before testing the number of events in the occurrence definition and the class definition for equality. If equal numbers of events in the two definitions are observed, a test of paired events of the two event lists is performed. If the two lists are identical the occurrence is an instance of the previously defined class.

1. Verify that the defined occurrence is an occurrence of the specified class:
   a) Process 3O4:
      (1) Initialize the temporary variables bitErrorMap and iTallyEvent to 0 and −1 respectively.
      (2) Enter aClassDeclarationTable 2T02 at iCurrClassNameLoc and access the record rClassDeclaration 2S02. From 2S02 extract iNumEventsInClass 2G04 from the rClassDefinition 2G02 element of 2S02.
   b) Process 3O06: Enter a loop that references all events listed in 3A10.
   c) Process 3O08:
      (1) Test whether the event in aErrorCode referenced by loop index, iCurrLoc, has been declared erroneous.
         (a) If the event is non-erroneous initiate processes of 3O10.
         (b) If an event is erroneous:
            (i) set to "1" that bit of bitErrorMap having the same base 0 position as the current event being processed.
            (ii) Continue with the next iteration of the loop.
            (iii) In the exemplar, column "bitErrorMap" of aTaskOccurrenceHistory of FIG. 7F illustrates this for the two event errors within task number 3. The "000110" entry sited provides a "bit" per event encompassed by events 5 through 10 of aPhysicalOperatorOccurrenceHistory. Of these events numbers 6 and 7 are erroneous. These are the second and third event of the delimited event sequence; i.e., events #1 and #2 counting from base 0. These same relative "bits" of "bitErrorMap" are set to "1." in FIG. 7F.
   d) Process 3O10:
      (1) Load to temporary storage the same relative events of the current occurrence and the named class.
      (2) Compare these values.
         (a) If these values are the same continue with the next iteration of the loop.
         (b) If these values are not the same the current occurrence cannot be an occurrence of the named class:
            (i) Declare a FALSE result.
            (ii) Continue with the processes of FIG. 3L.
   e) Process 3O12: Once all non-erroneous events of the current occurrence have been tested, test whether the number of non-erroneous occurrence events equals the number of events in the currently referenced class definition:
      (1) If they are unequal the current occurrence cannot be an occurrence of the named class:
         (a) Declare a FALSE result.
         (b) Continue with the processes of FIG. 3L.
      (2) If they are equal continue with Process 3O14:
2. Store data of the validated class occurrence:
   a) Process 3O14: Create a loop to references all aEventOccurrenceHistory 3E02 events between rows iStartCurrOcc and iEndCorrOcc inclusive.
   b) Process 3O16:
      (1) For each pass through the loop, load the error code from the same relative location of temporary array aErrorCode into the appropriate iErrorCode 3D08 element of the appropriate rEventOccurrence 3D02 record of aEventOccurrenceHistory 3E02.
      (2) Similarly, load TRUE into the bStatus 3D10 element of this 3I02 record to denote that the event has been identified as belonging to a declared class occurrence.
      c) Designate the result as TRUE and continue with Process 3L12.

F. FIG. 3PA

This figure details the preferred method to declare a new class based on the presumption that non-error elements of the current class occurrence definition define a new class. To verify that the proposed new class has not been previously defined all existing classes are compared against the new class for equivalence. If the definition is new, declaration of a new class name is specified via the display of FIG. 3B. Specification of the new name utilizes processes of FIG. 2. Storage is performed as in FIG. 2.

1. Identify events of the current occurrence that define the new class:
   a) Process 3PA04:
      (1) Initialized the temporary variable, iSizeNewClass to 0. iSizeNewClass is employed to tally the non-erroneous events of the current class occurrence.
      (2) Initiate a loop over the elements iStartCurrOcc through iEndCurrOcc of aEventOccurrenceHistory 3E02. Test the iErrorCode 3D08 element of the current record referenced in aEventOccurrenceHistory:
         (a) If 3D08 is equal zero, the event is not erroneous:
            (i) Increment iSizeNewClass by 1
         (b) The iEventTypeLoc 3D02 value of the referenced 3E02 is loaded to the iSizeNewClass element of temporary storage aNewClassEventList formatted as 2F02.
   b) Process 3PA06: Generate a display to assist declaration of the new class as follows:
      (1) Display Dialog Box 3B02.
      (2) Display in List Box 3B06 of Dialog 3B02 the bitEventType 2B02 strings of aEventTypeTable 2C02 referenced by elements of aNewClassEventList.
      (3) Display in List Box 3B12 of Dialog 3B02 those sStub 2M04 strings from the rVStubTagID 2M02 records that form the elements of aVStubOrderList 2O02.
      (4) Display in List Box 3B16 of Dialog 3B02 those sStub 2M04 strings from the rNStubTagID 2M02 records that form the elements of aNStubOrderList 2O02.
      (5) Display in List Box 3B20 of Dialog 3B02 those sStub 2M04 strings from the rQStubTagID 2M02 records that form the elements of aQStubOrderList 2O02.

2. Verify that the proposed class definition has not been previously declared:
   a) Process 3PA08: Initiate an outer loop to successively reference the definition of each previously declared class; i.e., a loop that successively accesses each record of the aClassDeclarationTable 2T02.
   b) Process 3PA10:
      (1) Access the next rClassDeclaration 2S02 record of the currently referenced element of aClassDeclarationTable 2T02. Extract from the rClassDefinition 2G02 the iNumEventsInClass 2G04 value and load it to temporary storage iSizeOldClass.
      (2) Compare the values in iSizeOldClass and iSizeNewClass:
         (a) If iSizeOldClass≠iSizeNewClass the proposed class definition cannot equal the previously declared class. Continue with the outer loop iteration to reference the next previously declared class.

(b) If iSizeOldClass=iSizeNewClass initiate Process 3PA12.

c) Process 3PA12:
  (1) Initiate an inner loop to compare event location values of the new class against the paired value of the currently referenced, previously declared class.
  (2) Compare the paired elements of aNewClassEventList and the aClassEventList 2G06 of the currently referenced record of aClassDeclarationTable 2T02:
    (a) If a one-to-one match is detected the proposed class definition has been previously declared:
      (i) An error message is displayed prompting the user to take corrective action.
      (ii) Continue with Processes of FIG. 3L.
    (b) If a one-to-one match is not detected the proposed class definition has not been previously declared. Continue with the outer loop iteration to reference the next previously declared class.
  (3) If all previously declared classes have been reviewed without a match a new class definition has been declared. Initiate Process 3PB02.

3. These processes detail the preferred method for identifying a new class:
  a) Process 3PB02:
    (1) The user performs activity in any of the 3B08 edit or list boxes of Dialog 3B02.
    (2) Processes of 2W02 are initiated as detailed by Section II-C.
  b) Process 3PB04:
    (1) The user clicks button 3B22 to indicate that specification of class name components is complete.
    (2) Processes of 2ZB02 are initiated as detailed by Section II-G.
  c) Process 3PB06:
    (1) Test for acceptability of the proposed name. This is accomplished by testing that temporary variable bName returned from 2ZB02 has value TRUE.
      (a) If bName is FALSE:
        (i) A declaration failure is set.
        (ii) Continue the processes of 3L14.
        (iii) An error message is displayed prompting the user to take corrective action.
      (b) If bName is TRUE Process 3PB08 is initiated.

4. Store data of the new class:
  a) Process 3PB08: The following four steps are performed:
    (1) Load iSizeNewClass into element 2G04 and the aNewClassEventList array into element 2G06 of a rClassDefinition 2G02 record. Load this 2G02 record into element 2S06 of a rClassDeclaration 2S02 record.
    (2) Load the rClassIdentification 2J02 record returned from the processes of 3BP04 into element 2S04 of the rClassDeclaration 2S02 record of the preceding step.
    (3) Increment iNumClasses 2R02 by 1 and append the rClassDeclaration 2S02 record loaded by the preceding two steps to aClassDeclarationTable 2T02.
    (4) Sort aClassDeclarationTable 2T02 to ascending order by wClassToken 2J04.
    (5) Specify the result of declaring the new class to be TRUE.

5. Exit FIG. 3P:
  a) Process 3PB10:
    (1) Remove Dialog 3B02.
    (2) Return to processes of 2V02.

G. FIG. 3Q

This figure details the preferred method for testing that the declaration of class occurrences is complete. Completeness is achieved when all events of the Event Occurrence History have been successfully assigned to a Class Occurrence as indicated by a TRUE value in the bStatus 3D10 variable of each rEventOccurrence 3D02 record of aEventOccurrenceHistory 3E02.

1. Verify completion of class occurrence declarations:
  a) Process 3Q04: Enter an infinite loop referencing each rEventOccurrence 3D02 record of aEventOccurrenceHistory 3E02. This loop is exited upon detecting the "End of File."
  b) Process 3Q06:
    (1) For each record of aEventOccurrenceHistory 3E02 test whether the element bStatus is set to TRUE:
      (a) If EOF is detected an error message is displayed prompting the user to take corrective action.
      (b) If bStatus is TRUE all class occurrences have been declared and processing of aEventOccurrenceHistory 3E02 has been completed.

H. FIG. 3R

This figure details the preferred method for conversion of class tokens in a manner to achieve ascending alphanumeric order of class names when class tokens are sorted to ascending numeric order. Conversion is performed on the aClassDeclarationTable and aClassOccurrenceHistory data structures:

1. Convert tags identifying name components:
  a) Process 3R04: Initiate the processes of FIG. 3S to convert name component tags into alternate, unique tags. See FIG. 3S.

2. Employ the converted name component tags to generate alternate, unique class tokens. The approach is to disassemble each class token into its component tag parts, transform these original tags into the redefined name component tags, and reassemble the transformed tags:
  a) Convert wClassToken of the aClassOccurrenceHistory 3J02 data set
    (1) Process 3R06: Loop over each element of aClassOccurrenceHistory 3J02.
    (2) Process 3R08:
      (a) Load the wClassToken 3I04 of the currently referenced rClassOccurrence 3I02 record of aClassOccurrenceHistory 3J02 to temporary storage wCurrToken formatted as 2H02.
        (i) Initiate the processes of FIG. 3S. See FIG. 3S.
      (b) The converted class token is stored back into the wClassToken element of the currently referenced aClassOccurrenceHistory 3J02 record.
  b) Convert wClassToken of the aClassDeclarationHistory 2T02 data set
    (1) Process 3R10: Loop over each element of aClassDeclarationHistory 2T02.
    (2) Process 3R12:
      (a) Load the wClassToken 2J04 of the currently referenced rClassidentification 3J02 record of aClassDeclarationHistory 2T02 to temporary storage wCurrToken formatted as 2H02.
        (i) Initiate the processes of FIG. 3S. See FIG. 3S.
      (b) The converted current class occurrence token is stored back into the currently referenced aClassDeclarationHistory 2T02 record.

3. The exemplar illustrates the results of altering the originally assigned wTaskToken values. In the case of the "AcquireTextbyDrag" task class the component stub tags are 2, 6, and 5 for the verb, noun, and qualifier components respectively. These original values represent the rows storing the stub strings of each name component. After revision the values stored in the tag components of the iTag column of the a{V&N&Q}TagOrderList arrays contain the row number in the a{V&N&Q}StubOrderList arrays of the said stub. In the "AcquireTextbyDrag" example the revised tags values become 1, 6, and 3 respectively. When revised tags of the name components are reassembled in the verb, noun, qualifier order of the original name, any listing of the task names performed in ascending order by wTaskToken will also be in alphabetic order by sTaskName.

I. FIG. 3S

This figure details the preferred method for managing conversion of the original unique class tokens into the alternate, equally unique class tokens used by FIG. 6 to provide a humanly comprehensible display of the jad structure. The original iTag values were assigned as the row of the relevant a{V&N&Q}TagOrderList to which a stub was assigned. The converted itag value is the row number of the alphabetically ordered {V&N&Q}TagOrderList containing the referenced stub:

1. Process 3S04: Initiate a loop over each element of the aTagOrderList 2Q02 currently passed to the processes of 3S02 by Process 3R04.
2. Process 3S06:
    a) Assign the value of the currently referenced aTagOrderList.sStub 2Q02 to temporary storage named sStub formatted as 2K02.
    b) Test if sStub is null:
        (1) If sStub is null iterate the loop to process the next 2Q02 record. This step is not strictly required for the present disclosure. However, since it is requisite to edit and delete capabilities it is included.
        (2) If sStub is non-null:
            (a) Perform a binary search of the aStubOrderList 2O02 to locate the row of 2O02 containing this string.
            (b) Load this result to aTagOrderList[iTagRow].iTag; i.e. the 2M06 element of row number iTagRow of the referenced 2Q02.
    c) Upon exiting the loop return to Process 3R04.
3. Exemplar Illustration: The "{V&N&Q} Components of Task Names" tables of FIG. 7E illustrate conversion of a{V&N&Q}TagOrderList iTag values. The "Original iTag" columns of the a{V&N&Q}TagOrderList arrays visually show the original tag value assigned each successive sStub to be the next unassigned row number of the Tag Order List. The "Revised iTag" columns visually shows that each revised tag number is the row number of the current a{V&N&Q}StubOrderList containing the same sStub string. As example, the "Acquire" stub of the aVTagOrderList of FIG. 7E was the second stub declared by the user and was assigned an original value of 2. Since "Acquire" is the first entry of stub list when alphabitized the revised iTag for "Acquire" is assigned the value 1.

J. FIG. 3T

This figure details the preferred method for disassembling a class token into its three component parts and regenerating it into the new, desired class token.

1. Process 3T04:
    a) Place the value of rClassOccurrence.wClassToken 3I04 into temporary storage at a location wCurrClassToken.
    b) Strip the bits labeled "Unused" by RIGHTSHIFTing wCurrClassToken six bits.
    c) Successively RIGHTSHIFT wCurrClassToken eight and ten bits, assigning the results to temporary variables named iOrigQTagOrderRow and iOrigNTagOrderRow respectively.
    d) Assign post-shift wCurrClassToken to temporary variable iOrigVOrderRow.
2. Process 3T06: Make the following assignments:
    a) i{V&N&Q}StubRow=a{V&N&Q}TagOrderList[iOrg{V&N&Q}TagOrderRow].iTag
3. Process 3T08:
    a) LEFTSHIFT the iVStubRow, iNStubRow, and iQStubRow values 24, 14, and 6 bites respectively.
    b) OR them to produce the desired new class token.
4. Process 3T10: Return the new class token to Process 3R08.
    a) Exemplar Illustration: FIG. 7E illustrates the conversion for, say, the Task Name of "AcquireTextbyDrag." The original task class component stub tags are 2, 6, and 5 for the verb, noun, and qualifier components respectively. These original values represent the rows storing the stub strings of each name component. After revision the values stored in the tag components of the iTag column of the a{V&N&Q}TagOrderList arrays contain the row number in the a{V&N&Q}StubOrderList arrays of the said stub. In the "AcquireTextbyDrag" example the revised tags values become 1, 6, and 3 respectively. When revised tags of the name components are reassembled in the verb, noun, qualifier order of the original name, any listing of the task names performed in ascending order by wTaskToken will also be in alphabetic order by sTaskName.

IV. FIG. 4: Identification and Tally of Jads

This figure discloses the preferred implementation for identifying each different jad up to a maximum size present in the Class Occurrence History and for determining the number of occurrences of each different jad. Externally provided information required is: maximum jad size, declaration to include or exclude error in the jad structure, and specification of the source of jad probabilities.

A. FIG. 4E

This figure details the preferred methods for managing the structure and initialization of requisite data areas, the identification of each different jad, the tallying of occurrences of each jad, and the storage of resulting data:

1. Initialize data areas:
    a) Process 4E04:
        (1) Read iNumClasses and aClassDeclarationTable from disk at 1A12 and write to direct access storage at 2R02 and 2T02 respectively.
2. Activity preparatory to generation of the IIJadTree 4D02 structure. The user must specify: (1) the maximum number of events that comprise the maximum jad, (2) whether a "RealWorld" or "NoError" jad structure is to be generated, and (3) whether the source of jad probabilities is "Internal" or "External":
    a) User Activity 4E06:
        (1) The user specifies the maximum number of events to appear in any jad based either on the minimum jad size for which Eq 10 returns sufficiently small values or on exogenous information. This value is stored in iMaxJadLevel 4A02.
        (2) The user specifies whether the jad structure to build is to be "RealWorld" or "NoError". Generally, a complete analysis will entail generating both types of jad structure. This value is stored in temporary string variable sJadType.

(3) The user specifies whether the jad probabilities are to be obtained by "Internal" or "External" mechanisms. If "Internal" probabilities are utilized the preferred implementation appears below. If "External" probabilities are utilized techniques employed will be application specific for which a preferred implementation cannot provided other than the recommendation that my Interface Grammar (patent number X,XXX,XXX) be utilized and that procedures presented by FIG. 5 be adapted for the actual loading of probabilities to IIJadTree.rPr elements. This value is stored in temporary string variable sProbSource.

b) Process 4E08:

(1) Initialize array aLevelResults 4B02 by setting all iTally elements to 0 and all rH elements to 0.0.

(2) The computer accesses the heap and allocates memory for the first rTokenNode 4C02 record. The starting address of this memory location, termed the "Root", is stored in a pointer word named pRoot 4D04.

3. Generation of the jad structure:

a) Process 4E10: Initiate a loop in which each iteration identifies the next jad present in aClassOccurrenceHistory 3J02. The loop terminates when the final 3J02 event is processed.

b) Process 4E12:

(1) Initialize temporary variables used to manage error conditions encountered during jad generation:

(a) iErrorTally is initialized to 0. iErrorTally stores the tally of events spanned by the jad that have been declared erroneous by processes of 3L08.

(b) iClassError is loaded, when appropriate, with the value contained in iClassError 3112 of the rClassOccurrence 3102 record currently referenced by iCurrOccLoc.

(2) A test is performed to ascertain whether the currently referenced class occurrence is skipped; i.e., given an erroneous class occurrence, is a "NoError" or "RealWorld" jad desired:

(a) If the current event is skipped, iterate the loop to reference the next event.

(b) If the current event is not to be skipped perform the following data assignments at commencement of each jad identification:

(i) iCurrJadLevel→a temporary variable used to manage which event of a jad is being processed. Initialize to −1.

(ii) pCurrTokenNode→a temporary variable that stores the address of the rTokenNode of IIJadTree currently being referenced. Initialize to the address in pRoot.

(iii) aLevelResults.aLevelTally[0]→an element of a permanent data structure used to store the total number of iMaxJadLevel jads in the aClassOccurrenceHistory. Increment by 1.

c) Process 4E16: Identify the next jad by processes of 4F02. See FIG. 4F

4. Store the jad data structure:

a) Process 4E18: Read iMaxJadLevel 4A02, aLevelResults 4B02B and IIJadTree 4D02 from direct access storage and write to disk at 1B10.

B. FIG. 4F

This figure discloses the recursive processing that is the preferred implementation for generation of the linked list data structure named IIJadTree 4D02. All jads up to and including a specified maximum size are generated from the ordered sequence of class tokens present in the Class Occurrence History. Each node of 4D02 has the structure disclosed by rTokenNode 4C02 of FIG. 4C as follows:

wClassToken (4C04)→a four byte memory area that stores the revised wClassToken. 4C04 is initialized with the wClassToken 3104 of rClassOccurrence 3102 referenced in aClassOccurrenceHistory 3J02 at node creation. Once initialized this value remains unchanged.

pChild (4C06)→a pointer variable storing the location of a node's $1^{st}$ Child. pChild is null if the node is at iMaxJadLevel, i.e., a leaf, or within the first (iMaxJadLevel-1) elements of 3J02. Initialized to null at node creation.

pSibling (4C08)→a pointer variable storing the location of the next sibling to be visited. If pSibling is null there is no rightward sibling. Initialized to null at node creation.

iTally (4C10)→an integer variable storing the number of jad occurrences of any referenced node. Initialized to 0 at node creation.

rPr (4C12)→a real variable storing the probability of occurrence of the current jad. Initialized to 0.0 at node creation.

rh (4C14)→the real variable storing average informational content of each occurrence of the current jad. Initialized to 0.0 at node creation.

rAddedInfo (4C16)→an real variable for storing incremental information added by the second token of a dyad. This is employed during Information Balance analysis.

1. A description of how to interpret the IIJadTree structure makes the purpose of the following disclosures more understandable. IIJadTree represents a jad as a linked node sequence in which a full jad embodies one node per IIJadTree level. In each jad the chronologically most recent event of a jad occupies a level 1 node, the next most recent event a level 2 child node of the parent, etc. To illustrate consider the aTaskOccurrenceHistory table of FIG. 7F. The full jad commencing with task number 3 is identified by revised wTaskToken [163], [121], [111] which display in humanly comprehensible form as: "AcquireTextbyDrag", "AcquireIconbyClick", "AcquireGraphicbyClick." To identify this jad in the IIJadTree structure, scan level 1 nodes to find the node identified by [163]. Note that the only child to this node is identified as [121]. Scan the children of the [121] node to locate the [111] node. Once the IIJadTree is fully built, the IIJadTree.iTally element of the iMaxJadLevel level displays the total number of occurrences of the jad for which this event in the aPhysicalOperatorOccurrenceHistory array is a leaf. The value in a level 2 node IIJadTree.iTally element denotes the number of occurrences of the dyad in which that node is preceded by its parent. In the above illustration the level 2 node labeled [121] has iTally value of 3. Visual scan of FIG. 7C conveys that the dyad "AcquireTextbyDrag", "AcquireIconbyClick" occurs exactly three times, as is communicated by IIJadTree.

2. Determine whether to accept a class occurrence for analysis and when to terminate the recursive generation of the current jad:

a) Process 4F04:

(1) The initial integer value of the current jad level, iCurrJadLevel, is passed into the 4F02 processes at its first activation by Process 4E16. Thereafter recursion of 4F02 processes result in the iCurrJadLevel variable being incremented as appropriate; said incrementing occurring at the commencement of each 4F02 recursion.

(2) Test whether iCurrJad exceeds iMaxJadLevel to determine whether recursion has reached a leaf event:

(a) If iCurrJad>iMaxLevelJad, all events required to identify the current jad have been processed. Recursion is terminated by exiting the processes of 4F02.

(b) If iCurrJad≦iMaxLevelJad, recursion is continued with Process 4F06.

b) Process 4F06: These processes form a screening loop. With appropriate parameterization this loop excludes events designated as erroneous by the iClassError 3I12 variable of the currently referenced rClassOccurrence 3I02 record of aClassOccurrenceHistory 3J02.

(1) To exclude a 3J02 record it is required that the record be erroneous; i.e., that the value stored in 3I12 be greater than 0, and that the user specified via Process 4E06 that a "NoError" jad structure 4D02 is to be generated. FIG. 7F shows tasks numbered 9, 10, and 11 of the aTaskOccurrenceHistory to be erroneous. The influence of these errors on IIJadTree generation is illustrated by FIG. 7G. The "Real-World" IIJadTree allocates level 1 nodes for all three error nodes even though two of these nodes occur only as error nodes. The "Error-Free" IIJadTree does not contain these two error nodes; namely, nodes [254] and [432]. Also of note is the "skipping-over" of error nodes in an "Error-Free" jad. Thus, the "Error-Free" jad for task number 12 of FIG. 7F is [117], [121], [163]; a jad not present in the "Real-World" IIJadTree.

(2) The rClassOccurrence 3I02 record to be referenced is the (iOccLoc)$^{th}$ element of aClassOccurrenceHistory 3J02. The value of iOccLoc is iMaxJadLevel Level minus iCurrJadLevel plus—as appropriate— any erroneous rClassOccurrence 3I02 records. Generally the value of the wClassToken 3I04 of said referenced class occurrence is loaded to the temporary variable named wCurrToken, formatted as 3I04. The exception to loading wClassToken to wCurrToken is when it is necessary to manage "start-up" jads:

(a) If iOccLoc is negative this reflects cases in which insufficient prior class occurrences exist to permit generation of a jad of iMaxJadLevel events.

(b) FIG. 7G of the exemplar in illustrates. Since the first task performed has no prior tasks, the FIG. 7G IIJadTree reflects this by an absence of children for the [111] node of the first level jad. Similarly, the second event of FIG. 7G is not a full jad as shown by the level 2 child, node [111], of the level 1 parent, node [121] not having children.

(3) Upon acceptance of a 3J02 record the iTally element of the appropriate aLevelResults 4B02 row is incremented by 1 to tally the jads processed at the current level.

3. For jads of size less than iMaxJadLevel ascertain whether children have been previously identified for the current jad:

a) Process 4F08:

(1) Reference the address stored in the pChild 4C06 variable of the currently referenced pCurrToken-Node 4D02 and test its value:

(a) If pChild is non-null a child has previously been encountered for the current node and processing continues with processes of 4F10.

Figure 4E:
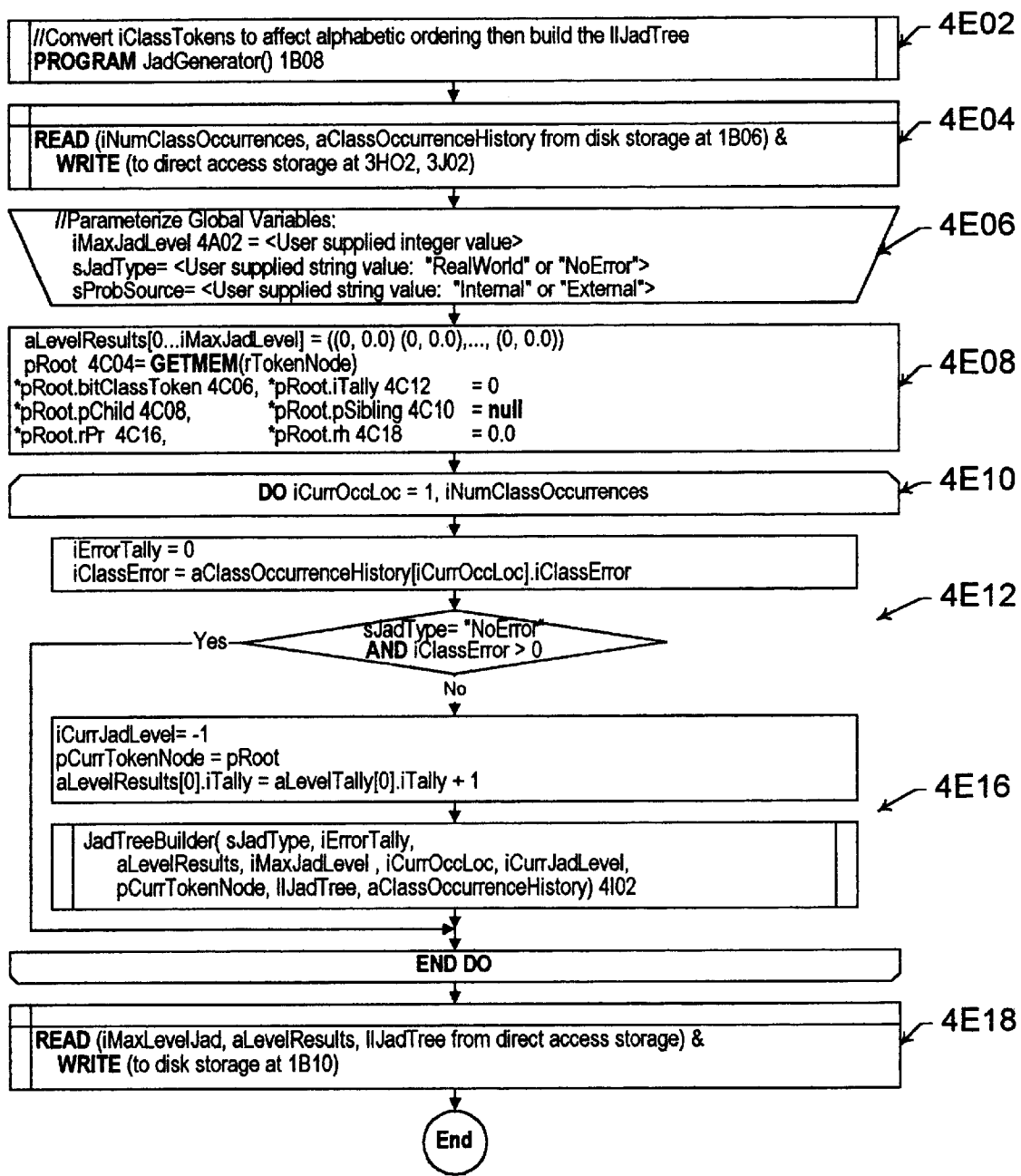
Figure 4F:
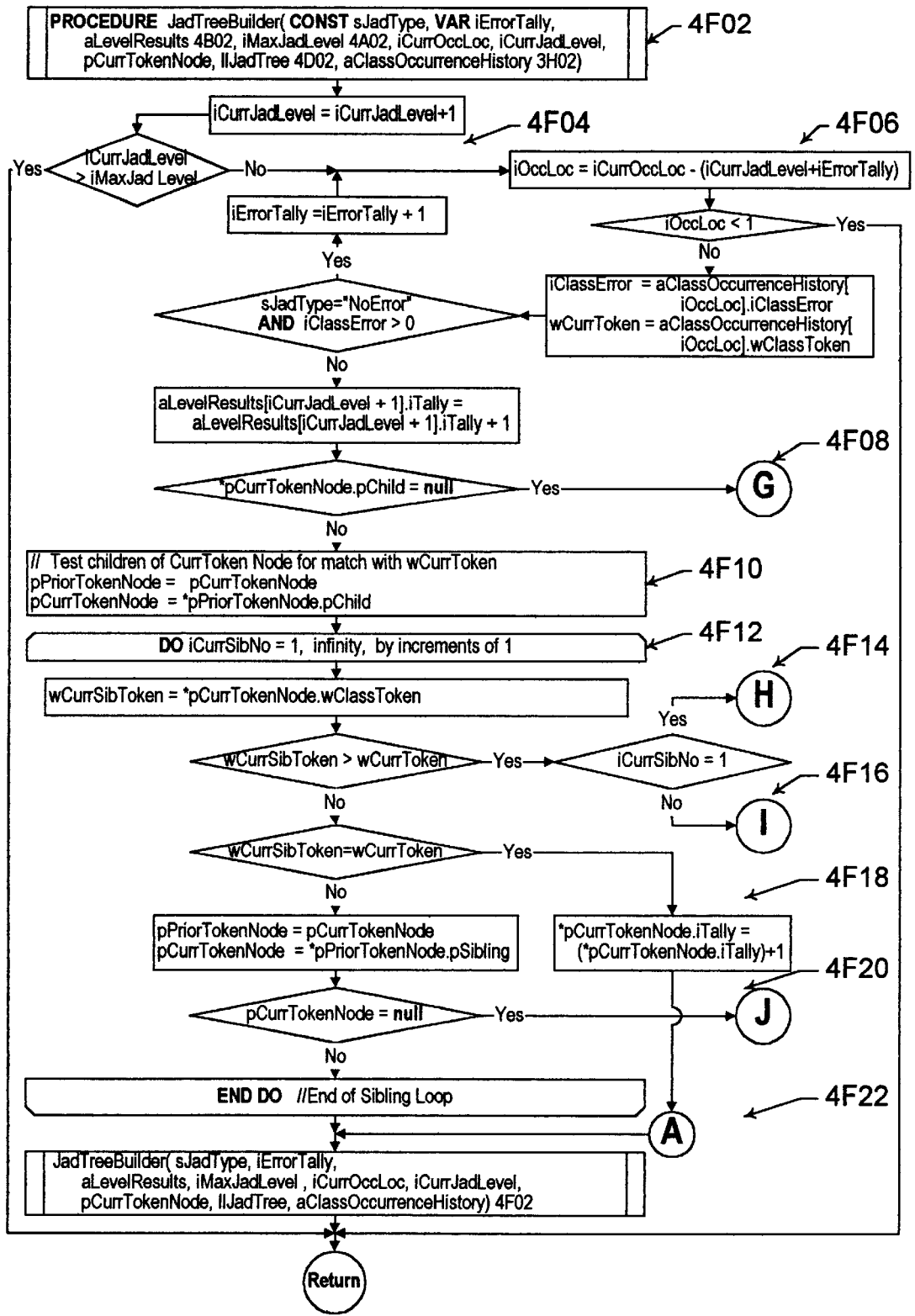
Figure 4G:
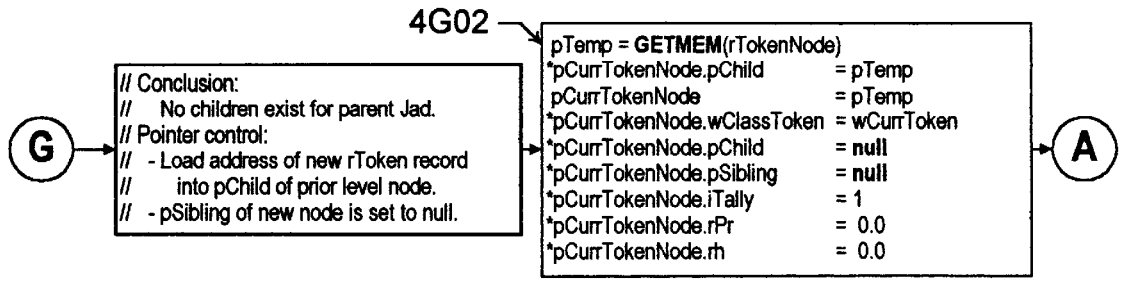

(b) If pChild is null the processes of FIG. 4G following are initiated:

(i) FIG. 4G: This figure details management of memory allocation and pointer control for insertion of a node's first child:

(a) Allocate memory for an rTokenNode 4C02 record from the heap and load its start address into temporary variable pTemp.

(b) Make the current node point to the newly allocated memory by loading the address of the new node into the pChild 4C06 variable of the current node.

(c) Assign the newly generated node to be the current node by loading pTemp into pCurrTokenNode.

(d) Load the value stored in 3I04 of the currently referenced aClassOccurrenceHistory [iOccLoc] 3J02 into the wClassToken 4C04 variable of the new node.

(e) In the new node initialize the pChild 4C06 and pSibling 4C08 variables to null, the iTally 4C10 variable to 1, and the rPr 4C12 and rh 4C14 variables to 0.0.

(f) Exit FIG. 4G by returning to the "A" location. Process 4F22 is entered from this location. Process 4F22 initiates the recursion that continues developing the jad via processes of 4F02.

4. When the current node has children, scan these children via the sibling chain to identify the insertion point that maintains ascending order by wClassToken. Three category of insertion point must be managed: (1) insertion as the leftmost sibling, (2) insertion as a midchain sibling, (3) insertion as the rightmost sibling:

a) Process 4F10:

(1) In anticipation of inserting a new sibling into the sibling chain, load the address currently in pCurrTokenNode into the temporary variable pPriorTokenNode.

(2) To start the search among siblings, point to the first sibling by loading the address stored in the pChild 4C06 element of the current node into the pCurrTokenNode pointer variable, thus updating the node of reference.

b) Process 4F12: Enter a loop that traverses the sibling chain as far as required to insert the node identified by wCurrToken in ascending sibling order.

c) Process 4F14: Test whether wCurrSibToken>wCurrToken.

(1) If not, the ascending order insertion point for the new sibling has not been exceeded and processing continues with Process 4F18.

Figure 4H:
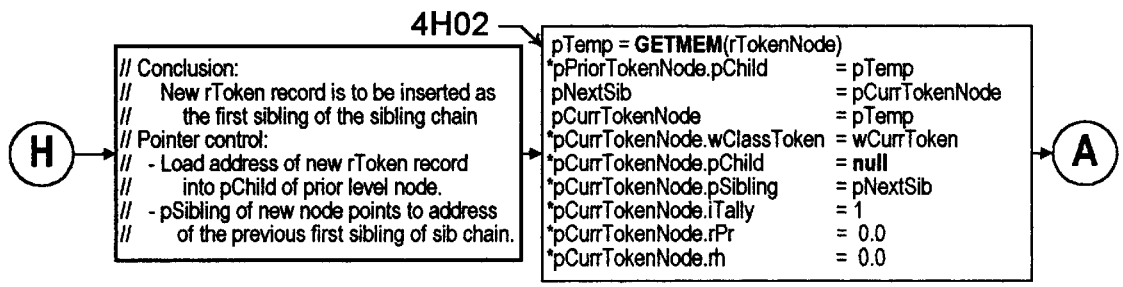

(2) If wCurrSibToken>wCurrToken, the ascending order insertion point for the new sibling has been exceeded and the insertion location for the new sibling found. Test whether the identified location is a left-most sibling by testing iCurrSibNo; namely, the loop index of Process 4F12:

(a) If iCurrSibNo=1 initiate FIG. 4H via Process 4F14:

(i) FIG. 4H: This figure details management of memory allocation and pointer control for insertion of a node into the leftmost location in the sibling chain:

(a) Allocate memory for a rTokenNode 4C02 from heap memory and load its start address to temporary variable pTemp.
(b) Load the address of located in *pCurrTokenNode.pChild to *pTemp.pSibling, the new node, pTemp, to the parent node *pPriorTokenNode.pChild, and the address in pTemp to pCurrTokenNode.
(c) In the new node initialize the pChild 4C06 variable to null, the iTally 4C10 variable to 1, and the rPr 4C12 and rh 4C14 variables to 0.0.
(d) Exit FIG. 4H by returning to the location labeled "A." Process 4F22 is entered from this location. Process 4F22 initiates the recursion that continues developing the jad via processes of 4F02.

Figure 4I:
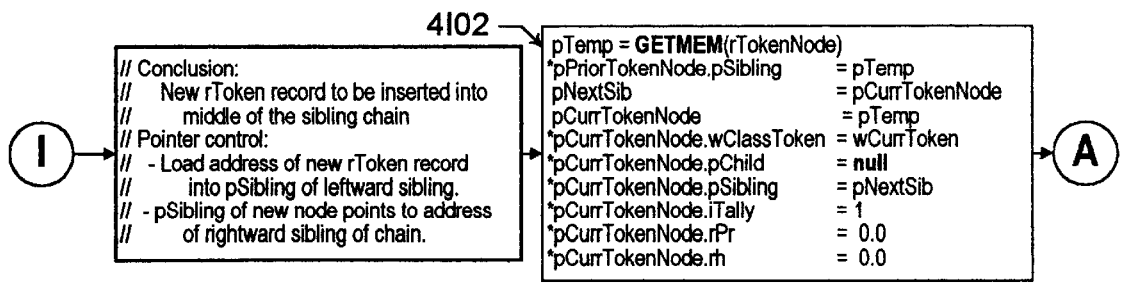
Figure 4J:
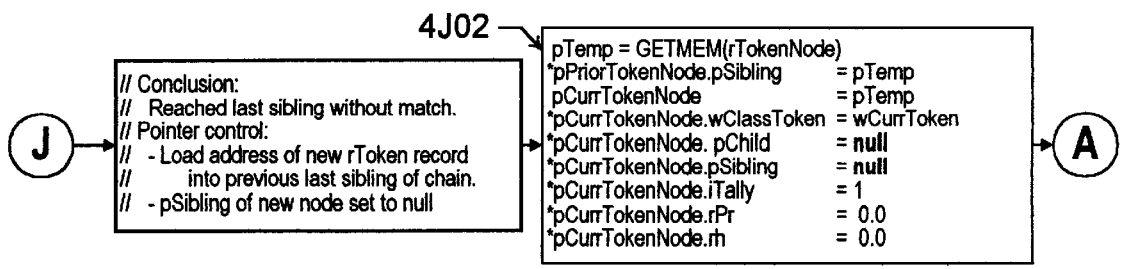

(b) If iCurrSibNo>1 initiate FIG. 4I via Process 4F16:
  (i) FIG. 4I: This figure details management of memory allocation and pointer control for insertion of a node into a non-end location of the sibling chain:
    (a) Allocate memory for a rTokenNode 4C02 from heap memory and load its start address to temporary variable pTemp.
    (b) Load the address held in *pPriorTokenNode.pSibling to *pTemp.pSibling and the address in pTemp to both *pPriorTokenNode.pSibling and pCurrTokenNode.
    (c) In the new node initialize the pChild 4C06 variable to null, the iTally 4C10 variable to 1, and the rPr 4C12 and rh 4C14 variables to 0.0.
    (d) Exit FIG. I by returning to the location labeled "A." Process 4F22 is entered from this location. Process 4F22 initiates the recursion that continues developing the jad via processes of 4F02.

d) Process 4F16: Test wCurrSibToken for equality with wClassToken.
  (1) If wCurrSibToken=wClassToken, the current node is an occurrence of a previously visited node. Initiate Process 4F18:
    (a) Process 4F18:
      (i) Increment *pCurrTokenNode.iTally by 1.
      (ii) Proceed to location "A." and enter Process 4F22. Process 4F22 initiates the recursion that continues developing the jad via processes of 4F02.
  (2) If wCurrSibToken≠wClassToken the insertion location for the new node has not been reached. Initiate Process 4F20:

e) Process 4F20:
  (1) Advance to the next node in the sibling chain:
    (a) Load the address in pCurrTokenNode to pPriorTokenNode.
    (b) Load the address in *pPriorTokenNode.pSibling into pCurrTokenNode.
  (2) Test the value in the newly assigned pCurrTokenNode.
    (a) If pCurrTokenNode≠null iterate the loop and reference the next sibling of the sibling chain by returning to Process 4F12.
    (b) If pCurrTokenNode=null, initiate processes of FIG. 4J:
      (i) FIG. 4J: This figure details management of memory allocation and pointer control for insertion of a node into the rightmost location of the sibling chain:
        (a) Allocate memory for a rTokenNode 4C02 from heap memory and load its start address to temporary variable pTemp.
        (b) Load the address in pTemp to both *pPriorTokenNode.pSibling and pCurrTokenNode.
        (c) In the new node initialize the pChild 4C06 and pSibling 4C08 variables to null, the iTally 4C10 variable to 1, and the rPr 4C12 and rh 4C16 variables to 0.0.
        (d) Exit FIG. 4J by returning to the location labeled "A." Process 4F22 is entered from this location.

5. The management of the IIJadTree for the node of the current iteration is complete. Recursion is initiated to handle the next event of the current jad.
  a) Process 4F22 initiates the recursion that continues developing the jad via processes of 4F02.

V. FIG. 5: Generation of the Jad Probability Set, Determination of Information Content of Jad Nodes, and Determination of Information Added by Symbols of a Jad This figure discloses the preferred methods for: (1) performing a depth first traverse of the jad structure, (2) application of Eq 3 to determine endogenously the probability of occurrence of each different jad, and (3) application of Eq 4 to determine the information embodied in each different jad.

Figure 5B:
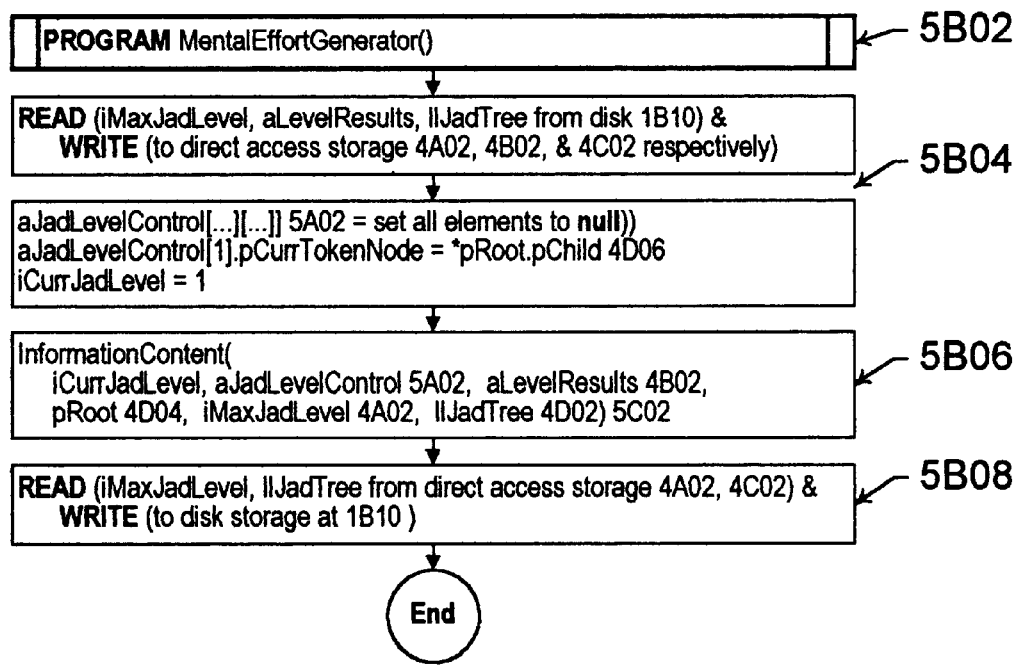

A. FIG. 5B
This figure discloses the preferred processes to manage the depth-first traverse of the completed IIJadTree 4D02:
1. Initialize data areas:
  a) Process 5B04:
  b) Read iMaxLevelJad, aLevelResults and IIJadTree from disk at 1B10 and write to direct access storage at 4A02, 4B02, and 4D02 respectively
  c) Perform initialization of aJadLevelControl 4D0 prior to commencing the traverse:
    (1) Set to null all elements of aJadLevelControl 5A02.
    (2) Load the address contained in the pChild variable pointed to by pRoot to the pCurrTokenNode element of the first row of aJadLevelControl 5A02.
    (3) Initialize the temporary variable iCurrJadLevel to 1.
2. Determine the probability and information content of each Jad node:
  a) Process 5B06:
    (1) Initiate the processes of 5C02 which employs the dynamically managed aJadLevelControl 5A02 array to control a depth-first traverse of IIJadTree 4D02.
    (2) The traverse IIJadTree 4D02 is complete when iCurrJadLevel contains the value 0.
3. Store results:
  a) Process 5B08:
    (1) Read iMaxLevelJad 4A02, aLevelResults 4B02, and IIJadTree 4D02 from direct access storage and write to disk at 1B10.

Figure 5C:
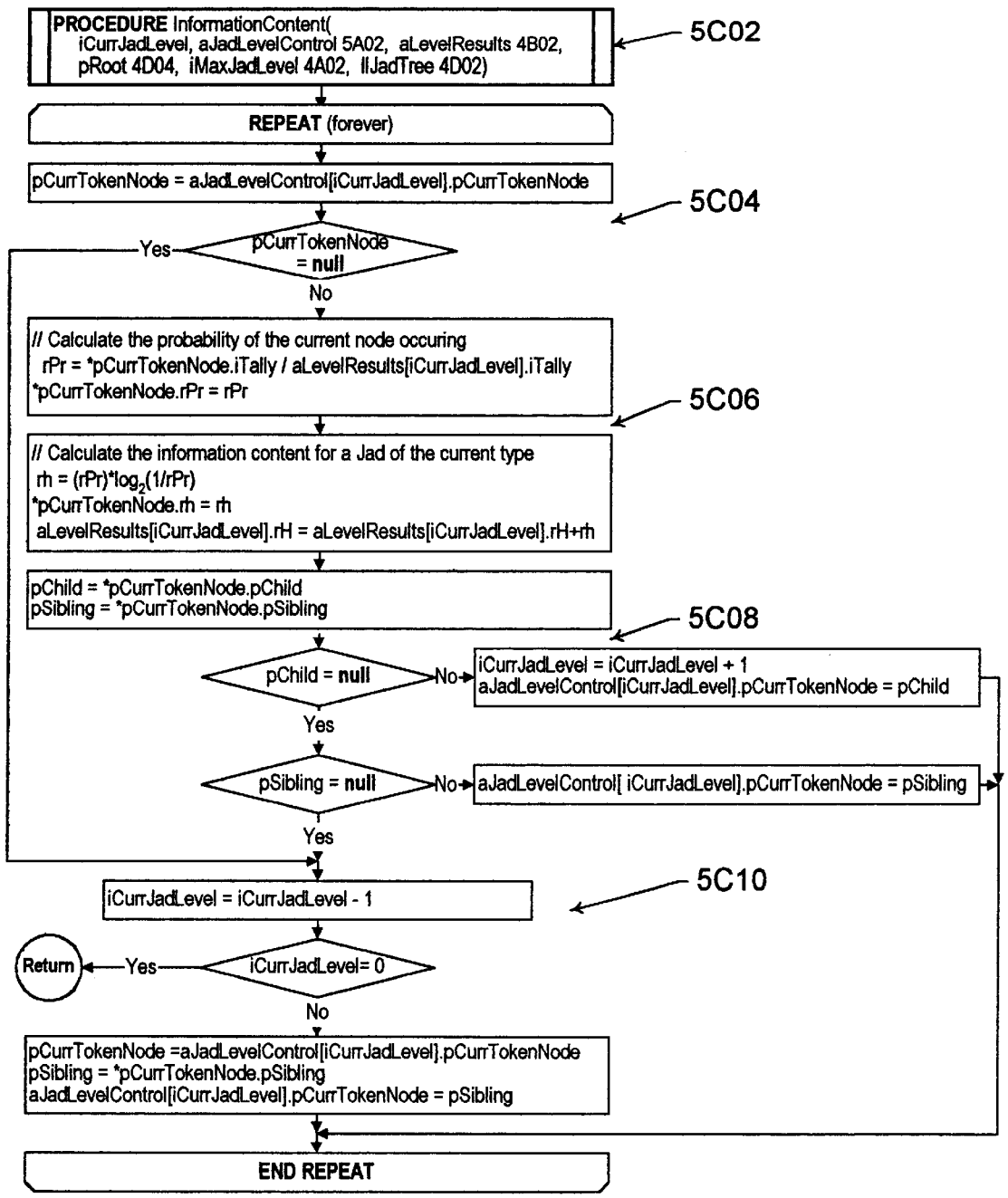

B. FIG. 5C
This figure details the preferred implementation for dynamically maintaining the address of the most recently visited node at each IIJadTree 4D02 level and employing these addresses to manage traversing of this structure. This figure also details application of Eq 3 and Eq 4 to generate the probabilities and information content of each node:
1. Set-up and test for presence of a node:
  a) Process 5C04:
    (1) Initiate an endless loop that continues until the depth-first traverse of the IIJadTree 4D02 data structure is complete.

(2) Load the address stored in the pCurrTokenNode element of the iCurrJadLevel$^{th}$ row of aJadLevelControl 5A02 to temporary variable pCurrTokenNode.
(3) Test whether pCurrTokenNode is null.
   (a) If pCurrTokenNode=null, the current downward traverse is complete and a new traverse path entered via the processes of 5C10.
   (b) If pCurrTokenNode≠null, initiate the processes 5C06.
2. Calculate the probability and information content of the present node.
   a) Process 5C06:
      (1) To calculate the probability of the referenced node:
         (a) Reference the tally for the current node at *pCurrTokenNode.iTally 4C10.
         (b) Reference the total number of jads of the current level by referencing aLevelResults[iCurrJadLevel].iTally 4B02.
         (c) Divide (a) by (b) to obtain the probability rPr.
         (d) Load the rPr result into the rPr 4C12 element of the current 4D02 node.
      (2) To calculate the information content of the referenced node:
         (a) Determine rh by multiplying rPr by the log base 2 reciprocal of rPr.
         (b) Load the rh result into the rh 4C14 element of the current 4D02 node.
   b) The exemplar, FIG. 7G, illustrates results of these calculations. Resulting illustrative real number values appear in the "rPr" and "rh" element of each node. Consider the "Real-World" triad [111][121][163] of FIG. 7G; a triad which translates to "AcquireGraphicsbyClick", "AcquireIconbyClick", "AcquireTextbyDrag." The probability of this triad is 0.091 with an information content of 0.314. Similar data for the three occurrences of the dyad [121][163] contained within the triad is rPr=0.250 and rh=0.500. If these data for the other dyad, [111][121], of the triad are desired for use in performing an Information Balance analysis, scan level 1 for the [121] node and its children for [111]. Results of this scan are rPr=0.083 and rh=0.299.
3. Identify the next downward node in the depth-first traverse of IIJadTree by preparing to move to the current node's child, to the next sibling of the current node in the absence of a child, or to traverse backward in the absence of both a child and sibling:
   a) Process 5C08:
      (1) Load the value of the pChild 4C06 element of the currently referenced node of 4D02 into the temporary variable pChild. Similarly, load the value of the pSibling 4C08 element of the currently referenced node of 4D02 into the temporary variable pSibling.
      (2) Test if pChild is null:
         (a) If pChild≠null:
            (i) Increment iCurrJadLevel by 1.
            (ii) Load the value in pchild into the element of aJadLevelControl 5A02 referenced by iCurrJadLevel.
            (iii) Terminate the current loop by continuing with Process 5C04.
         (b) If pChils=null continue with testing of sibling status.
      (3) Test if pSibling is null:
         (a) If pSibling≠null:
            (i) Without incrementing iCurrJadLevel load pSibling into the element of aJadLevelControl 5A02 referenced by iCurrJadLevel.
            (ii) Terminate the current loop by continuing with Process 5C04.
         (b) If pSibling=null:
            (i) The currently referenced node has neither a child nor rightward sibling and the traverse is at its maximul depth.
            (ii) Initiate Process 5C10.
4. Identify the backward node to be accessed by the reverse traverse:
   a) Process 5C10:
      (1) Decrement iCurrJadLevel by 1.
      (2) Test whether iCurrJadLevel is 0:
         (a) If iCurrJadLevel=0:
            (i) Traverse of IIJadTree 4D02 is complete.
            (ii) Exit FIG. 5C and continue with Process 5B08.
         (b) If iCurrJadLevel>0 perform the following assignments to set-up reference to the next node.
            (i) Load the address of the parent of the present node into temporary storage named pCurrTokenNode by the referencing the iCurrTokenNode element of the iCurrJadLevel$^{th}$ row of aJadLevelControl 5A02.
            (ii) Load the temporary variable pSibling with the address of the sibling pointed to by this parent node accessing the pSibling 4C08 variable of IIJadTree 4D02 node pointed to by pCurrTokenNode.
            (iii) Update the iCurrJadLevel element of aJadLevelControl 5A02.
            (iv) Continue with Process 5C04 to initiate a another traverse path.

VI. FIG. 6: Mental Effort Report Generator

This figure discloses two aspects of this invention: (1) the preferred implementation for the generation of data requisite to application of Eq 11 and (2) the preferred extraction of data appropriate for the generation of a humanly comprehensible basic report of the information content of the aClassOccurrenceHistory being analyzed. Management of the depth-first traverse employed by the Report Generator is similar to that disclosed by FIG. 5. Because principle divergences from FIG. 5 relate only to reading and initialization of data arrays and to data requisite to implementation of Eq 11, only differences in the two disclosures will be detailed here. Because of the diversity of displays that may be desired and because no skills beyond those typical for persons knowledgeable in these arts, specific instruction of formatting is not presented. However, FIG. 7H of the exemplar is provided to offer a suggestive display.

A. FIG. 6A

This figure employs the preferred method of FIG. 5 to manage previously detailed data structures, their initialization, and the overall control required for a depth-first traverse of the finished jad data structure.
1. Initialize data areas:
   a) Process 6A04:
      (1) Read iMaxLevelJad, aLevelResults and IIJadTree from disk at 1B10 and write to direct access storage 4A02, 4B02, and 4D02 respectively.
      (2) Read iNumClasses and iClassDeclarationTable from disk at 1A12 and write to direct access storage 2R02 and 2T02.
      (3) Initialize to commence jad traverse: See V.A.1.c). (1)–(3).
2. Extract data requisite to a report of the information content of the aClassOccurrenceHistory:
   a) Process 6A06: Initiate the processes of 6B02
   b) The exemplar's FIGS. 7H illustrate one possible display for a basic report. The intent is not to suggest analysis of information content of any work session history or data derived therefrom since this, in general, is application specific, but to demonstrate how to provide a humanly comprehensible overview display that identifies jads present in a aTaskOccurrenceHistory, their frequency of occurrence, and the average information content of each.

B. FIG. 6B

This figure details methods for location and manipulation of basic data contained in one form of a a report summarizing information content of the aClassOccurrenceHistory. This figure additionally initiates processes which provide data required for implementation of Information Balance analysis and then implements this metric.

1. Set-up and test for presence of a node:
   a) Process 6B04: See V.B.1
2. Extract and display data stored in the current IIJad node:
   a) Process 6B06:
      (1) Load wClassToken 4C04 from the currently referenced jad node to temporary variable wCurrClassToken.
      (2) Using wCurrClassToken as the index, perform a binary search of aClassDeclarationTable 2T02 to find the row of 2T02 detailing the class identified by wCurrClassToken. Place the results into temporary variable iRow.
      (3) Load aClassDeclarationTable[iRow].rClassIdentification.sClassName 2T02 to temporary variable sCurrName.
      (4) Employing whatever format is desired display the values of sCurrClassName. 2T02, iTally 4C10, rPr 4C12, and rh 4C14 of the currently referenced jad node.
3. Perform and display the results of Information Balance analysis:
   a) Process 6B10:
      (1) Test whether the search depth is at its maximum level and that jad analysis is at least at the required trial devel necessary for Information Balance analysis.
         (a) If Information Balance data is not to be generated, continue with processes of 6B10.
         (b) If Information Balance data is to be generated:
            (i) Initiate processes of FIG. 6C to develop data required to implement Eq 11.
            (ii) Display Information Balance results:
            (a) Enter a loop referencing the rhPerInfo 4C16 variables of aJadLevelControl 5A02 stored for $h_{21}$-$h_1$, $h_{32}$-$h_2$ for triad level analysis, $h_{21}$-$h_1$, $h_{32}$-$h_2$, $h_{43}$-$h_4$ for tetrad level analysis, etc.
            (b) Divide chrologically contiguous values.
            (c) Display in the format desired.
4. Identify the next node in the depth-first traverse of IIJadTree by preparing to move to the current node's child, to the next sibling of the current node in the absence of a child, or to traverse backward in the absence of both a child and sibling.
   a) Process 6B12: See V.B.3.a).

C. FIG. 6C

This figure details the preferred method of FIG. 5 to generate data requisite to implementing information balance analysis.

1. Perform requisite initialization
   a) Process 6C04:
      (1) Enter a loop to iterate over each dyad of a full jad.
      (2) Identify the tokens forming the dyad performed most recently in time:
         (a) Reference the pCurrTokenNode variable of aJadLevelControl row 1 to obtain the node of IIJadTree containing the most recent token of the current jad. Term this token Token 1.
         (b) Reference the pCurrTokenNode variable of aJadLevelControl row 2 to obtain the node of IIJadTree containing the next most recent token of the current jad. Term this Token 2
      (3) Reference the first node of the IIJadTree and access its token
2. Locate and extract data relating to Token 1:
   a) Process 6C06
      (1) As required iterate through level 1 of the IIJadTree 4D02
      (2) Test whether the currently referenced node is the node for Token 1:
         (a) If the current node is not the node of Token 1:
            (i) Reference the sibling of the current node.
            (ii) Extract the token of this new node and iterate to test if this new current node is the node of Token 1.
         (b) If the current node is the node of Token 1:
            (i) Reference the rh 4C12 and iTally 4C10 variables of this IIIadTree 4D02 node.
            (ii) Divide rh by the tally to determine average information per token. Term this result rhPerToken1.
            (iii) Load the child of the currently referenced IIJad node to temporary variable pCurrNode
3. Locate and extract data relating to Token 2
   a) Process 6C08: Parent iteration
      (1) Reference the pCurrTokenNode variable aJadLevelControl row 2 to obtain the node of IIJadTree containing the next most recent token of the current jad. Extract this token as the current token
      (2) Test whether the currrently referenced node is the node for Token 2:
         (a) If the current node is not the node of Token 21:
            (i) Reference the sibling of the current node.
            (ii) Extract the token of this new node and iterate to test if this new current node is the node of Token 2
         (b) If the current node is the node of Token 2:
            (i) Reference the rh 4C12 and iTally 4C10 variables of this IIIadTree 4D02 node.
            (ii) Divide rh by the tally to determine average information per token. Term this result rhPerToken21
4. Determine the benefit of knowing the preceding token.
   a) Process 6C10:
      (1) The level of uncertainty managed by the user when executing the action producing Token 1 given that the action leading to Token 2 was the preceeding action is obtained as the difference between rhPerToken21 and rhPerToken1. Store this result in the temporary variable rAddedInfo.
      (2) Recommended storage of rAddedInfo:
         (a) For immediate display of Information Balance analysis load the temporary value rAddedInfo into the rAddedInfo variable of the (iCurrLevel+1)$^{th}$ row of aJadLevelControl 5A02.
         (b) For analysis of Information Balance load the temporary value rAddedInfo to the 4C16 element of the IIJadTree 4D02 node containing Token 2; i.e., the IIJadTree node currently pointed to by pCurrNode
(3) Iterate to complete processing of the next dyad
(a) Any even numbered pass through the 6C04 outer loop processes the second dyad of the current triad being analyzed for Information Balance.
(i) Token 1 of the new pass through Processes 6C04–6C10 is Token 2 of the prior pass.
(ii) Token 2 of the new pass is the parent of what is now Token 1
(b) Processing for jads exceeding the triad level entail additional passes through the 6C04–6C10 processes.

The invention has been described in an exemplary and preferred embodiment, but is not limited thereto. Those skilled in the art will recognize that a number of additional modifications and improvements can be made to the invention without departure from the essential spirit and scope. The scope of the invention should only be limited by the appended set of claims.

I claim:

1. A computer-implemented apparatus for evaluating a computer-human interface, comprising:
a memory for storing at least one work session history comprising a sequence of tokens corresponding to events associated with performance of a predetermined test suite using a first computer-human interface;
a first processing mechanism for evaluating said tokens to determine the quantity of information embodied within said tokens and for using said quantity of information as a first metric reflecting the human effort associated with using said first computer-human interface to perform said predetermined test suite.

2. The computer-implemented apparatus of claim 1 further comprising:
a second processing mechanism for ascertaining the ratio of the incremental quantity of information attributable to inclusion of an additional token to a predetermined base quantity of information and for using said ratio as a second metric reflecting the redundancy inherent to said first computer-human interface.

3. The computer-implemented apparatus of claim 1 further comprising:
a second processing mechanism for identifying serial correlation within chronologically contiguous groups of said tokens and for assessing the relative incremental quantity and relative information balance of information attributable to each token in at least one of said groups and for using said relative incremental quantity as a second metric reflecting a degree of difficulty associated with said first computer-human interface.

4. The computer-implemented apparatus of claim 1 further comprising:
a second processing mechanism for ascertaining the ratio of the incremental quantity of information attributable to inclusion of an additional token to a predetermined base quantity of information and for using said ratio as a second metric reflecting the redundancy inherent to said first computer-human interface; and
a third processing mechanism for identifying serial correlation within chronologically contiguous groups of said tokens and for assessing the relative incremental quantity and relative information balance of information attributable to each token in at least one of said groups and for using said relative incremental quantity as a third metric reflecting a degree of difficulty associated with said first computer-human interface.

5. The computer-implemented apparatus of claim 1 further comprising:
a second processing mechanism for removal of erroneous instances of said tokens to identify a set of error-free tokens and for ascertaining the ratio of the quantity of information embodied within remaining said error-free tokens to a predetermined base quantity of information and for using said ratio as a second metric reflecting the level of error associated with said first user performing said test suite with said first computer-human interface.

6. The computer-implemented apparatus of claim 1, further comprising:
a second processing mechanism ascertaining the ratio of information embodied within a sequence of said tokens generated by a person of arbitrary skill to a quantity of information embodied within a sequence of said tokens generated by a person of expert skill performing the said test suite using said first computer-human interface and for using said ratio as a second metric reflecting the performance differences between skilled and arbitrary usage associated with said first computer-human interface.

7. A computer-implemented apparatus for comparing proposed computer-human interfaces according to claim 1, further comprising:
a comparison mechanism for comparing said first metric with a correspondingly generated metric obtained from a second human-computer interface.

8. A computer-implemented apparatus for evaluating an extant computer-human interface according to claim 1, further comprising:
a comparison mechanism for comparing said first metric with a correspondingly generated metric obtained from a second human-computer interface.

9. A computer-implemented apparatus for assessing the computer skills of a user according to claim 1, further comprising:
a comparison mechanism for comparing said first metric obtained from a first user with a correspondingly generated metric obtained from a second user and for using said comparison to evaluate the skills of said first user vis-à-vis said second user.

10. The computer-implemented apparatus of claim 1 wherein said first processing mechanism calculates the average uncertainty associated with at least a portion of said tokens.

11. The computer-implemented apparatus of claim 10 wherein said average uncertainty corresponds to the relationship:
$h_O = \log_2(n)$, where $h_O$ represents said quantity of information embodied with one of said tokens and n represents the number of independent tokens; and
$h_1 = p \times \log_2(1/p)$, where $h_1$ represents said quantity of information embodied with one of said tokens and p represents the probability of occurrence of non-independent tokens.

12. A computer-implemented apparatus for comparing proposed computer-human interfaces, comprising:
a memory for storing at least one inferred work session history comprising a sequence of tokens corresponding to events expected during performance of a predetermined test suite using a first proposed computer-human interface;
first processing mechanism for evaluating said tokens to determine a first quantity of information embodied within said tokens and for using said quantity of information as a first metric reflecting the expected effort required to perform said test suite;

second processing mechanism for ascertaining the ratio of the incremental quantity of information attributable to inclusion of an additional token to a predetermined base quantity of information and for using said ratio as a second metric reflecting the redundancy inherent to said first computer-human interface;

third processing mechanism for identifying serial correlation within chronologically contiguous groups of said tokens and for assessing the relative incremental quantity and relative information balance of information attributable to each token in at least one of said groups and for using said relative incremental quantity as a third metric reflecting a degree of difficulty associated with said first computer-human interface; and comparison mechanism for comparing the first, second, and third metrics with correspondingly generated metrics obtained from a second proposed human-computer interface.

13. A computer-implemented apparatus for evaluating an extant computer-human interface, comprising:

a memory for storing at least one work session history comprising a sequence of tokens corresponding to events initiated by a user while performing a predetermined test suite using an first computer-human interface;

first processing mechanism for evaluating said tokens to determine a first quantity of information embodied within said tokens and for using said quantity of information as a first metric reflecting the effort expended by said user in performing said test suite;

second processing mechanism for ascertaining the ratio of the incremental quantity of information attributable to inclusion of an additional token to a predetermined base quantity of information and for using said ratio as a second metric reflecting the redundancy inherent to said first computer-human interface;

third processing mechanism for identifying serial correlation within chronologically contiguous groups of said tokens and for assessing the relative incremental quantity and relative information balance of information attributable to each token in at least one of said groups and for using said relative incremental quantity as a third metric reflecting a degree of difficulty associated with said first computer-human interface; and comparison mechanism for comparing the first, second, and third metrics obtained from said first computer-human interface with correspondingly generated metrics obtained from a second human-computer interface.

14. The computer-implemented apparatus of claim 13 further comprising:

fourth processing mechanism for removal of erroneous instances of said tokens to identify a set of error-free tokens and for ascertaining the ratio of the quantity of information embodied within remaining said error-free tokens to a predetermined base quantity of information and for using said ratio as a fourth metric reflecting the level of error associated with said first user performing said test suite with said first computer-human interface.

15. The computer-implemented apparatus of claim 13 further comprising:

fourth processing mechanism ascertaining the ratio of information embodied within a sequence of said tokens generated by a person of arbitrary skill to a quantity of information embodied within a sequence of said tokens generated by a person of expert skill performing the said test suite using said first computer-human interface and for using said ratio as a fourth metric reflecting the performance differences between skilled and arbitrary usage associated with said first computer-human interface.

16. The computer-implemented apparatus of claim 13 further comprising:

fourth processing mechanism for removal of erroneous instances of said tokens to identify a set of error-free tokens and for ascertaining the ratio of the quantity of information embodied within remaining said error-free tokens to a predetermined base quantity of information and for using said ratio as a fourth metric reflecting the level of error associated with said first user performing said test suite with said first computer-human interface; and fifth processing mechanism ascertaining the ratio of information embodied within a sequence of said tokens generated by a person of arbitrary skill to a quantity of information embodied within a sequence of said tokens generated by a person of expert skill performing the said test suite using said first computer-human interface and for using said ratio as a fifth metric reflecting the performance differences between skilled and arbitrary usage associated with said first computer-human interface.

17. A computer-implemented skills evaluator for assessing the computer skills of a user, comprising:

a memory for storing at least one work session history comprising a sequence of tokens corresponding to events initiated by a first user while performing a predetermined test suite using a first computer-human interface;

first processing mechanism for evaluating said tokens to determine a first quantity of information embodied within said tokens and for using said quantity of information as a first metric reflecting the effort expended by said first user in performing said test suite;

second processing mechanism for ascertaining the ratio of the incremental quantity of information attributable to inclusion of an additional token to a predetermined base quantity of information and for using said ratio as a second metric reflecting the redundancy inherent to said first computer-human interface;

third processing mechanism for identifying serial correlation within chronologically contiguous groups of said tokens and for assessing the relative incremental quantity and relative information balance of information attributable to each token in at least one of said groups and for using said relative incremental quantity as a third metric reflecting a degree of difficulty associated with said first computer-human interface; and comparison mechanism for comparing the first, second, and third metrics obtained from said first user with correspondingly generated metrics obtained from a second user and for using said comparison to evaluate the skills of said first user vis-à-vis said second user.

18. The computer-implemented apparatus of claim 17 further comprising:

fourth processing mechanism for removal of erroneous instances of said tokens to identify a set of error-free tokens and for ascertaining the ratio of the quantity of information embodied within remaining said error-free tokens to a predetermined base quantity of information and for using said ratio as a fourth metric reflecting the level of error associated with said first user performing said test suite with said first computer-human interface.

19. The computer-implemented apparatus of claim 17 further comprising:

fourth processing mechanism ascertaining the ratio of information embodied within a sequence of said tokens generated by a person of arbitrary skill to a quantity of information embodied within a sequence of said tokens generated by a person of expert skill performing the said test suite using said first computer-human interface and for using said ratio as a fourth metric reflecting the performance differences between skilled and arbitrary usage associated with said first computer-human interface.

20. The computer-implemented apparatus of claim 17 further comprising:

fourth processing mechanism for removal of erroneous instances of said tokens to identify a set of error-free tokens and for ascertaining the ratio of the quantity of information embodied within remaining said error-free tokens to a predetermined base quantity of information and for using said ratio as a fourth metric reflecting the level of error associated with said first user performing said test suite on said first computer-human interface; and fifth processing mechanism ascertaining the ratio of information embodied within a sequence of said tokens generated by a person of arbitrary skill to a quantity of information embodied within a sequence of said tokens generated by a person of expert skill performing the said test suite using said first computer-human interface and for using said ratio as a fifth metric reflecting the performance difference between skilled and arbitrary usage associated with said first computer-human interface.

* * * * *